(12) United States Patent
Partington

(10) Patent No.: US 11,397,063 B2
(45) Date of Patent: *Jul. 26, 2022

(54) JIG FOR MANUFACTURING OF FIREARM LOWER RECEIVER

(71) Applicant: BlackHawk Manufacturing Group Inc., Garden Grove, CA (US)

(72) Inventor: Wayne R. Partington, Sterling, MA (US)

(73) Assignee: BlackHawk Manufacturing Group Inc., Garden Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,165

(22) Filed: Jul. 16, 2020

(65) Prior Publication Data

US 2021/0102766 A1    Apr. 8, 2021

Related U.S. Application Data

(63) Continuation of application No. 16/206,878, filed on Nov. 30, 2018, now Pat. No. 10,718,578, which is a (Continued)

(51) Int. Cl.
*F41A 3/66* (2006.01)
*B23Q 17/22* (2006.01)

(52) U.S. Cl.
CPC ............ *F41A 3/66* (2013.01); *B23Q 17/2233* (2013.01)

(58) Field of Classification Search
None
See application file for complete search history.

(56) References Cited

U.S. PATENT DOCUMENTS

| | | | |
|---|---|---|---|
| 362,044 | A | 4/1887 | Strange |
| 1,476,019 | A | 12/1923 | William |
| 2,273,954 | A | 2/1942 | Grass |
| 2,363,085 | A | 11/1944 | Roye |
| 2,393,424 | A | 1/1946 | Selch |
| 2,455,644 | A | 12/1948 | Barnes |
| 2,482,535 | A | 9/1949 | Bayless |
| D160,734 | S | 10/1950 | Polkosnik |
| 2,538,173 | A | 1/1951 | Swebilius |
| 2,543,917 | A | 3/1951 | Lloyd |
| 2,601,809 | A | 7/1952 | Di Nardo |

(Continued)

FOREIGN PATENT DOCUMENTS

| | | |
|---|---|---|
| CA | 1137338 A | 12/1982 |
| EP | 0055307 A1 | 7/1982 |

(Continued)

OTHER PUBLICATIONS

80 Percent Arms Inc., "AR-15 Easy Jig ® Manual," dated 2016, 20 pages.

(Continued)

*Primary Examiner* — Christopher W Fulton
(74) *Attorney, Agent, or Firm* — Knobbe, Martens, Olson & Bear, LLP

(57) ABSTRACT

An improved jig for manufacturing a firearm lower receiver is comprised of a power tool mount; an adapter; a guide plate with plate screws; a rear support with mounting screws; a front support; and at least one of a carriages with at least one locating pin. A guide plate is disposed below the top surface of a lower receiver in conjunction with an adapter. The jig is a universal fitment and includes a bearing to support a rotary tool and at least one guiding feature can be used to facilitate in the guidance of the rotary tool without placing the rotary tool in direct contact with any of the guidance features. A removable locating pin is situated a long the front and rear takedown pin holes of a firearm receiver that is not threaded and is provided with at least one of a pull, string or other handle.

20 Claims, 83 Drawing Sheets

Related U.S. Application Data continuation of application No. 15/979,322, filed on May 14, 2018, now Pat. No. 10,145,633, which is a continuation of application No. 15/726,351, filed on Oct. 5, 2017, now Pat. No. 9,982,958.

(60) Provisional application No. 62/404,710, filed on Oct. 5, 2016.

(56) References Cited

U.S. PATENT DOCUMENTS

| | | |
|---|---|---|
| 2,859,645 A | 11/1958 | Emmons et al. |
| 2,896,677 A | 7/1959 | Payzant |
| 3,108,500 A | 10/1963 | Merriman |
| 3,141,509 A | 7/1964 | Bent |
| 3,149,534 A | 9/1964 | Stephens |
| 3,211,026 A | 10/1965 | Calahan |
| 3,358,375 A | 12/1967 | Lutz |
| 3,396,613 A | 8/1968 | Hutton |
| 3,494,229 A | 2/1970 | Judge |
| 3,555,964 A | 1/1971 | Fleming |
| 3,785,634 A | 1/1974 | Denker |
| 3,788,632 A | 1/1974 | Lukas |
| 3,789,892 A | 2/1974 | Converse et al. |
| 3,799,687 A | 3/1974 | Anderson |
| 3,811,163 A | 5/1974 | Frederick et al. |
| 3,984,192 A | 10/1976 | Wanner et al. |
| 4,145,160 A | 3/1979 | Wiggins |
| 4,155,383 A | 5/1979 | Welliver |
| 4,209,275 A | 6/1980 | Kim |
| 4,330,229 A | 5/1982 | Croydon |
| 4,448,406 A | 5/1984 | Hallberg |
| 4,475,437 A | 10/1984 | Sullivan |
| 4,484,608 A | 11/1984 | Ferdinand |
| 4,502,367 A | 3/1985 | Sullivan |
| 4,505,182 A | 3/1985 | Sullivan |
| 4,536,107 A | 8/1985 | Sandy et al. |
| 4,610,581 A | 9/1986 | Heinlein |
| 4,630,656 A | 12/1986 | Collins |
| 4,648,761 A | 3/1987 | Mitchell et al. |
| D291,529 S | 8/1987 | Degen |
| 4,735,007 A | 4/1988 | Gal |
| 4,738,574 A | 4/1988 | Emmert |
| 4,813,125 A | 3/1989 | Dacey, Jr. |
| 4,859,824 A | 8/1989 | Ukaji |
| 4,936,721 A | 6/1990 | Meyer |
| 4,948,306 A | 8/1990 | Wiedner et al. |
| 4,966,507 A | 10/1990 | Hanks |
| 5,017,056 A | 5/1991 | Morash |
| 5,059,059 A | 10/1991 | Cox |
| 5,094,279 A | 3/1992 | Dickey et al. |
| 5,102,271 A | 4/1992 | Hemmings |
| 5,123,463 A | 6/1992 | Grisley |
| 5,141,369 A | 8/1992 | Palace |
| 5,165,827 A | 11/1992 | Miller |
| 5,209,614 A | 5/1993 | Matthews |
| 5,311,654 A | 5/1994 | Cook |
| 5,358,364 A | 10/1994 | Kall |
| 5,378,091 A | 1/1995 | Nakamura |
| 5,492,160 A | 2/1996 | McCracken |
| 5,560,408 A | 10/1996 | DiFranco |
| 5,694,994 A | 12/1997 | Engler, III |
| 5,725,038 A | 3/1998 | Tucker |
| 5,967,712 A | 10/1999 | Magill et al. |
| 6,065,909 A | 5/2000 | Cook |
| 6,070,352 A | 6/2000 | Daigle |
| 6,138,726 A | 10/2000 | Newman |
| 6,158,487 A | 12/2000 | Licari |
| 6,394,466 B1 | 5/2002 | Matsumoto et al. |
| 6,481,937 B1 | 11/2002 | Sommerfeld et al. |
| 6,520,224 B2 | 2/2003 | Smith |
| 6,554,265 B2 * | 4/2003 | Andronica ............ B25B 1/2452 269/268 |
| 6,557,730 B1 | 5/2003 | Kaye |
| 6,712,104 B1 | 3/2004 | Latshaw |
| 6,742,558 B1 | 6/2004 | Witt |
| 6,792,711 B2 | 9/2004 | Battaglia |
| 6,796,050 B2 | 9/2004 | Haimer et al. |
| 6,813,843 B1 | 11/2004 | Faubion |
| D528,930 S | 9/2006 | Degen |
| 7,108,463 B2 | 9/2006 | Hummel |
| 7,225,539 B2 | 6/2007 | Nowak et al. |
| 7,231,861 B1 | 6/2007 | Gauny et al. |
| 7,269,901 B2 | 9/2007 | Robin |
| 7,367,763 B2 | 5/2008 | Ruy Frota de Souza |
| D571,233 S | 6/2008 | Rys, Jr. |
| 7,588,400 B2 | 9/2009 | Taylor |
| 7,641,425 B2 | 1/2010 | Sommerfeld et al. |
| 7,819,146 B2 | 10/2010 | McDaniel |
| 7,857,020 B2 | 12/2010 | McDaniel |
| 7,871,224 B2 | 1/2011 | Dost et al. |
| 8,052,355 B2 | 11/2011 | Hirukawa et al. |
| 8,241,297 B2 | 8/2012 | Ashman |
| 8,327,749 B2 | 12/2012 | Underwood |
| 8,573,906 B2 | 11/2013 | Gowker |
| 8,584,372 B2 | 11/2013 | Stoffel |
| 8,656,622 B2 | 2/2014 | Peterson et al. |
| 8,683,725 B2 | 4/2014 | Munson |
| 9,009,986 B1 | 4/2015 | Chang et al. |
| 9,259,851 B2 | 2/2016 | Cardew |
| 9,662,717 B2 | 5/2017 | Prom et al. |
| 9,772,150 B2 | 9/2017 | Gomez |
| 9,802,332 B2 | 10/2017 | Davey |
| 9,810,517 B2 | 11/2017 | Chang et al. |
| D804,926 S | 12/2017 | Atkinson |
| 9,982,958 B1 | 5/2018 | Partington |
| D824,741 S | 8/2018 | Davis |
| 10,099,329 B1 | 10/2018 | Smith |
| 10,145,633 B1 | 12/2018 | Partington |
| D847,935 S | 5/2019 | Smith |
| 10,391,591 B2 | 8/2019 | Smith |
| 10,456,846 B1 | 10/2019 | Partington |
| 10,718,578 B2 | 7/2020 | Partington |
| 10,875,135 B2 * | 12/2020 | Smith ..................... B23Q 3/062 |
| 11,000,930 B1 * | 5/2021 | Partington ............... F41A 3/66 |
| 2001/0011564 A1 | 8/2001 | Darling |
| 2002/0021945 A1 | 2/2002 | Harpaz et al. |
| 2004/0065387 A1 | 4/2004 | Smith |
| 2004/0179906 A1 | 9/2004 | Hughes et al. |
| 2005/0025588 A1 | 2/2005 | Effrem |
| 2005/0086788 A1 | 4/2005 | Wasileski et al. |
| 2005/0120573 A1 | 6/2005 | Port |
| 2009/0065095 A1 | 3/2009 | McDaniel |
| 2010/0074701 A1 | 3/2010 | Kempen et al. |
| 2010/0303568 A1 | 12/2010 | York |
| 2011/0280676 A1 | 11/2011 | Nordlin |
| 2012/0005937 A1 | 1/2012 | Milino |
| 2013/0028675 A1 | 1/2013 | Vogler et al. |
| 2015/0027587 A1 | 1/2015 | Smith |
| 2015/0040414 A1 | 2/2015 | Nakamura et al. |
| 2015/0128396 A1 | 5/2015 | Motomura |
| 2017/0209941 A1 | 7/2017 | Chang et al. |
| 2018/0058835 A1 | 3/2018 | Chang et al. |
| 2019/0039192 A1 * | 2/2019 | Smith ..................... B23P 13/02 |
| 2019/0210170 A1 | 7/2019 | Smith |
| 2020/0206832 A1 | 7/2020 | Smith |
| 2021/0379710 A1 | 12/2021 | Smith |

FOREIGN PATENT DOCUMENTS

| | | |
|---|---|---|
| FR | 1075194 A | 10/1954 |
| GB | 1008029 A | 10/1965 |
| GB | 2514491 A | 11/2014 |

OTHER PUBLICATIONS

5D Tactical LLC, A New Dimension in Firearms, "AR-15 & AR-308 Router Jig Instructions," dated as created Dec. 14, 2016 (as indicated by the PDF file metadata), 11 pages.

Modulus Arms, "Universal AR-15 80% Lower Receiver Jig Instructions," dated Mar. 25, 2015, 19 pages.

Modulus Arms, "AR-308/AR-10 Jig Instructions," dated Oct. 20, 2014, 24 pages.

(56) References Cited

OTHER PUBLICATIONS

Kreg Tool, Quick-Start Guide, Jig Product Manual, dated 2010, 27 pages.
Kreg Newsletter, "4 Tips for Tight-Fitting Kreg Joints," available at <http://www.kregtool.com/files/newsletters/kregplus/may13.html>, dated Aug. 2013, 4 pages.
DIYdiva, "Joinery 101: Using a Kreg Jig," available at <http://diydiva.net/2011/07/joinery-101-using-a-kreg-jig/>, dated Jul. 18, 2011.
Modulus Arms, "Heavy-Duty Universal AR-15 80% Lower Receiver Jig Instructions," dated Jan. 14, 2016, 21 pages.
Iconic Industries Inc., "Legacy Instructions for Iconic Brand Jigs," <https://www.iconicindustriesinc.com/finishing-fixturesjigs>, for purposes of examination, consider published before Apr. 18, 2017, pp. 3-25.
80 Percent Arms Inc., "Easy Jig® Gen 2 Multi-Platform Milling System User Manual" dated 2017, 15 pages.

\* cited by examiner

1700

Remove #2 (medium) guide pins and install #3 (long) guide pins on router adapter reusing the (2) screws and 7/64" Allen wrench
1702

Set end mill depth using depth gauge #3
1704

Place router on guide plate, with end mill entering the earlier drilled 5/16" hole
1706

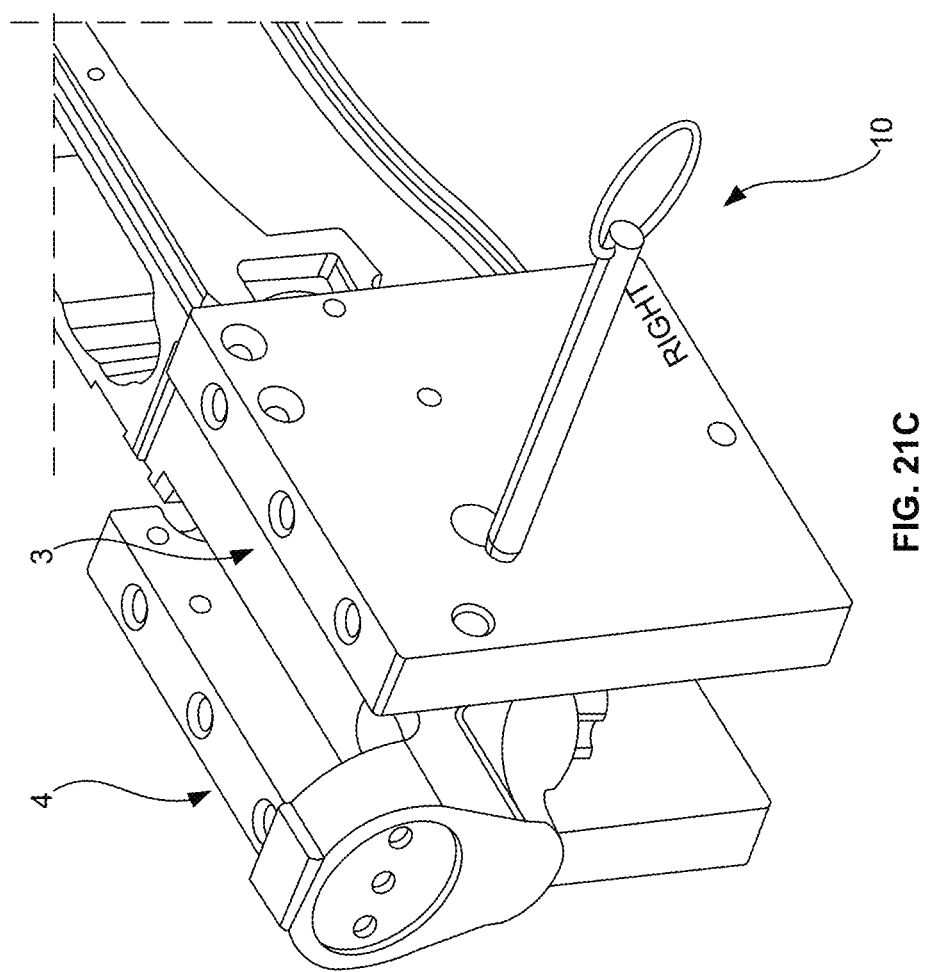

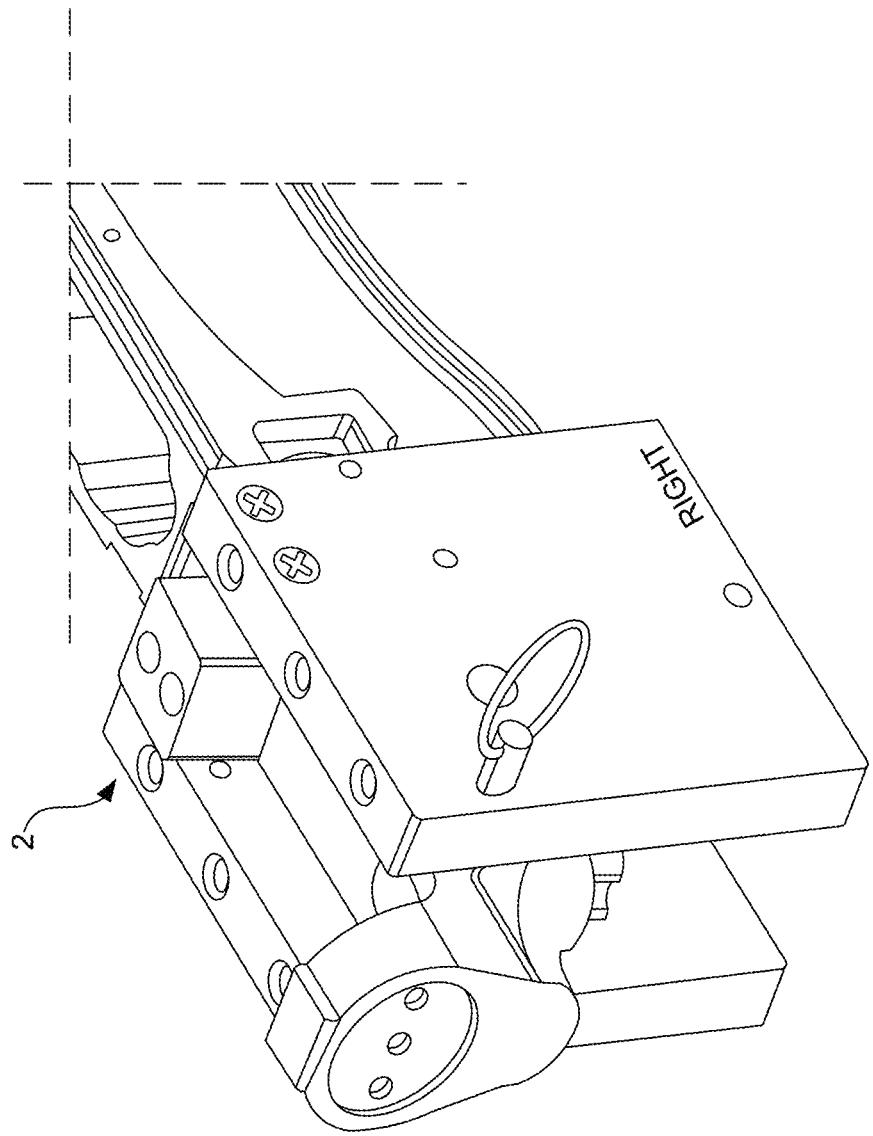

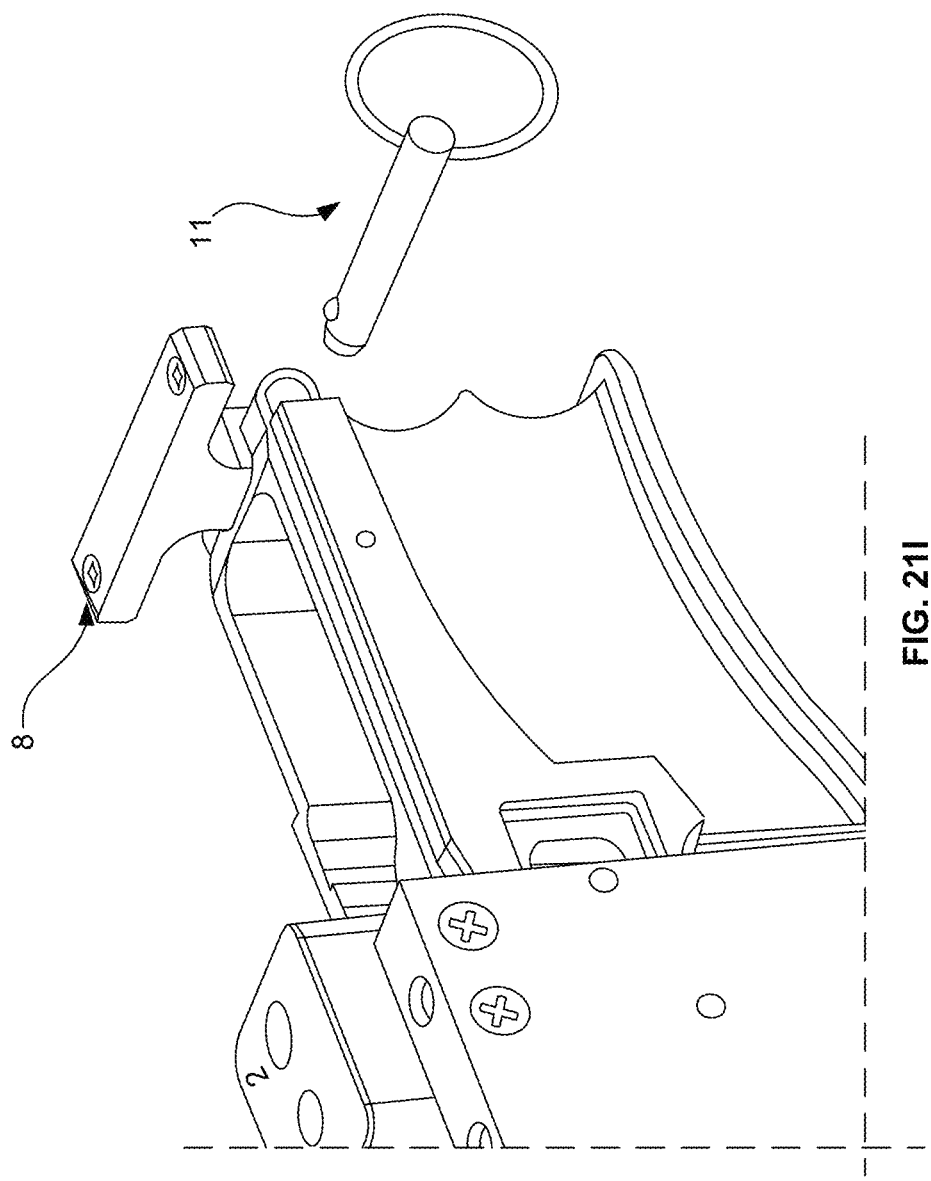

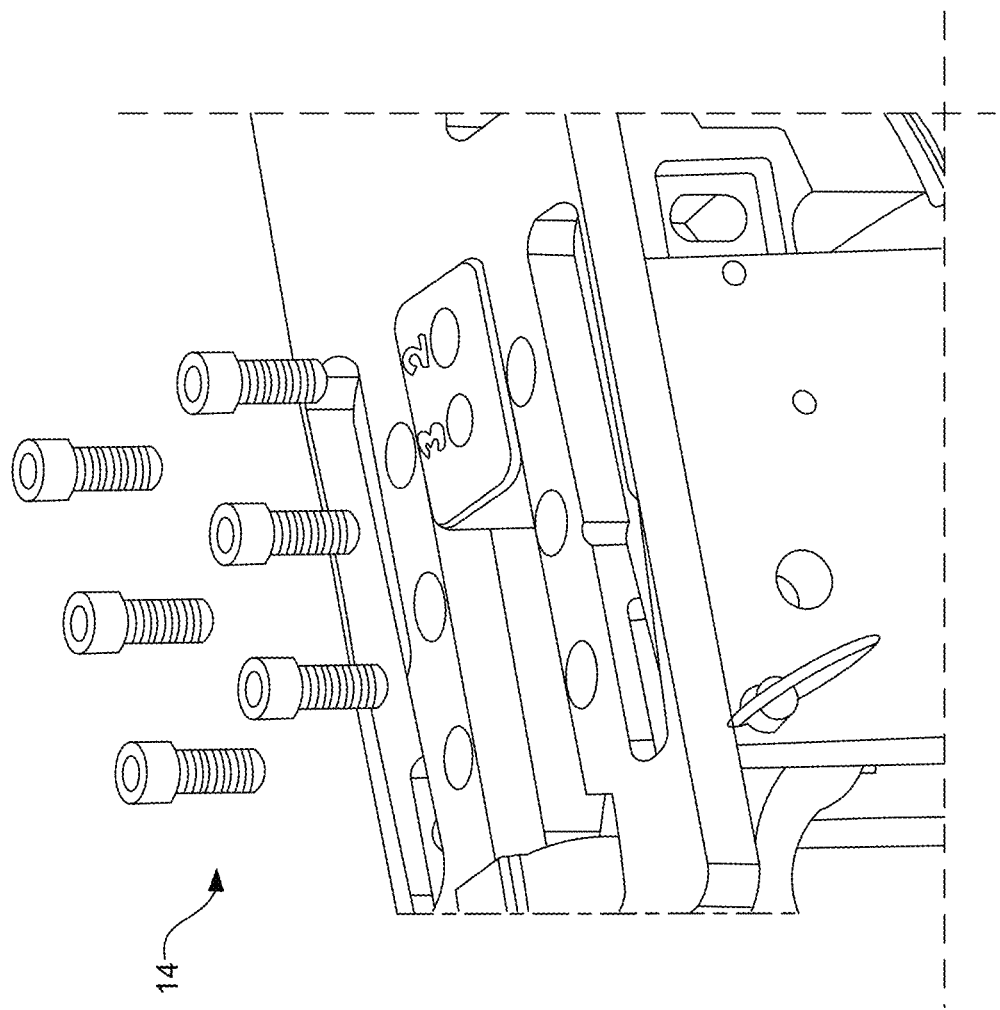

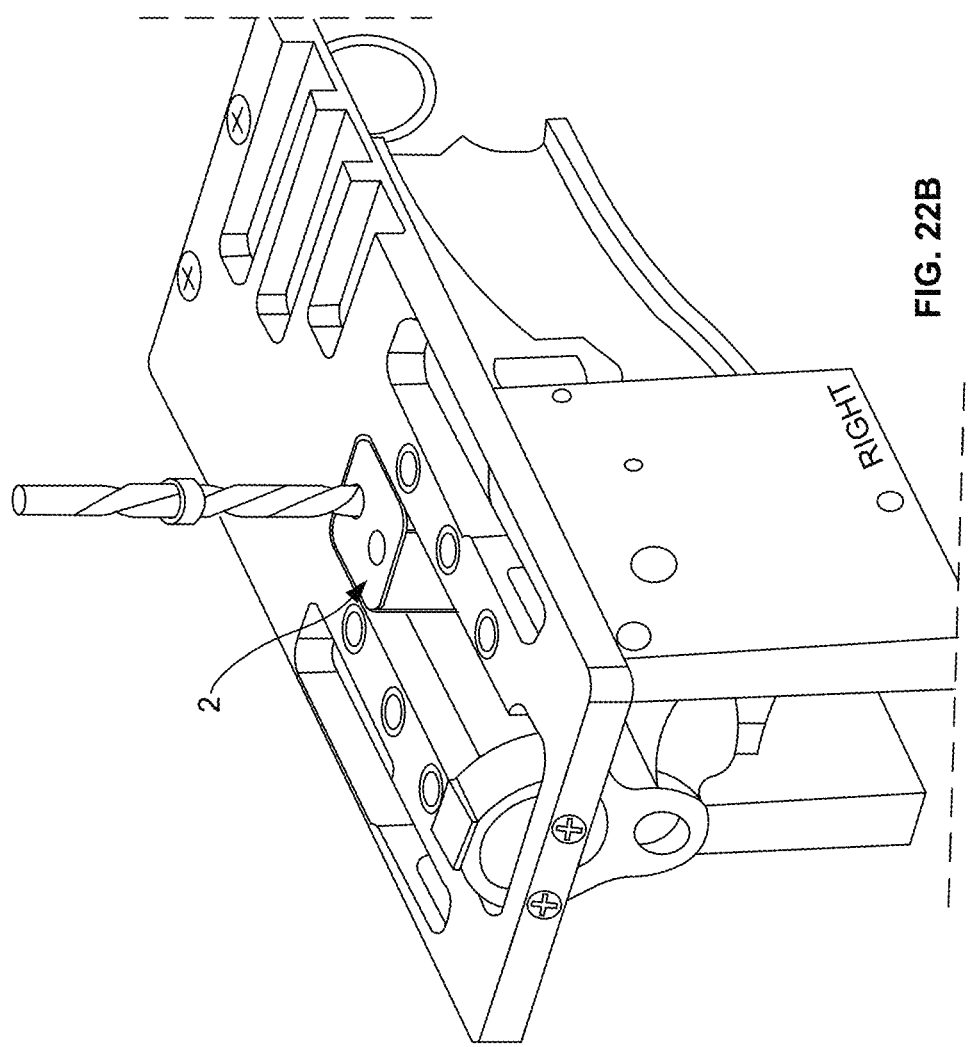

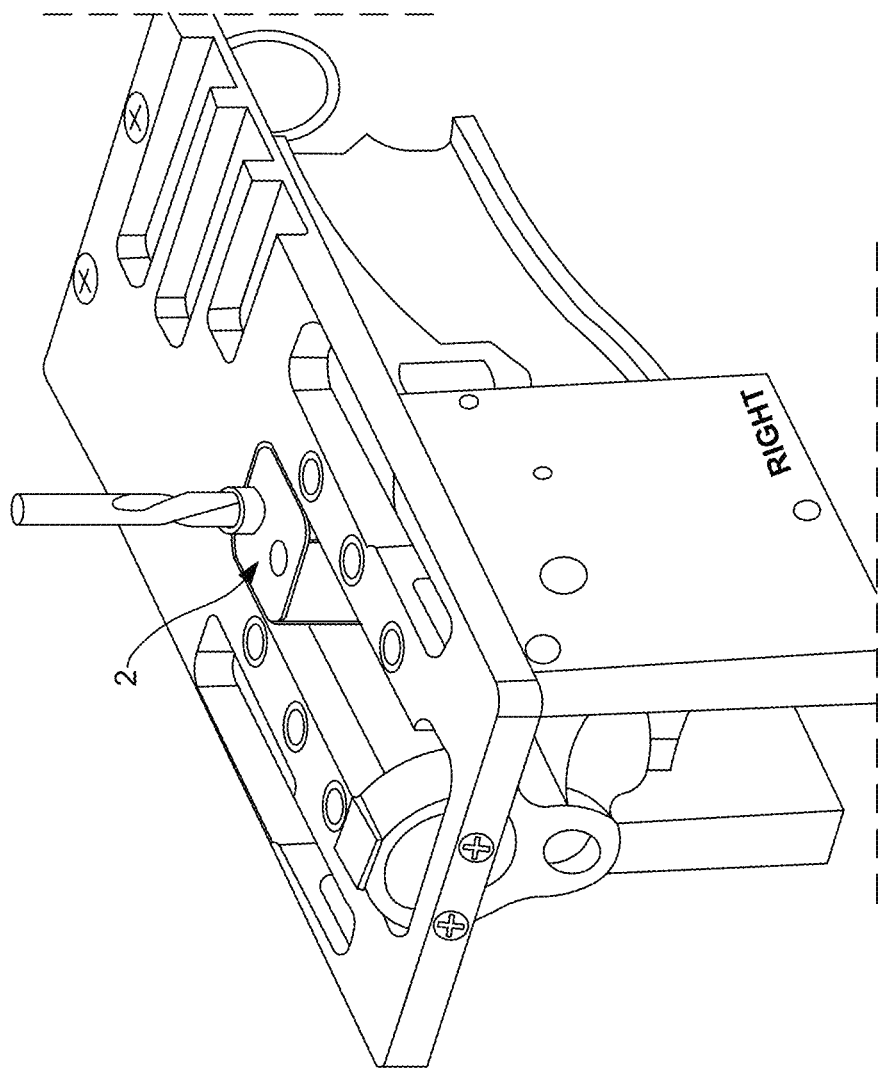

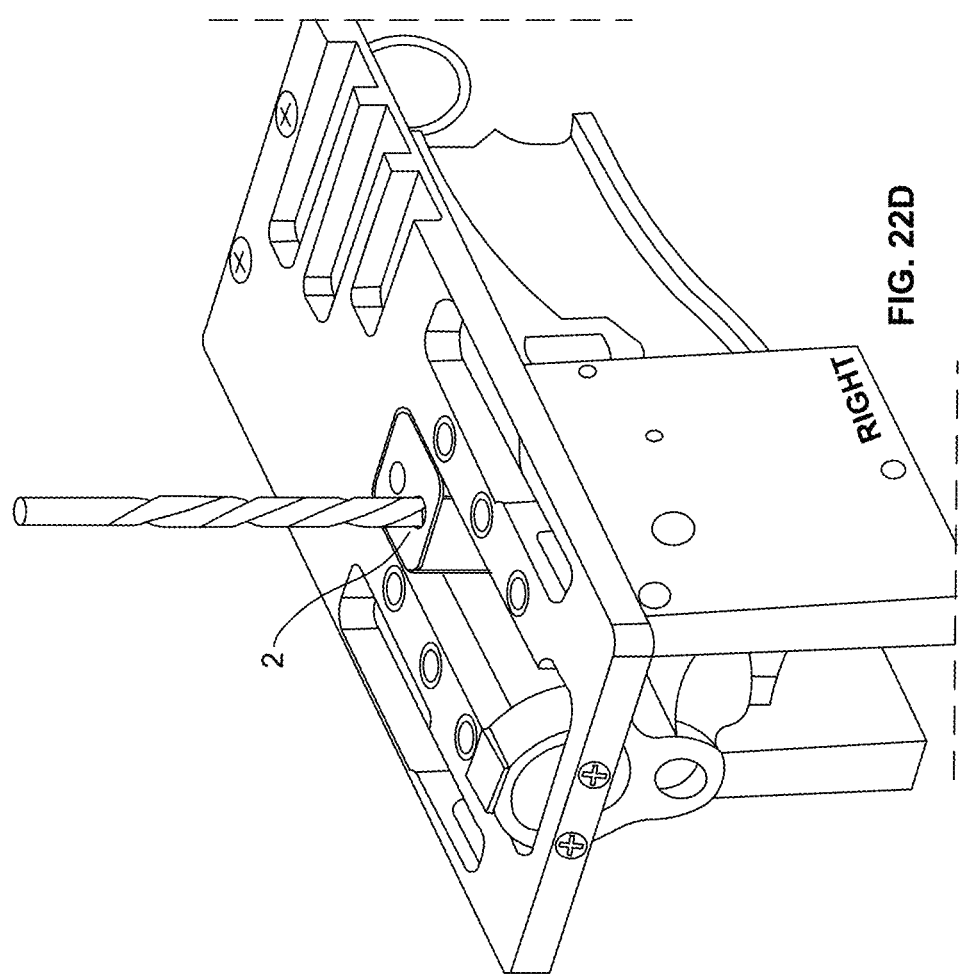

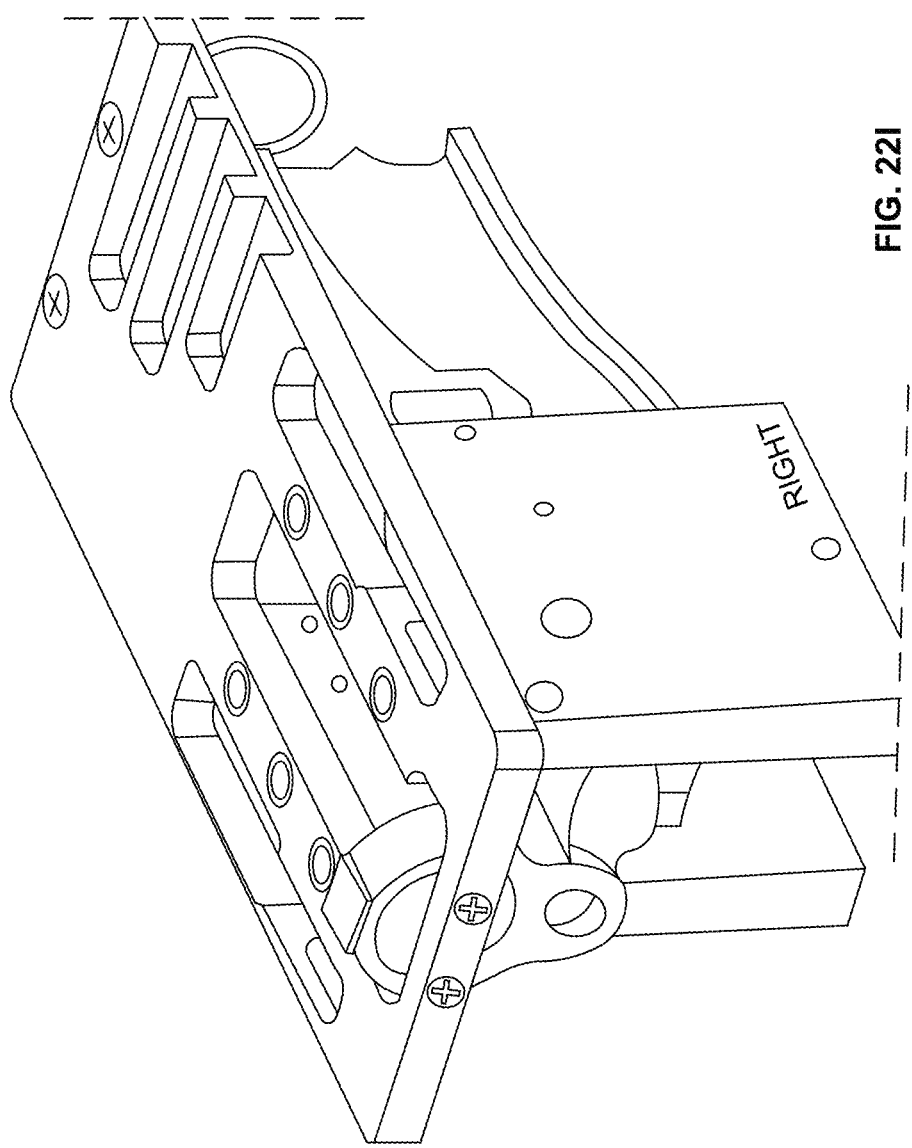

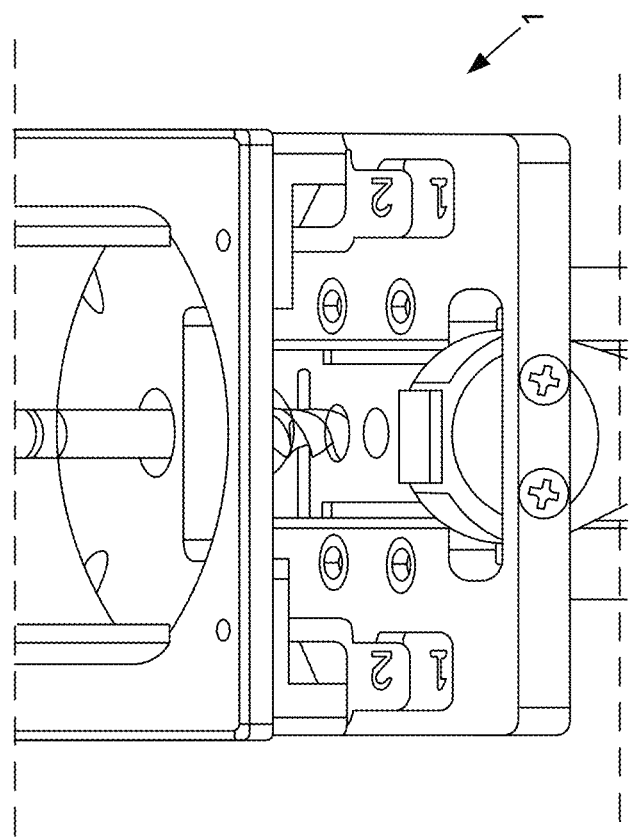

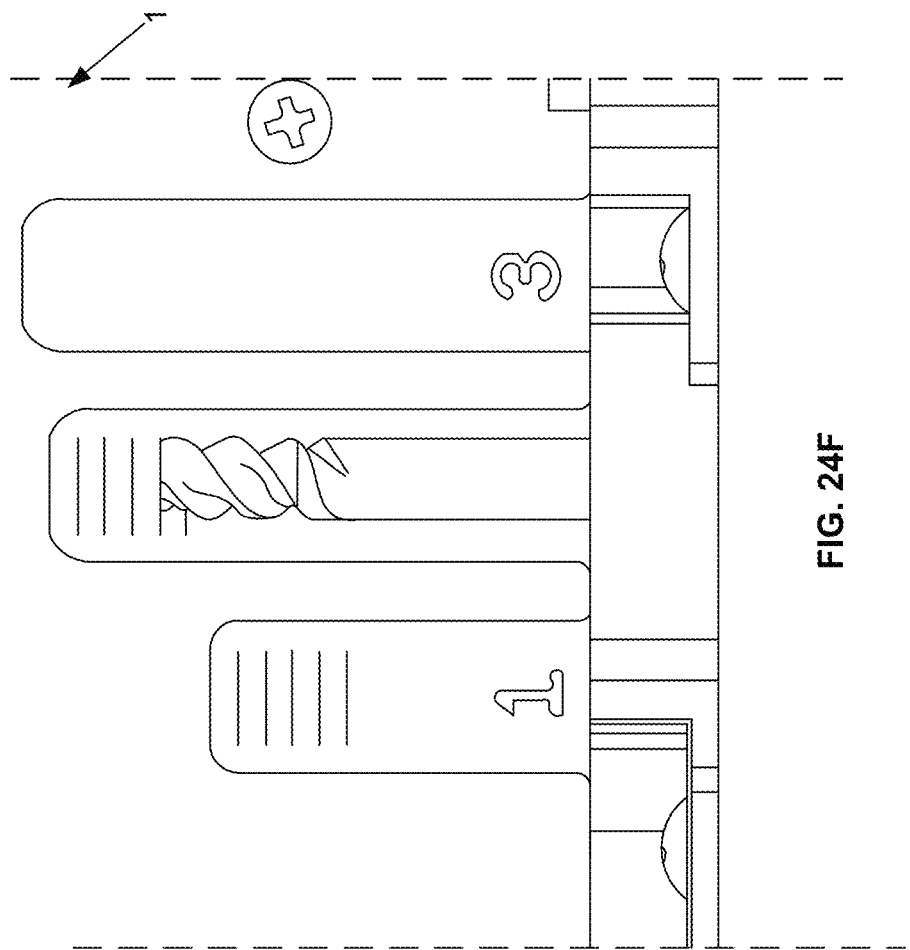

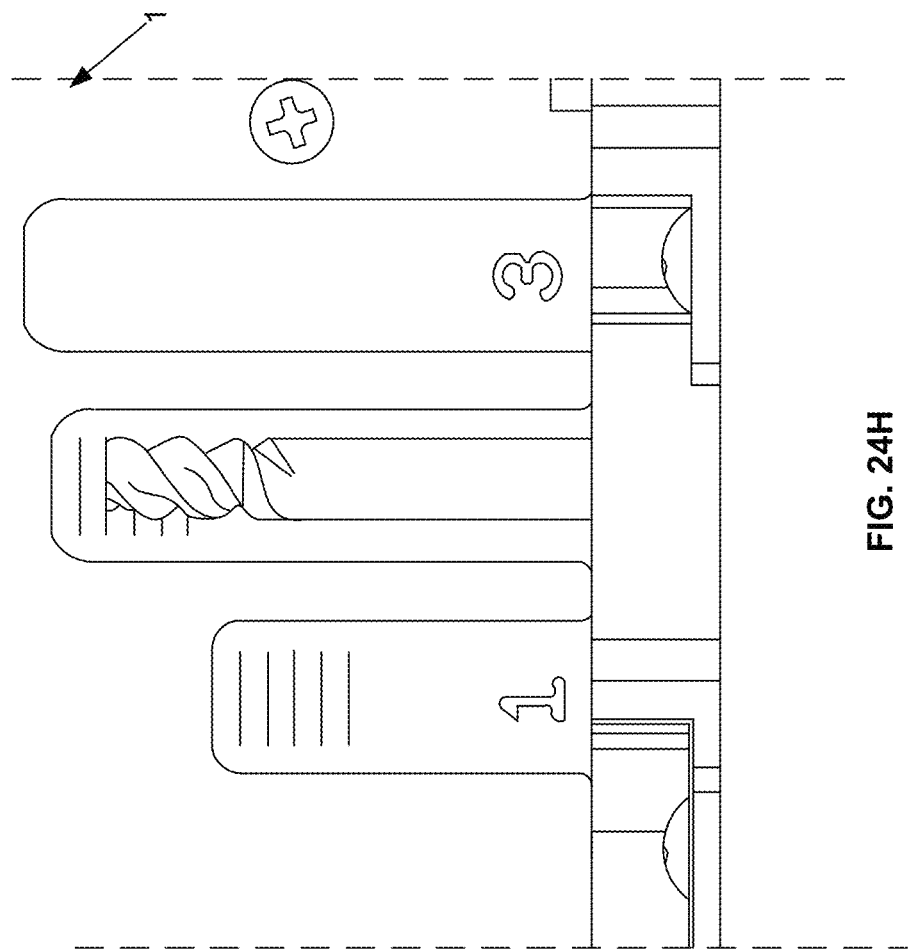

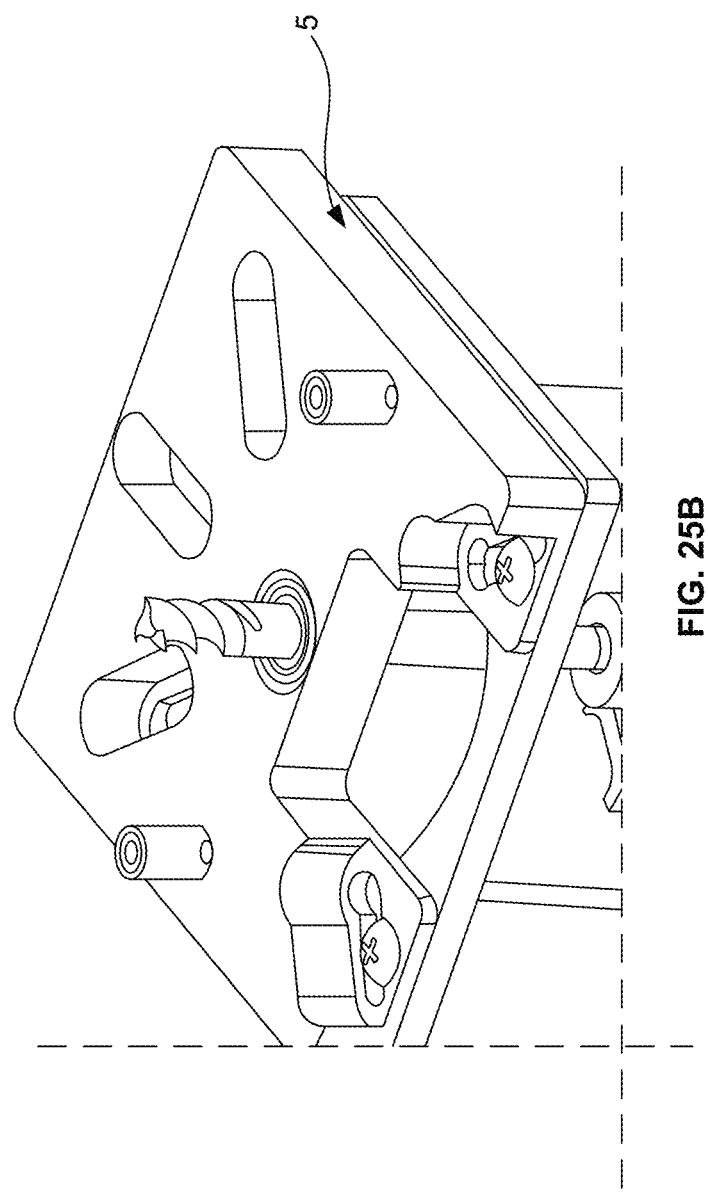

JIG FOR MANUFACTURING OF FIREARM LOWER RECEIVER

RELATED APPLICATIONS

This application is a continuation of U.S. application Ser. No. 16/206,878, filed Nov. 30, 2018, now U.S. Pat. No. 10,718,578, entitled IMPROVED JIG FOR MANUFACTURING OF FIREARM LOWER RECEIVER, which application is a continuation of U.S. application Ser. No. 15/979,322, filed May 14, 2018, now U.S. Pat. No. 10,145,633, entitled IMPROVED JIG FOR MANUFACTURING OF FIREARM LOWER RECEIVER, which application is a continuation of U.S. application Ser. No. 15/726,351, filed Oct. 5, 2017, now U.S. Pat. No. 9,982,958, entitled IMPROVED JIG FOR MANUFACTURING OF FIREARM LOWER RECEIVER, which application claims the benefit of U.S. Provisional Application Ser. No. 62/404,710, filed Oct. 5, 2016, entitled IMPROVED JIG FOR MANUFACTURING OF FIREARM LOWER RECEIVER, the entire disclosures of each of which applications are hereby incorporated by reference.

FIELD OF THE INVENTION

This invention relates to systems and methods for manufacturing an 80% (partially unfinished) firearm receiver, with a high rate of success with improved quality, by an unskilled user.

BACKGROUND OF THE INVENTION

A market exists for incompletely/partially manufactured firearm lower receivers. A firearm lower receiver is unregulated until a minimum level of manufacturing is completed. This level is typically known as "80%". Firearm lower receivers completed to this level are typically referred to as "80%" lower receivers. These firearms must then be completed by the end user to be operable. In a typical configuration the lower receiver is cast and/or forged and is partially machined, with certain aspects of the inner slot (in which the trigger mechanism resides) remaining uncut. The finishing task cuts this remaining slot with appropriate dimensions and accuracy.

The completion of these lower receivers can be time consuming and quality results may be difficult to achieve with prior art. In accordance with the prior art, the technique for finishing the receiver can place a rotary power tool in a position that is effectively too far away from the lower receiver. As such this prior art technique can produce poor results and broken tooling. Additionally, the prior art technique can involve placement of a rotating tool in direct contact with guiding areas of a jig, which can result in premature wear.

It would be desirable to provide a jig assembly that effectively reduces the unsupported distance between the rotary power tool and the 80% lower receiver and that avoids direct contact between the rotating tool and its guiding features.

SUMMARY OF THE INVENTION

This invention overcomes the disadvantages of the prior art by providing a device that reduces the distance between the lower receiver and the rotary power tool and by using additional features to guide the rotary tool instead of placing it in direct contact with any of the plurality of guiding features. An improved jig for manufacturing a firearm lower receiver is comprised of a power tool mount; an adapter; a guide plate with plate screws; a rear support with mounting screws; a front support; and at least one carriage with at least one locating pin. A guide plate is disposed around and below the top surface of a lower receiver and is mounted to the carriage(s) in conjunction with a rotary power tool adapter. The jig is a universal fitment. The jig includes a bearing to support a rotary tool and is constructed and arranged to provide for use of at least one guiding feature to facilitate in the guidance of the rotary tool without placing the rotary tool in direct contact with any of a plurality of guidance features for firearm lower receiver manufacturing. A removable locating pin is situated in a location along the front and rear takedown pin holes of a firearm receiver that is not threaded and is provided with at least one of a pull, a string or other handle for firearm lower receiver manufacturing.

BRIEF DESCRIPTION OF THE DRAWINGS

The invention description below refers to the accompanying drawings, of which:

FIGS. 22A-I depict various stages of the method of FIG. 14;

FIGS. 23A-K depict various stages of the method of FIG. 15;

FIGS. 24A-K depict various stages of the method of FIG. 16;

FIGS. 25A-E depict various stages of the method of FIG. 17;

DETAILED DESCRIPTION

Figure 1:
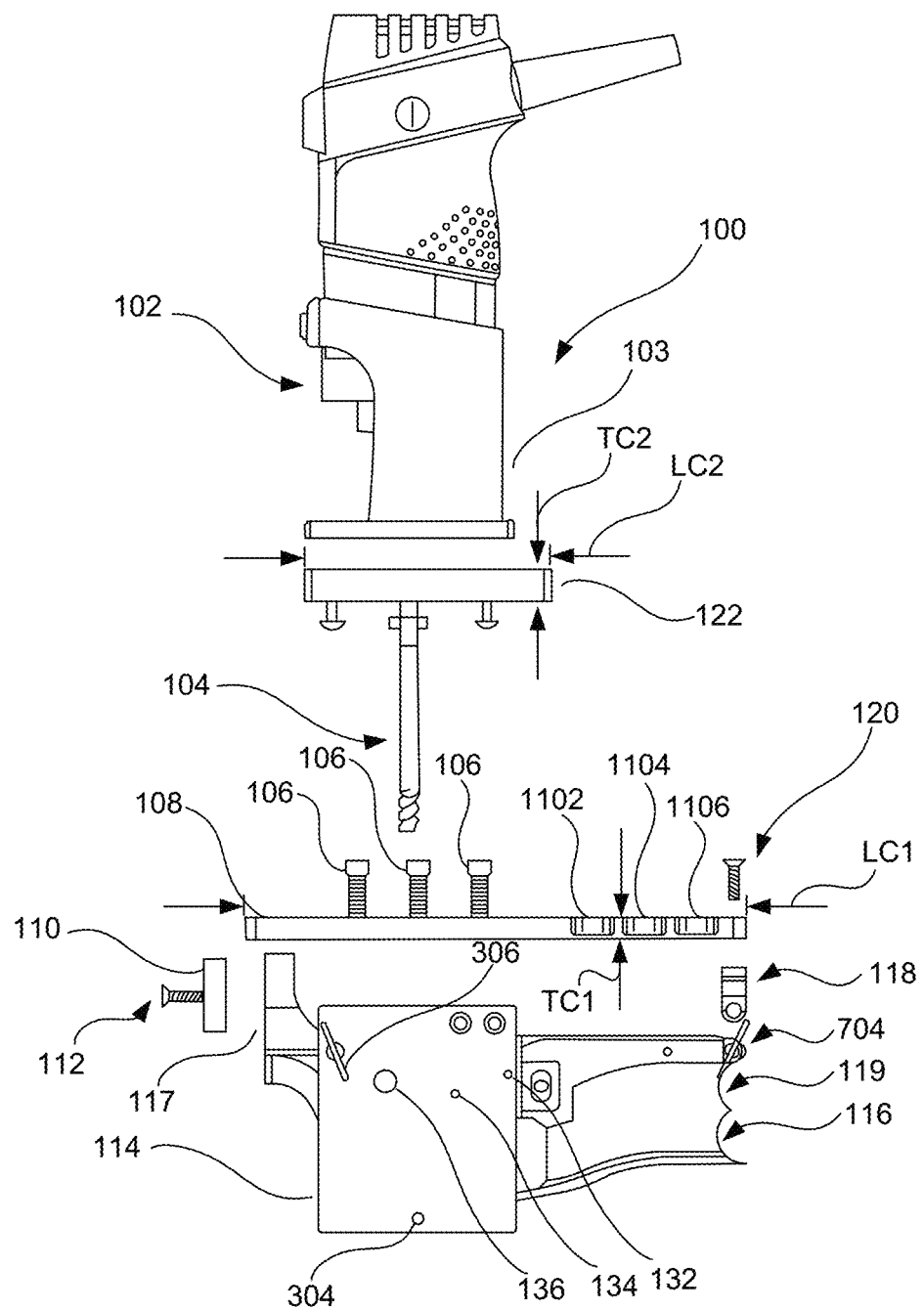
FIG. 1 is an exploded right side view of an improved jig, according to an illustrative embodiment.

The primary function of a jig is to provide repeatability, accuracy, and interchangeability in the manufacturing of products. In FIG. 1, an improved jig 100 is assembled by placing left carriage 302 (see FIG. 3, not shown in FIG. 1) on the left side of a lower receiver 116 and by placing right carriage 114, on the right side of the lower receiver 116. The lower receiver in this example is a form of popular AR-style receiver (for example the semi-automatic version of the AR-15, M-16, M-4 carbine, and variants thereof). The lower receiver is the portion of the firearm that includes a shoulder stock, pistol grip, trigger mechanism and magazine well. The upper receiver includes the barrel, chamber and bolt assembly. The lower receiver is attached to the upper receiver by two takedown pins. The firearm is available in fully automatic and semi-automatic versions. Note that the jig is adapted to finish the receiver with holes and cuts appropriate to the semi-automatic version. However, the jig can be adapted for the use by licensed manufacturers to finish other versions (e.g. fully automatic) of the firearm. The jig 100 is an assembly that is comprised of a rotary power tool mount 103, an adapter 122, a guide plate 108 with plate screws 106, 120, a threaded rear support 110 with mounting screws 112, a front support 118, and at least one carriage 114 with at least one locating pin 306. As described below, the plate screws 106 are machine screws with an appropriate diameter, thread size and length, and the screw 120 can also be a machine screw (for example, a #8-32 flat head machine screw), sheet metal screw, or another form of self-tapping screw. The receiving hole of the front support 118 is drilled and/or tapped to accommodate the screw 120. The illustrative jig defines a universal fitment. A removable locating pin 306 (See FIG. 3) is readily inserted through all three parts 302, 116 and 114 to hold them in alignment relative to each other. This renders assembly highly straightforward for use by even an inexperienced user. In an embodiment, the jig assembly can be provided as a kit with appropriate instructions (printed, on electronic media and/or available via the Internet). See for example, the instructions in attached Appendix A, which describe setup and use of the jig assembly. The kit can include a rotary power tool having an appropriate size, shape, torque and power supply.

As described herein, the lower receiver 116 includes a buffer mount 117 for receiving a buffer assembly within the shoulder stock at one end, and the front surface of the magazine well 119 at the other. As defined herein, the buffer mount 117 is at the "rear" end of the lower receiver, while the magazine well 119 is at the "front" end of the lower receiver. As presented in FIG. 1, the rear end of the lower receiver 116 is on the left side and the front end of the lower receiver 116 is on the right side and the visible face of the lower receiver is the "right" side. The right carriage 114 is resting on the right side of the lower receiver 116. Thus, the relative orientation of the jig assembly 100 (i.e. left, right, front, rear, top and bottom) is described with respect to the corresponding, confronting sides of the lower receiver 116.

Note that the carriage plate 114 is provided with three drill guide holes, 132, 134, 136, along its side for the location of and drilling of appropriate diameter pin holes into the lower receiver 116. These guide holes are used to guide and align a drill bit to bore desired holes into the lower receiver side. By way of non-limiting example drill guide hole 132 is a guide hole for a hammer pivot/pin hole, for the subsequent mounting of an assembly that retains the hammer mechanism within the lower receiver. Drill guide hole 134 is a guide hole for a trigger pivot/pin hole, for the later mounting of a trigger pivot/pin to retain the trigger mechanism. Drill guide hole 136 is a guide hole for a selector/safety pivot hole, for the subsequent mounting of a selector/safety lever. These carriage guide holes provide for the accurate and precise placement of the pin holes and are constructed so that an unskilled user can properly place the pivot/pin holes for completion of the assembly of a functioning lower receiver. Holes can be provided on each of opposing carriage plates to drill each side of the receiver in an embodiment. In alternate embodiments holes are provided on one side and the drill passes through both sides of the receiver. The thickness of the carriage plate(s) and close tolerance of the hole to the drill shaft is sufficient to ensure minimal skew or wobble as the drill passes into the receiver side.

The rotary power tool mount 103 is adapted to receive an appropriately sized and shaped rotary power tool 102, as described further below. The rotary power tool retains an appropriate rotary tool 104 in accordance with various embodiments. The term "rotary tool" shall be taken broadly herein to mean any one of a variety of rotating cutting elements that can be mounted removably (or permanently) within a chuck or arbor of the rotary power tool 102. For example a two-flute or four-flute end mill of appropriate diameter (for example, a ¼ inch diameter, or another appropriate diameter between (e.g.) ⅛ inch and ½ inch) can be mounted within the rotary power tool. The mill can include a cutting end and a shaft that is free of cutting surfaces. The shaft is adapted to confront the jig so as to avoid cutting its sides while the cutting end is adapted to reside within the receiver so as to cut the appropriate slot(s) in conjunction with the jig's outline(s). The rotary tool 104 can be constructed from a variety of high-strength materials, such as high-speed steel, tungsten carbide, etc.

As shown, the rear support 110 is threaded into lower receiver 116 via the receiver's rear buffer mount (a large round hole at the rear of the receiver in which a buffer assembly normally resides when assembled into a firearm). Front support 118 is placed between two mounting ears on the lower receiver 116 before an easily removable locating pin 704 inserted through the mounting ears of the lower receiver 116 and through the hole in the front support 118. Illustratively, the front support 118 resides where the front pivot/takedown pin between the upper and lower receiver on a complete firearm normally resides. The pivot hole in this arrangement has been drilled by the supplier of the 80% receiver, and is, thus available for use in mounting the front support via pin 306. As with other receiver holes and structures relied upon to engage the jig assembly, they are reliably located by the manufacturer using sophisticated tooling so that the jig accurately and repeatable mounted to the lower receiver 116, and the corresponding cutting performed by the user is equally reliable and accurate.

After mounting the front support 118, a guide plate 108 is then placed atop the assembly by aligning the holes in the guide plate 108 with the threaded holes in the front support 118, the threaded holes in the rear support 110, and the threaded holes in both the left and right carriages 302 and 114 respectively. The guide plate 108 has a thickness TC1 of between ⅜ and up to ½ inch and a length LC1 of approximately 8 inches (±0.5 inches). The adapter plate 122 has a thickness TC2 of approximately ½ inch and a length LC2 of approximately 4 inches (±0.5 inches). In other embodiments, these thicknesses and widths can vary greater or lesser, depending on the materials used. Once aligned, carriage-to-guide plate screws 106 are inserted through the guide plate 108 and tightened to connect the carriages 114 and 302 to the guide plate 108. The rear support-to-guide plate screws are inserted through the holes in the guide plate 108 and tightened into the rear support 110. The front support-to-guide plate screws 120 are inserted through the guide plate 108 and tightened into the front support 118. These screws 120 can be sheet-metal screws or flat head screws (for example, a #8-32 flat head screw) and the hole(s) in the front support 118 can be sized to receive such screws. The carriage screw 304 is threaded to a corresponding female thread in the left carriage 302 and continued through a threaded hole in the right carriage 114. Illustratively, both the left carriage 302 and right carriages 114 are threaded so if the assembly is placed into the jaws of an external vice or other clamp, it will tend to resist deformation that could damage the lower receiver 116 sandwiched therebetween. The screw 304 can have a recessed drive head (e.g. hex, star, etc.) so that it avoids interference with a clamping jaw (if any). The above thus defines the full set of components of the jig assembly, which are connected either directly or indirectly to the lower receiver 116.

The illustrative jig assembly is depicted as retaining a rotary power tool 102 in the power tool mount 103, but it is contemplated that the power tool can be a non-rotary tool. The jig provides for the use of at least one of the various guiding features (for example, left carriage 302) to be utilized to aid in the guidance of a power tool 102 without placing the tool in direct contact with any guiding feature.

Note that a wide variety of rotary power tools can be employed in association with an embodiment of the jig assembly—for example a small router, drill, hand piece of a flexible-shaft unit or Dremel®-style tool. The rotary tool can be cordless or powered by (e.g.) wall current via a power cable.

Figure 2:
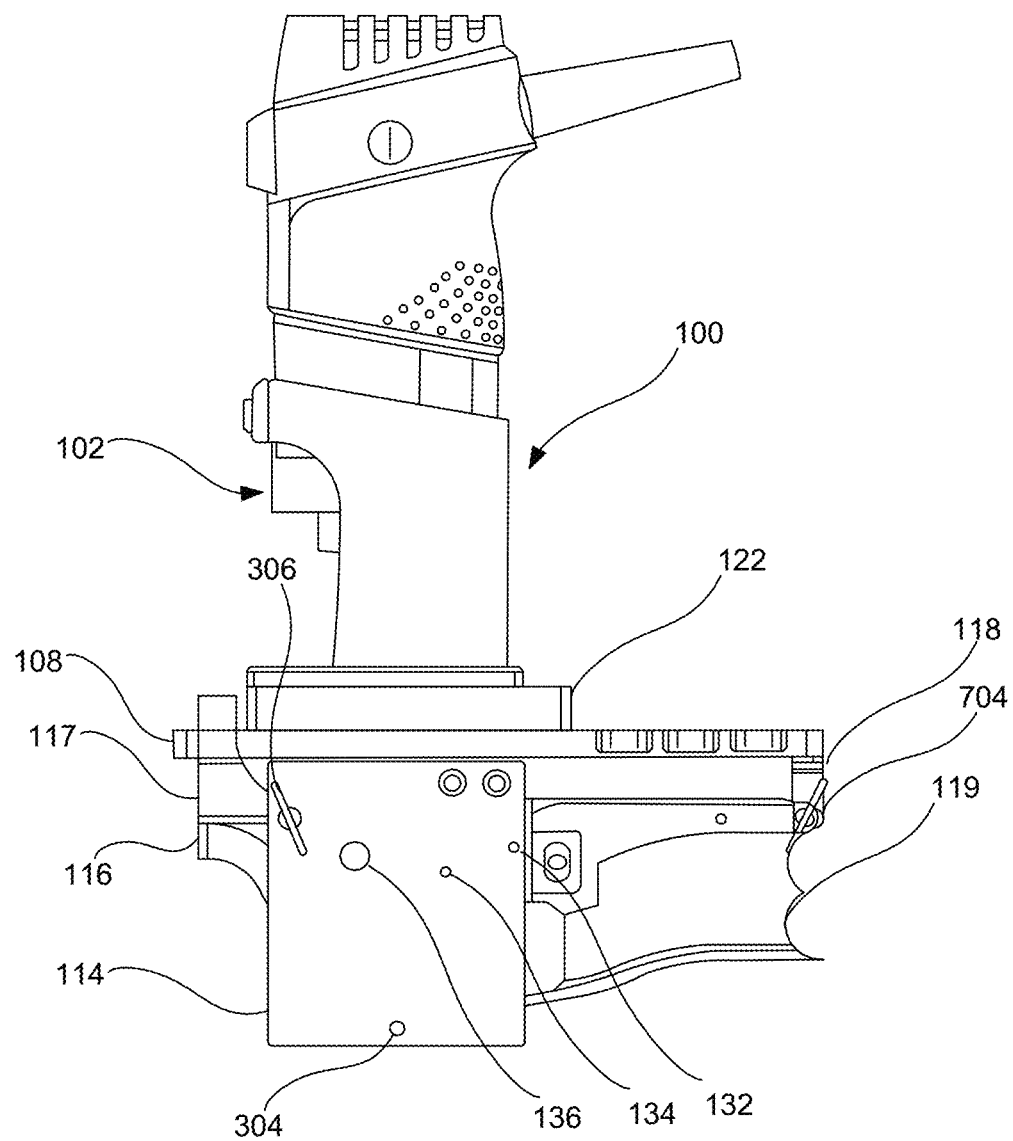
FIG. 2 is a right side view of the improved jig, according to the illustrative embodiment.

FIG. 2 depicts the jig 100 holding the rotary power tool 102 in engagement with the lower receiver 116 so that finishing work can be performed on the lower receiver. The receiver 116 is situated between the carriages 114 and 302 so that it remains in place during the finishing operation. There is a narrow gap between the carriages and the walls of the lower receiver 116. The gap prevents contact between the surfaces of the carriages with the surface of the lower receiver and thereby prevents possible scratching of the surface coating of the lower receiver. In an alternate embodiment, the carriages can have an external flexible coating (for example, a polymer) and make contact with the surface of the lower receiver or a removable foam pad can be provided during assembly to avoid inadvertent contact between the carriage plate and the receiver during assembly of the jig. The various plates of the jig assembly can be constructed from a variety of materials, or combination of materials—for example aluminum alloy, steel, polymer (e.g. Delrin® (from DuPont), polycarbonate, acrylic, etc.). The thickness of each plate 108, 122 is also highly variable, and depends in part upon the choice of material(s). By way of non-limiting example, the thickness of the jig assembly plate(s) can be between ⅛ and ½ inch, or greater, for sufficient strength and rigidity. For example, the carriage plates 114 and 302 should define a sufficient thickness to receive the screws 106 within threaded holes formed in the top edge of each plate. Likewise, the guide plate 108 should be sufficiently thick to allow the rotary tool 104 to resist wobble. The various plates can be constructed from sheet stock and milled to shape using, e.g. CNC manufacturing techniques. Other methods of constructing the plates can be employed in alternate embodiments—for example stamping or casting with finish milling, 3D printing, molding, etc.

The following is a description further views and representations of the assembled jig assembly 100 and corresponding rotary power tool (102) arrangement.

Figure 3:
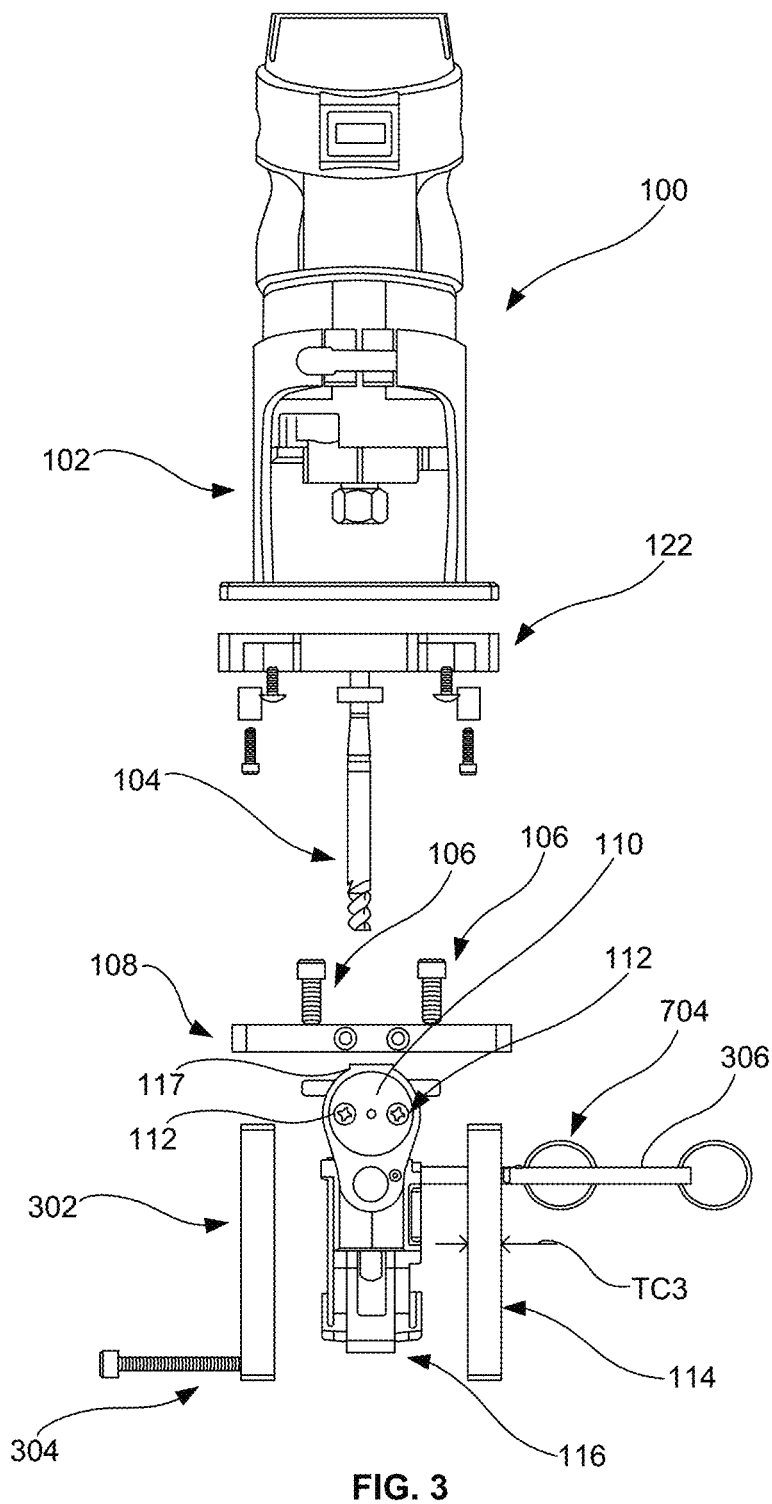
FIG. 3 is an exploded rear view of the improved jig, according to the illustrative embodiment.

With reference to FIG. 3, a rear-oriented exploded view of the jig assembly 100 is shown, with the rear support 110 with mounting screws 112 visible within the buffer mount 117 within the lower receiver 116. In an embodiment the carriage plates 114 and/or 302 can define a thickness TC3 of approximately ½ inch (+⅛ inch). This dimension is highly variable in alternate embodiments an, in part, facilitates the formation or female-threaded holes for receiving screws 106. Note that, while two carriage plates are employed in the depicted embodiment, at least one carriage plate can be used in alternate arrangements. Such a single plate can include appropriate brackets or other structures to maintain it in confronting, accurate engagement with the lower receiver side.

Figure 4:
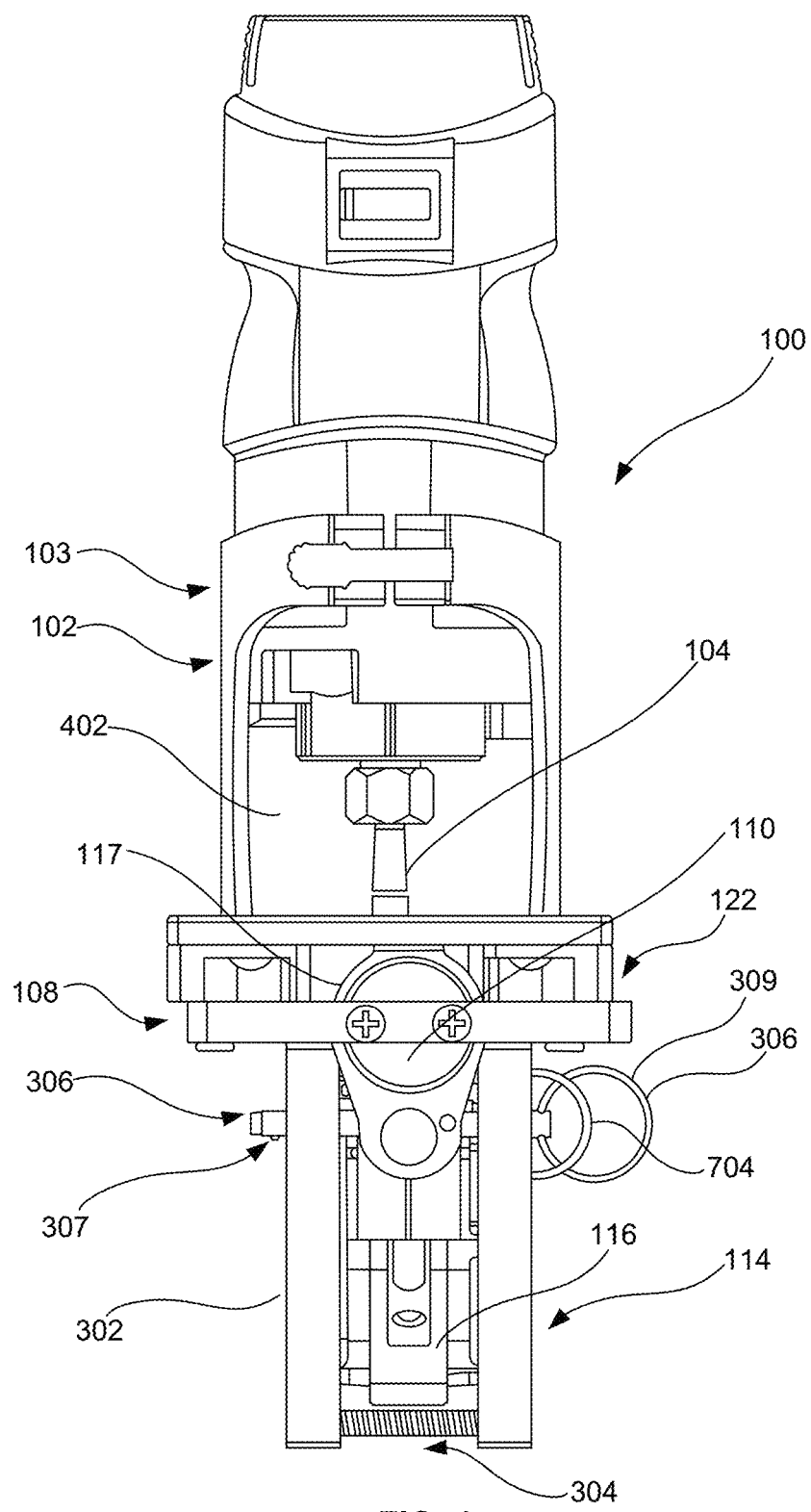
FIG. 4 is a rear view of the improved jig, according to the illustrative embodiment.

With reference to FIG. 4 a rear view of the assembled jig 100 is shown in operation on the lower receiver 116. The carriage plates 114, 302 are situated on their respective sides of the lower receiver 116 and are held in place by removable pins 306 and 704. Each of the pins is removably locked in place by a detent 307 located at one end and a ring 309 at the other. Opening 402 in the tool mount 103 serves to provide air circulation within the area of the machining, a portal for the egress of machining debris and a visible window to allow a view of the machining in process.

Figure 5:
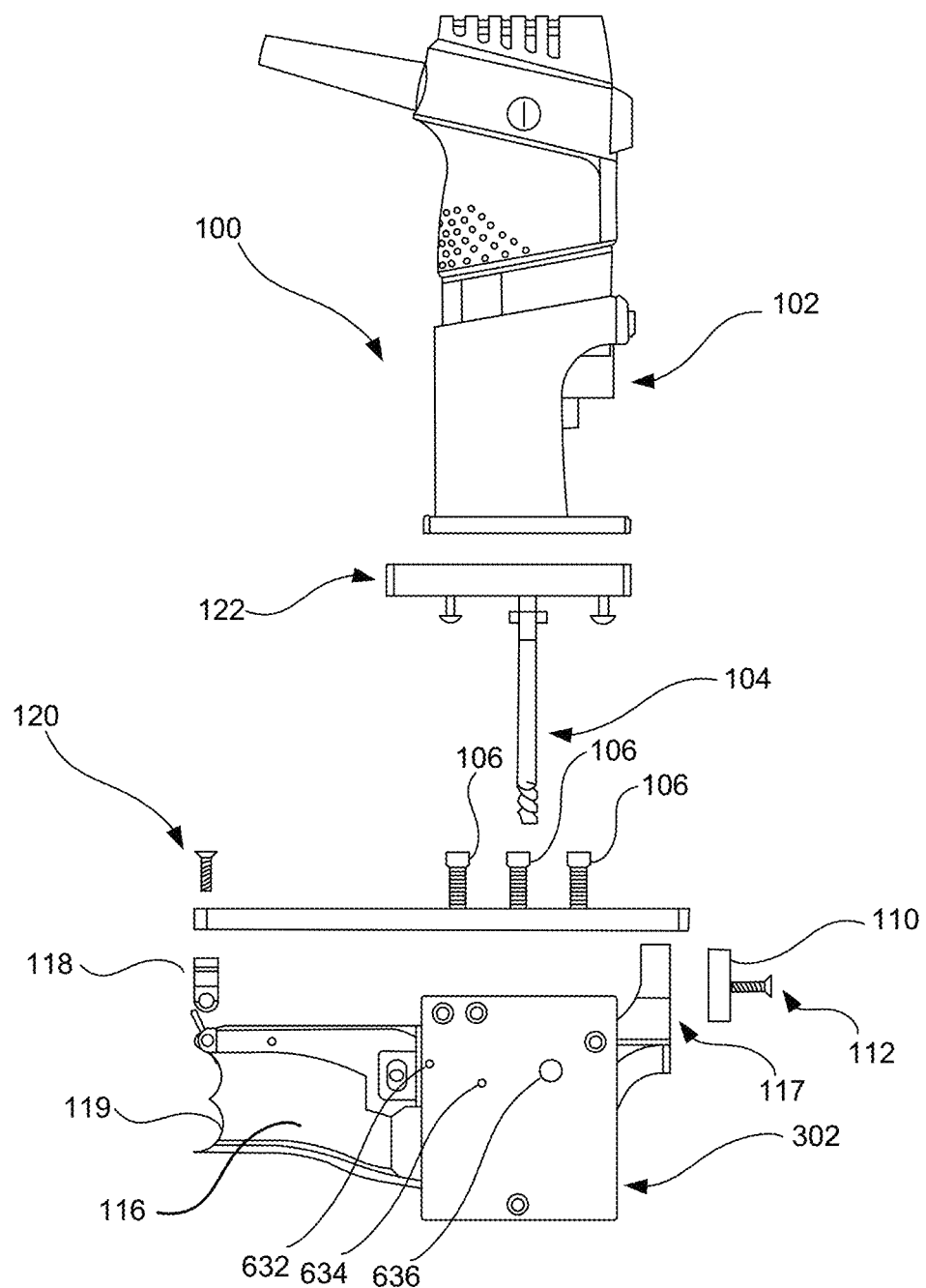
FIG. 5 is an exploded left side view of the improved jig, according to the illustrative embodiment.

FIG. 5 is an exploded left side view of the jig 100 in an assembled state, with a rotary power tool 102, a rotary power tool adapter 122, a rotary tool 104, a guide plate 108, a rear support 110, a left carriage 302, a lower receiver 116, a front support 118 and related mechanisms. The buffer mount 117 protrudes through guide plate 108. Plates 108 and 122 support the rotary power tool above the lower receiver 116 such that the rotary power tool is not resting upon the lower receiver.

As described above, the left carriage plate 302 is also provided with three drill guide holes, 632, 634, 636, for the location of and drilling of pivot/pin holes into the lower receiver 116 that are aligned with the right carriage holes 132, 134 and 136, respectively and define the same dimensions. In embodiments in which a pin/pivot defines different diameters on each side, or is eccentric the diameter or placement of the left carriage hole can vary relative to that of the right carriage hole.

Figure 6:
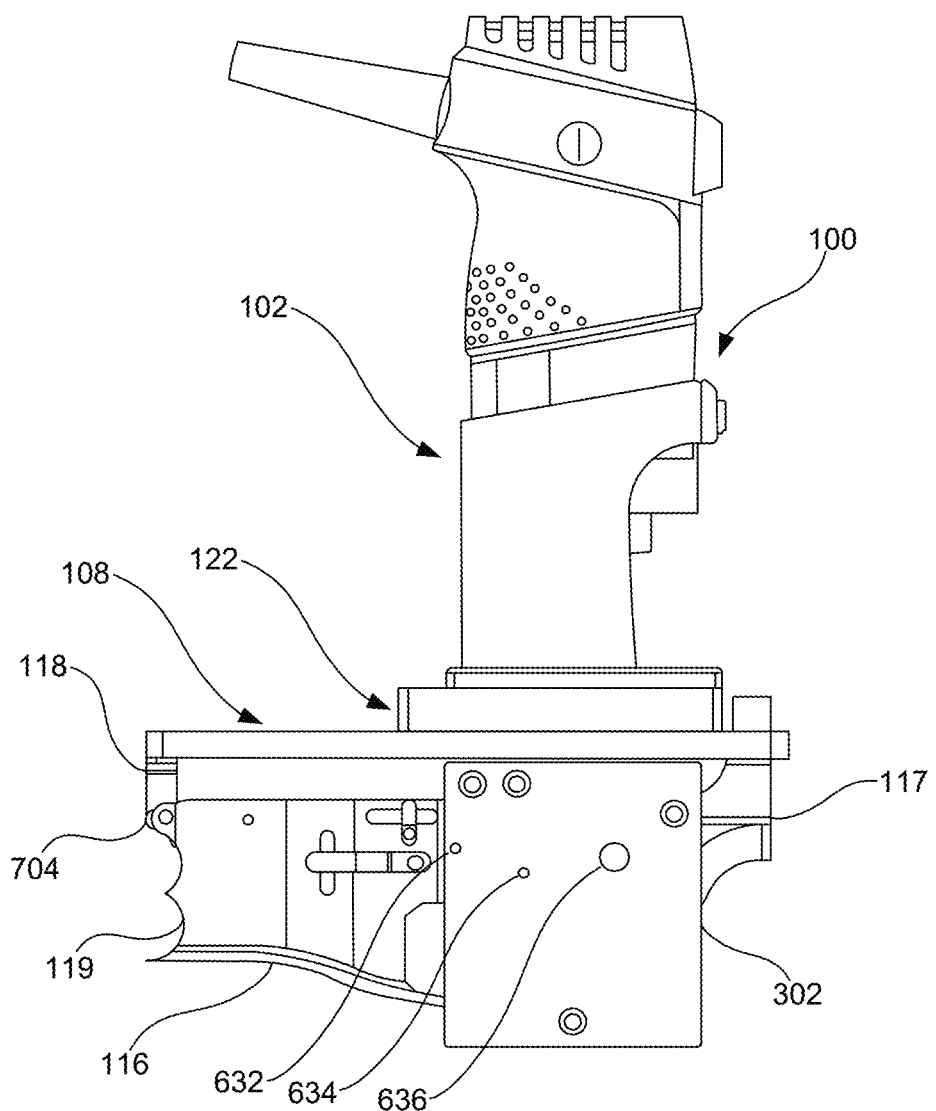
FIG. 6 is a left side view of the improved jig, according to the illustrative embodiment.

FIG. 6 is a collapsed view of FIG. 5 illustrating; a rotary power tool 102, a rotary power tool adapter 122, a guide plate 108, a left carriage 302, a lower receiver 116 and a front support 118.

Figure 7:
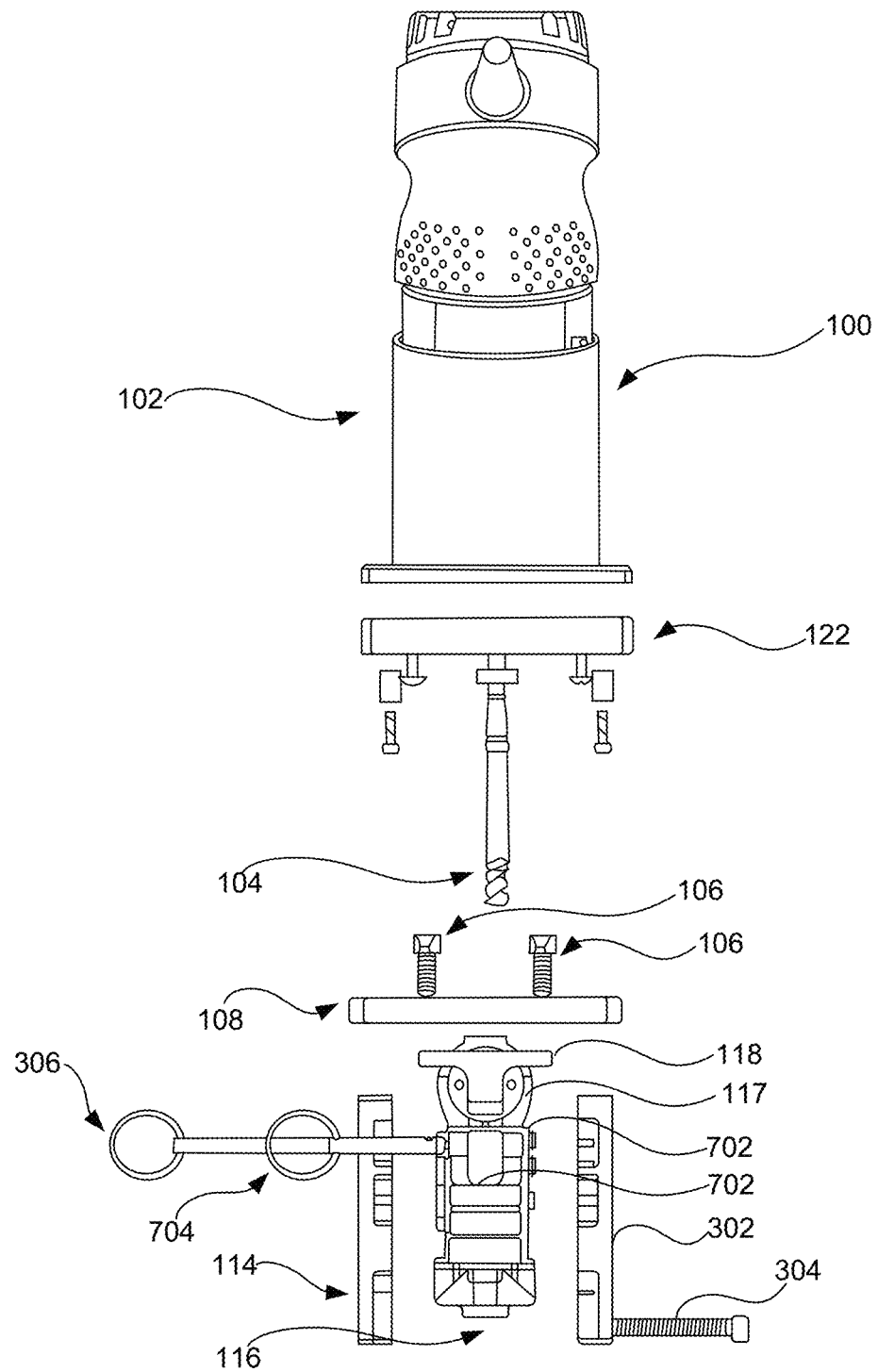
FIG. 7 is an exploded front view of the improved jig, according to the illustrative embodiment.

FIG. 7 is an exploded front view of the illustrative jig 100. Pin 704 is positioned to be inserted through takedown pin mounts 702, such that the pin 704 passes through the front support 118 and the pin mounts 702, thereby locking the front support 118 to the lower receiver 116. The pin mounts are through holes in the lower receiver 116. In another embodiment, pins 306 and 704 can define a bolt with a removable nut for locking the bolt in place.

Figure 8:
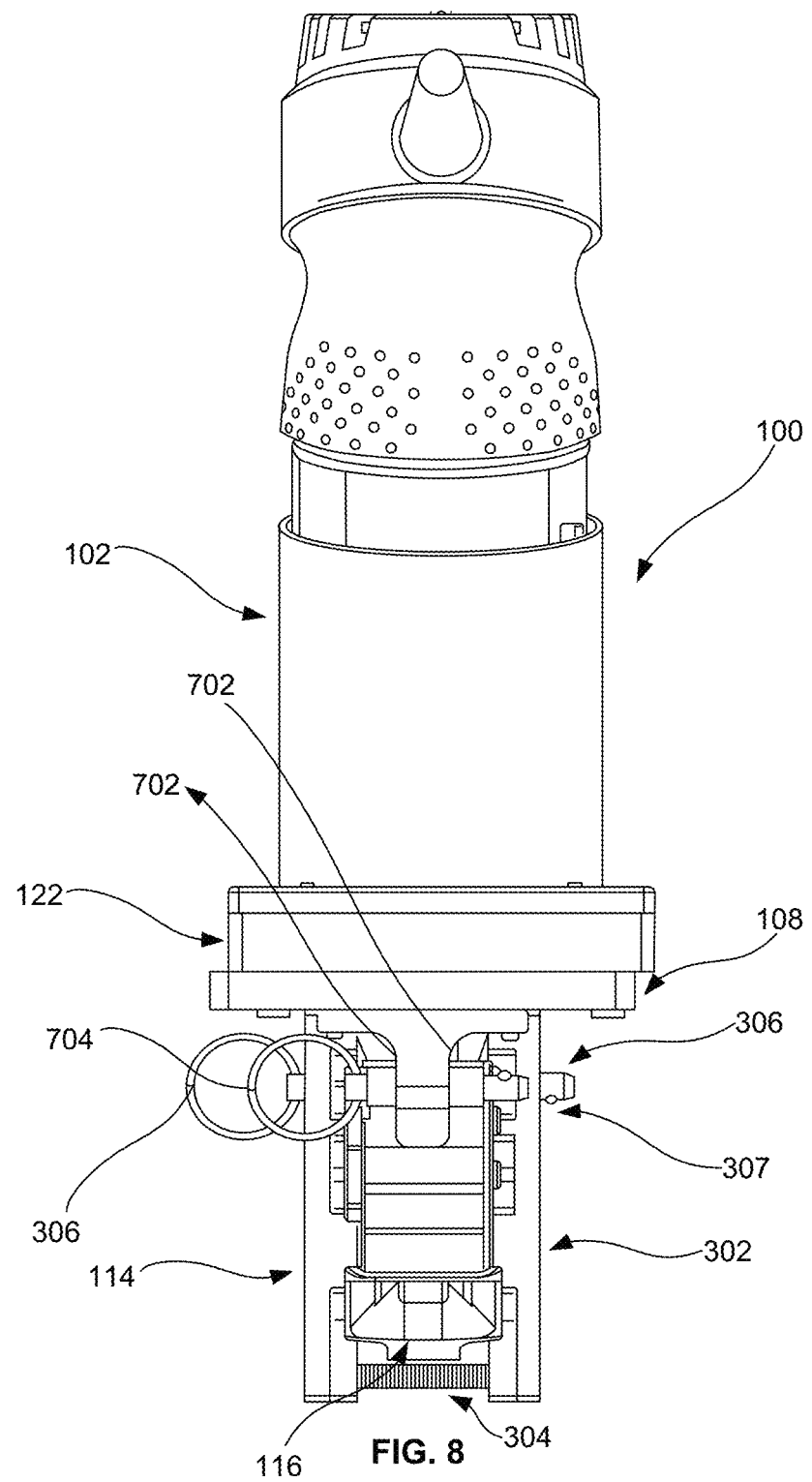
FIG. 8 is a front view of the improved jig, according to the illustrative embodiment.

FIG. 8 is a collapsed view of the jig 100 with particular attention called to the placement of the locating pins 306, 704 in the pin mounts 702 and are held in place by detents 307. The locating pin 306 is removable and is situated in a location along the front and rear takedown pin holes of a firearm receiver that is not threaded and is provided with at least one of a pull, a string or other handle for firearm lower receiver manufacturing.

Figure 9:
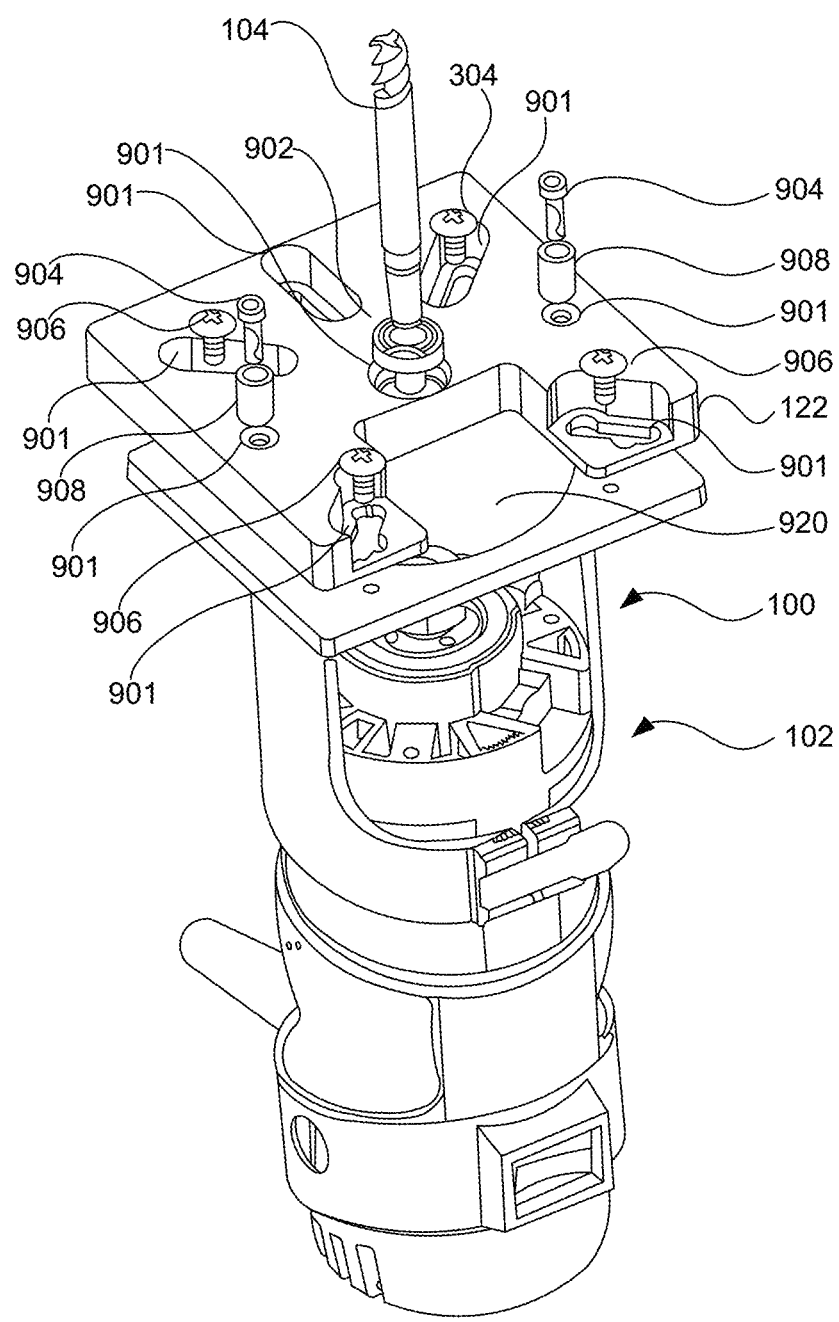
FIG. 9 is a exploded perspective view of the improved jig, according to the illustrative embodiment.

FIG. 9 is a bottom view of the jig 100. The bottom surface of adapter 122 includes a plurality of wells 901 of various sizes, angles and shapes disposed across the surface of the adapter 122. A rotary power tool support bearing 902 is inserted into the rotary power tool adapter 122 (for example—using a press or other biasing device) in a circular well 901 located near the center point of the adapter 122. Bearing 902 allows movement of a rotary power tool which further supports the rotary tool, thereby increasing rigidity, user control, and thus, quality. The rotary tool 104 is then inserted into the rotary tool support bearing 902 and the rotary power tool adapter 122 is connected to the rotary power tool 102 by inserting adapter screws 906 into their respective wells 901 in the adapter 122 and tightened into adapter 103. The guide pins 908 are connected to the adapter 122 by inserting an adapter screw 904 through the guide pins 908 and tightened into the adapter plate. The above thus defines the components of the tooling assembly.

In use, the rotary power tool 102 and mount 103 and adapter 122 are placed on top of the guide plate 108 and assembled, as described above, to form the jig. The guide pins 908 are placed into the guide cavities 1202 located within the guide plate 108. The rotary tool 104 protrudes by a predetermined length from adapter 122 so as to interface with the lower receiver 116 situated below guide plate 108. The geometry of the walls of the lower receiver are generally vertical, with the walls of each side parallel to each other up and down and front to back. This geometry provides an opportunity for the unskilled user to complete the machining of the receiver and the performance of the machining tools is optimized by the stability of the jig. The rotary power tool 102, adapter 122, rotary tool 104, guide pins 908, and connecting screws 904 and 906, are then guided within the guide cavities 1202. The location of the guide pins 908 and guide cavities 1202 are placed as to locate the rotary tool 104 in a predetermined location within the lower receiver 116 to achieve the desired results without placing the rotary tool 104 in direct contact with any components other than the lower receiver 116, thus reducing premature wear. Window 920 is a cutout slot at the rear of adapter 122 and provides visual and physical access to the lower receiver during machining operations, as well as preventing contact with the buffer mount 117.

Figure 10:
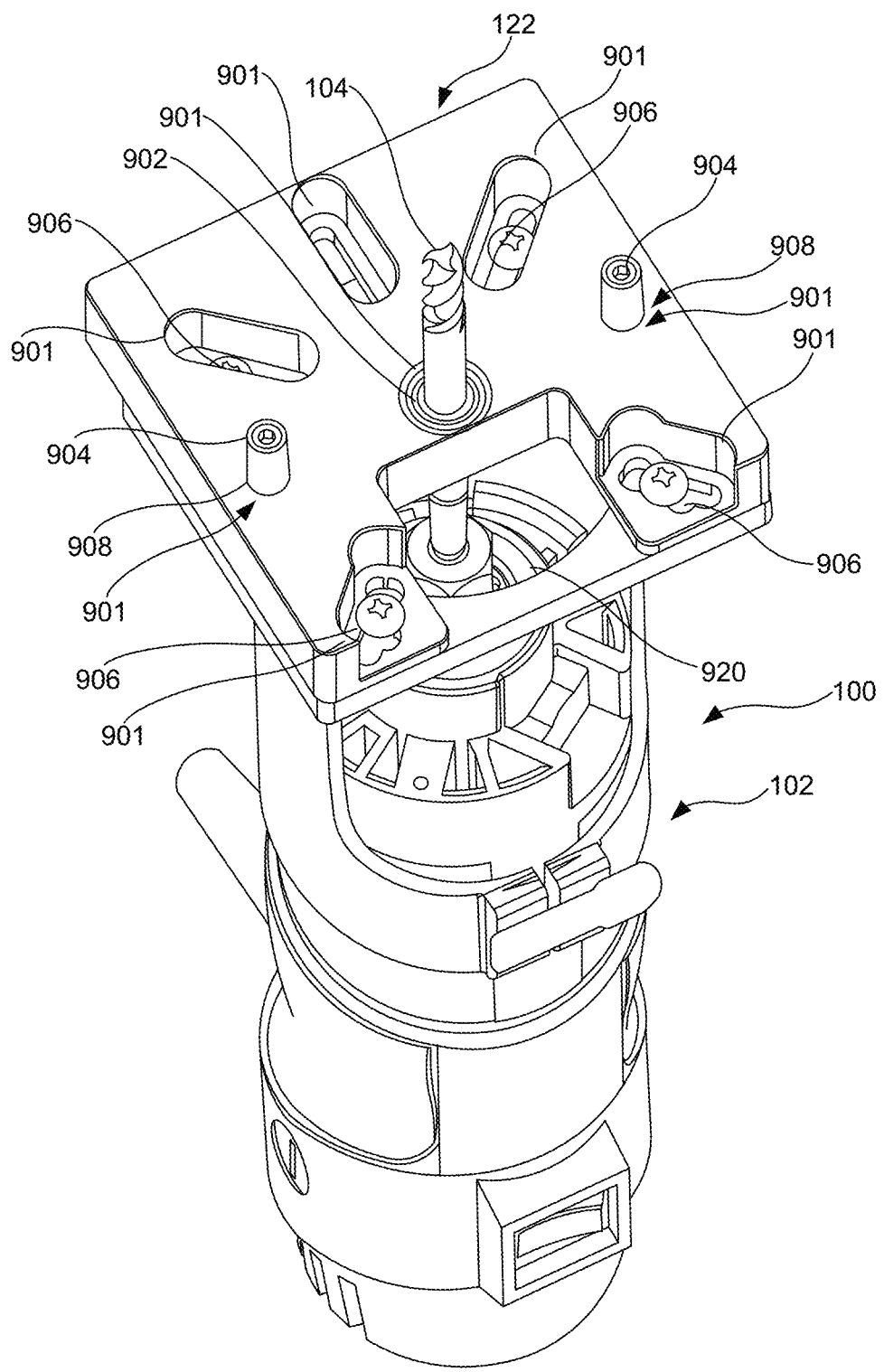
FIG. 10 is a perspective view of the improved jig, according to the illustrative embodiment.

FIG. 10 is a collapsed view of FIG. 9 showing the protrusion of the rotary tool 104. Window 920 is aligned to the rear of the jig.

Figure 11:
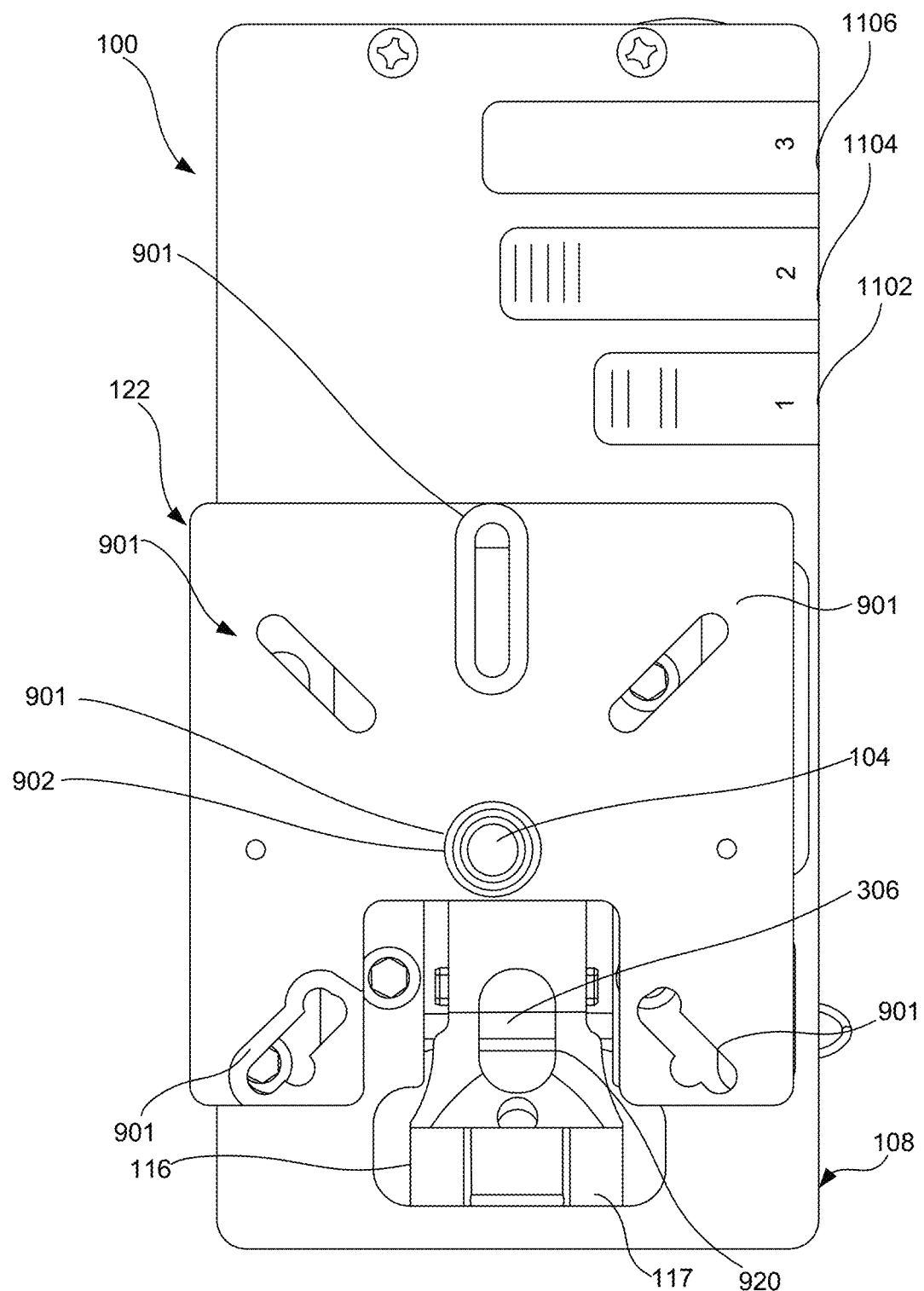
FIG. 11 is a top view of the improved jig, according to the illustrative embodiment.

FIG. 11 is a top view of the jig 100 without the rotary power tool. Indices 1102, 1104, 1106 are located along a surface of guide plate 108 and are depth references for the end milling process. Each of the indices is a cavity, as shown in FIG. 1. Indices 1102, 1104 and 1106 relate to three different lengths for guide pins and the guide cavities are stepped at three different heights so that as the pins get longer, the guide describes a smaller area. The alignment of the view of FIG. 11 is that the top of the view is the front of the jig and the bottom of the view corresponds to the rear of the jig. Buffer mount 117 is depicted as protruding through guide plate 108.

Figure 12:
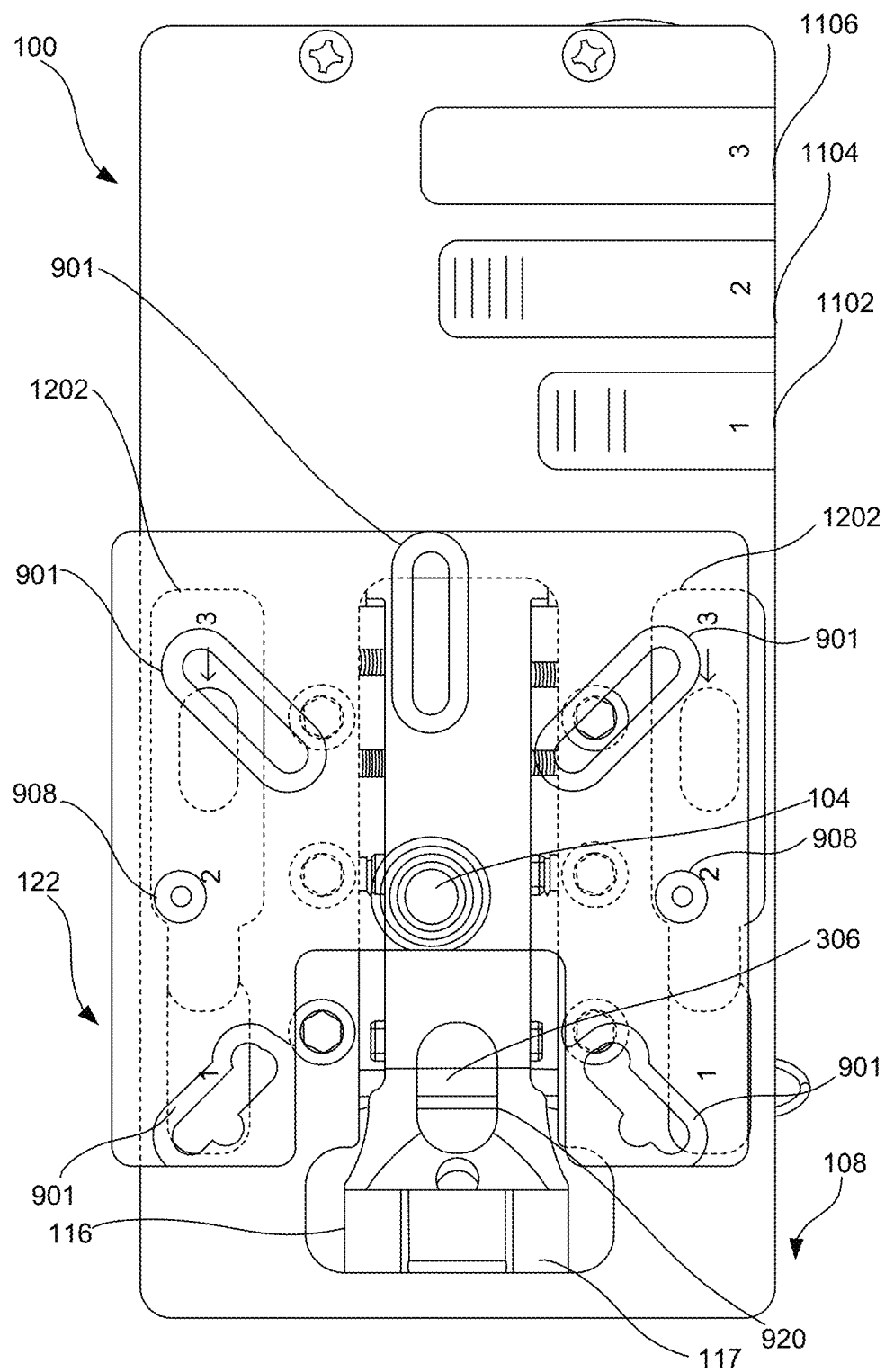
FIG. 12 is a top view of the improved jig, according to the illustrative embodiment.

FIG. 12 is the same view as FIG. 11 with the rotary power tool adapter viewed as semi-transparent, allowing a better view of a rotary tool 104, a guide plate 108 incorporating guide cavities 1202; a lower receiver 116 and guide pins 908 residing within their respective wells 901. The shape of the guide cavities 1202 corresponds to the shape of the internal walls of the lower receiver 116 such that when the rotary tool 104 is inserted into the lower receiver 116, the operator maneuvers the guide pins 908 against the walls of the guide cavities 1202 and can accurately machine the internal surfaces of the lower receiver 116.

In operation, the user places carriages 114 and 302 in a vise or other clamping device to hold steady. The protrusion depth of the rotary tool 104 is set using indices 1102, 1104, 1106. In practice, this is done by placing rotary tool 104 within the indices and aligning to the appropriate hash mark for the required milling step and moving the rotary power tool adapter 122 into contact with the edge of guide plate 108 therefore setting the protrusion depth to the appropriate hash mark relative to the bottom surface of adapter 122

The assembled rotary power tool 102, mount 103, rotary tool 104, adapter 122 and guide pins 908 are engaged with the guide plate 108 and guide cavities 1202. When the assemblies are placed atop each other with guide pins 908 within guide cavities 1202 the rotary power tool is switched on and rotary tool 104 begins to rotate at a high rate of angular velocity. The user grasps either the rotary power tool 102, mount 103 or adapter 122 and slide the adapter 122 along the guide plate 108. The protruding guide pins 908 contact the walls of the guide 1202 preventing rotary tool 104 from milling into the incorrect locations. This task is continued until guide pins 908 have been translated through the entire guide cavities 1202 removing all the material that rotary tool 104 has contacted within the lower receiver 116. The rotary power tool 102 is then switched off and the rotary tool 104 is allowed to come to rest. The assembled rotary power tool 102, mount 103, rotary tool 104, adapter 122 and guide pins 908 are then lifted off of the guide plate 108. The rotary tool 104 is then placed back into indices 1102, 1104, 1106 to adjust the protrusion depth to the next hash mark of the respective index. When the depth is properly set, the assembled rotary power tool 102, mount 103, rotary tool 104, adapter 122 and guide pins 908 are re-engaged with guide plate 108 and guide cavities 1202. The same procedure is followed to remove this material with rotary tool 104 from lower receiver 116. This procedure is similarly followed until all material is removed from lower receiver 116. Chips can be removed periodically during each cutting task using a vacuum or by rotating the receiver and jig assembly upside down.

In order to guide rotary 104 properly in lower receiver 116 to allow for proper function, guide cavities 1202 have additional cavities contained within them. For example, the entire guide cavity 1202 is milled to a depth greater than $\frac{1}{16}$ inch but less than $\frac{1}{8}$ inch. A further reduced area within guide cavity 1202 is milled to a depth greater than $\frac{1}{8}$ but less than $\frac{3}{16}$ inch. Yet another area within the reduced area is milled to a depth greater than $\frac{3}{16}$ inch. This allows for two reduced area cavities within the larger guide cavity 1202. Guide pins 908 can be interchanged with varying lengths to allow for the assembled rotary power tool 102, mount 103, rotary tool 104, adapter 122 and guide pin 908 unit to be engaged in either the full guide cavities 1202 or within the reduced area cavities within guide cavities 1202. If a guide pin 908 has a length greater than zero but less than $\frac{1}{8}$ of an inch, it would guide within the entire guide cavities 1202. If a guide pin 908 has a length greater than $\frac{1}{8}$ but less than $\frac{3}{16}$ of an inch, similarly it would guide within the reduced area within the guide cavities 1202. Finally, if a guide pin 908 has a length greater than ³⁄₁₆ of an inch it would be guided within the cavity within the reduced area cavity which is within the guide cavities 1202. With this arrangement, the assembled rotary power tool 102, mount 103, rotary tool 104, adapter 122 and guide pins 908 can guide the rotary tool 104 to various shapes within the lower receiver by interchanging the guide pins 908 length.

FIGS. 13-19 depict various methods with reference to FIGS. 20-27.

Figure 13:
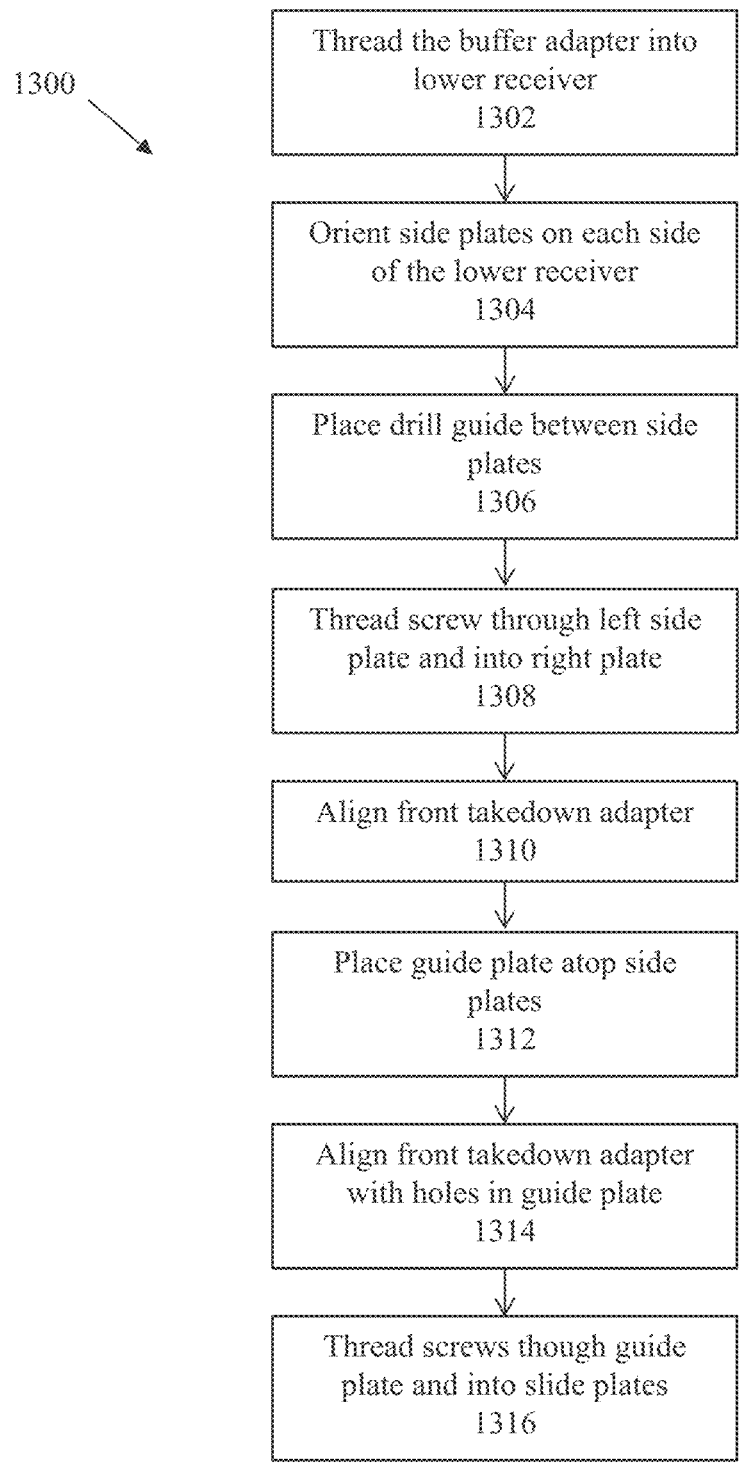
FIG. 13 depicts a method of jig assembly according to one or more aspects of the disclosure.

FIG. 13 depicts a method 1300 of jig assembly according to one or more aspects of the disclosure.

Figure 21A:
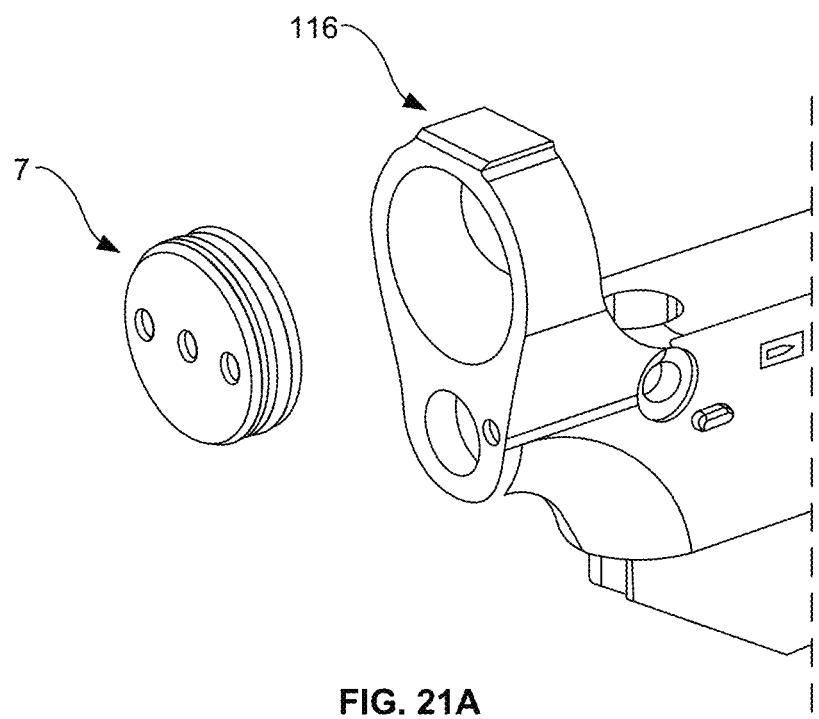
FIGS. 21A-P depict various stages of the method of FIG. 13.
Figure 21B:
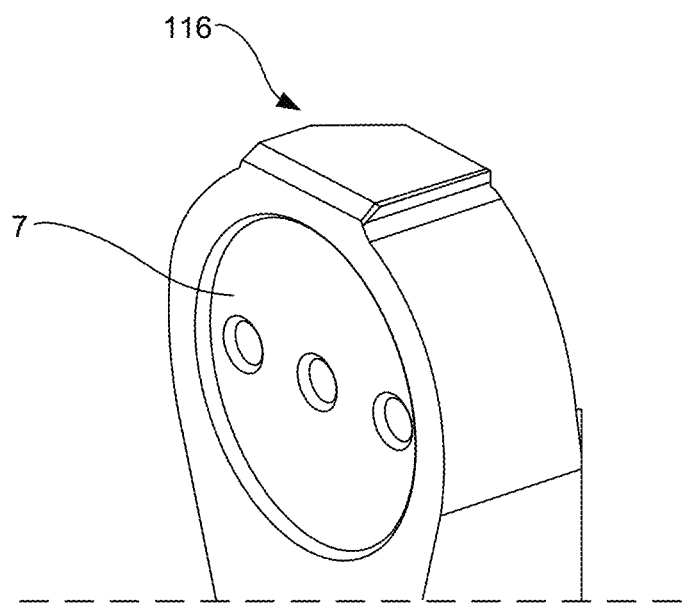

At block 1302, and with reference to FIGS. 21A-B, thread the buffer adapter 7 into lower receiver. The buffer adapter 7 should sit just below surface of the lower receiver with threaded holes sitting horizontal. If the buffer adapter 7 is difficult to thread, #8-32 screws 15 can be installed for leverage.

Figure 21D:
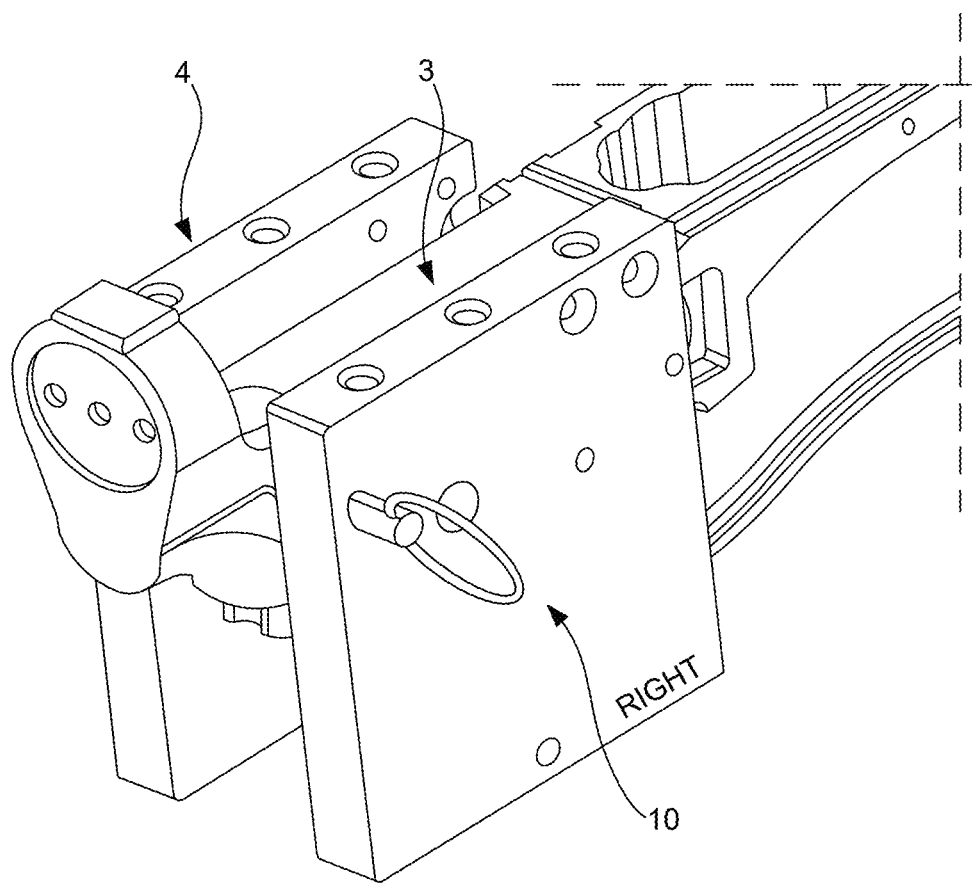

At block 1304, and with reference to FIGS. 21C-D, orient side plates 3, 4 on each side of the lower receiver, taking note of right and left as it would be oriented in a shooting position. Insert long quick release pin 10 through right side plate, through receiver rear takedown, and out left side.

Figure 21E:
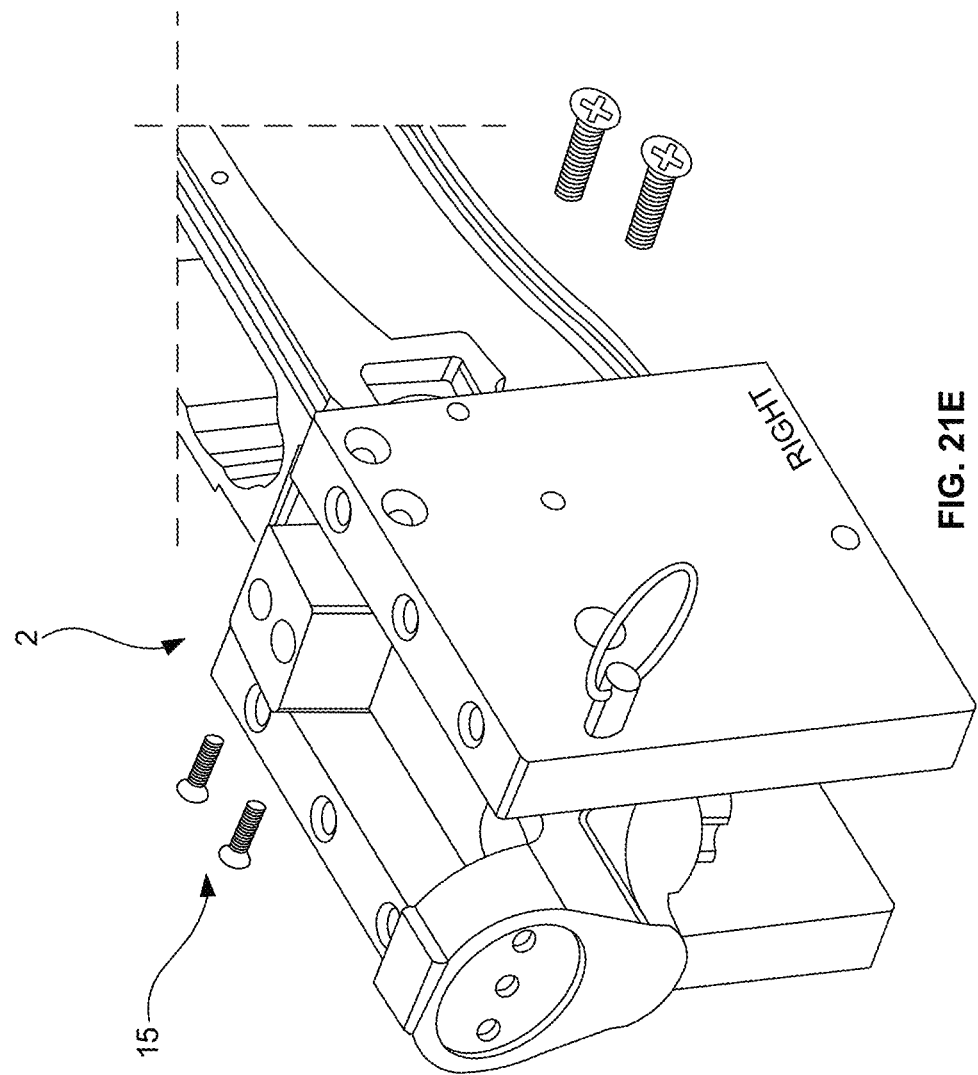

At block 1306, and with reference to FIGS. 21E-F, place the drill guide 2 between side plates as shown and align screw holes. It should align only one way. Pinch side plates against drill guide and tighten four #8-32 screws 15.

Figure 21G:
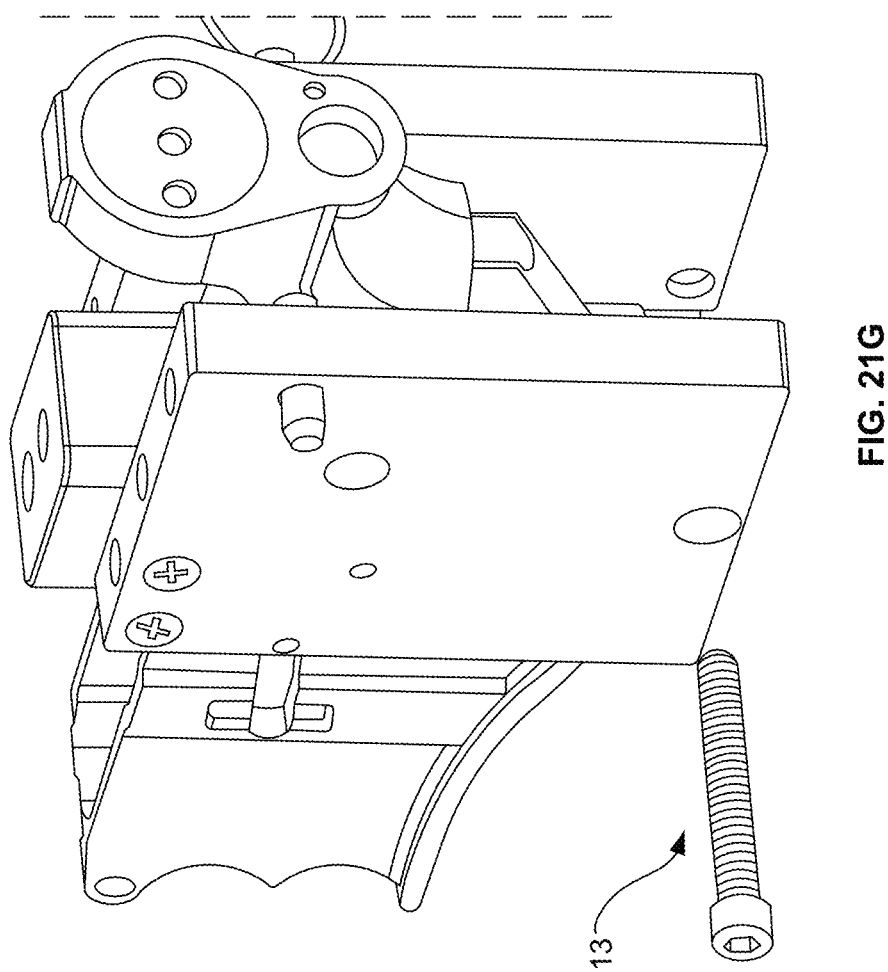
Figure 21H:
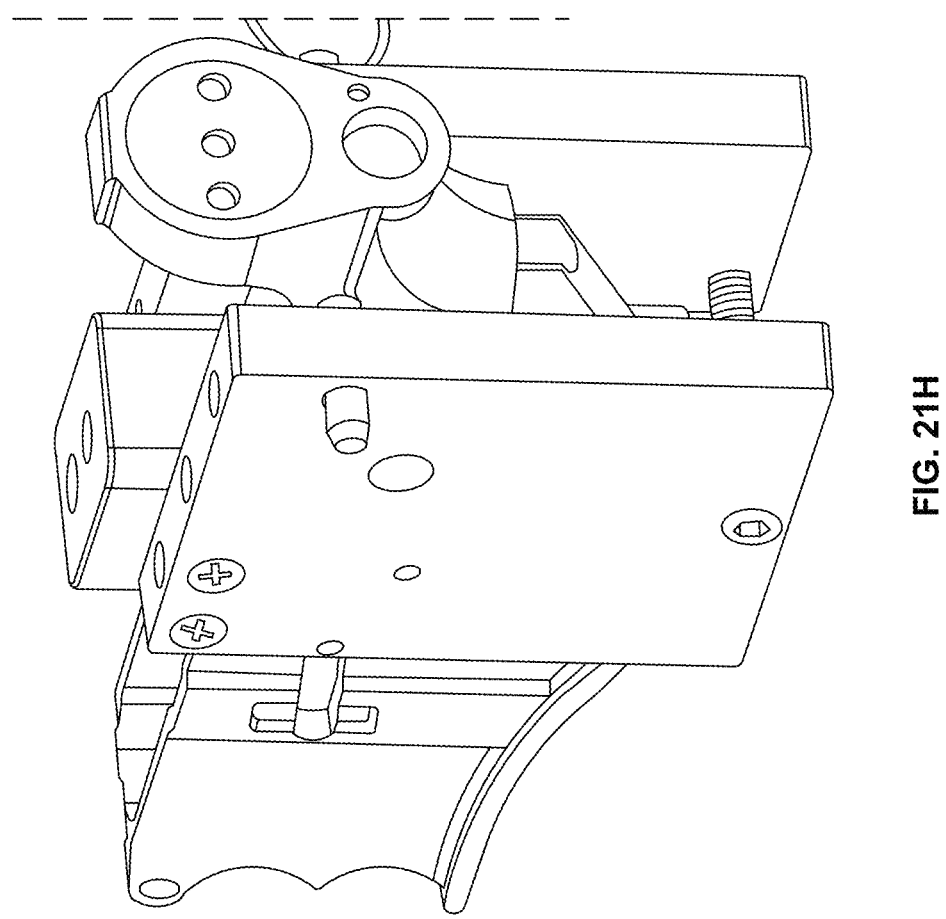

At block 1308, and with reference to FIGS. 21G-H, use ³⁄₁₆" Allen wrench to thread ¼-20×2" screw 13 through left side plate 4 and into right plate 3 using care not to cross-thread.

Figure 21J:
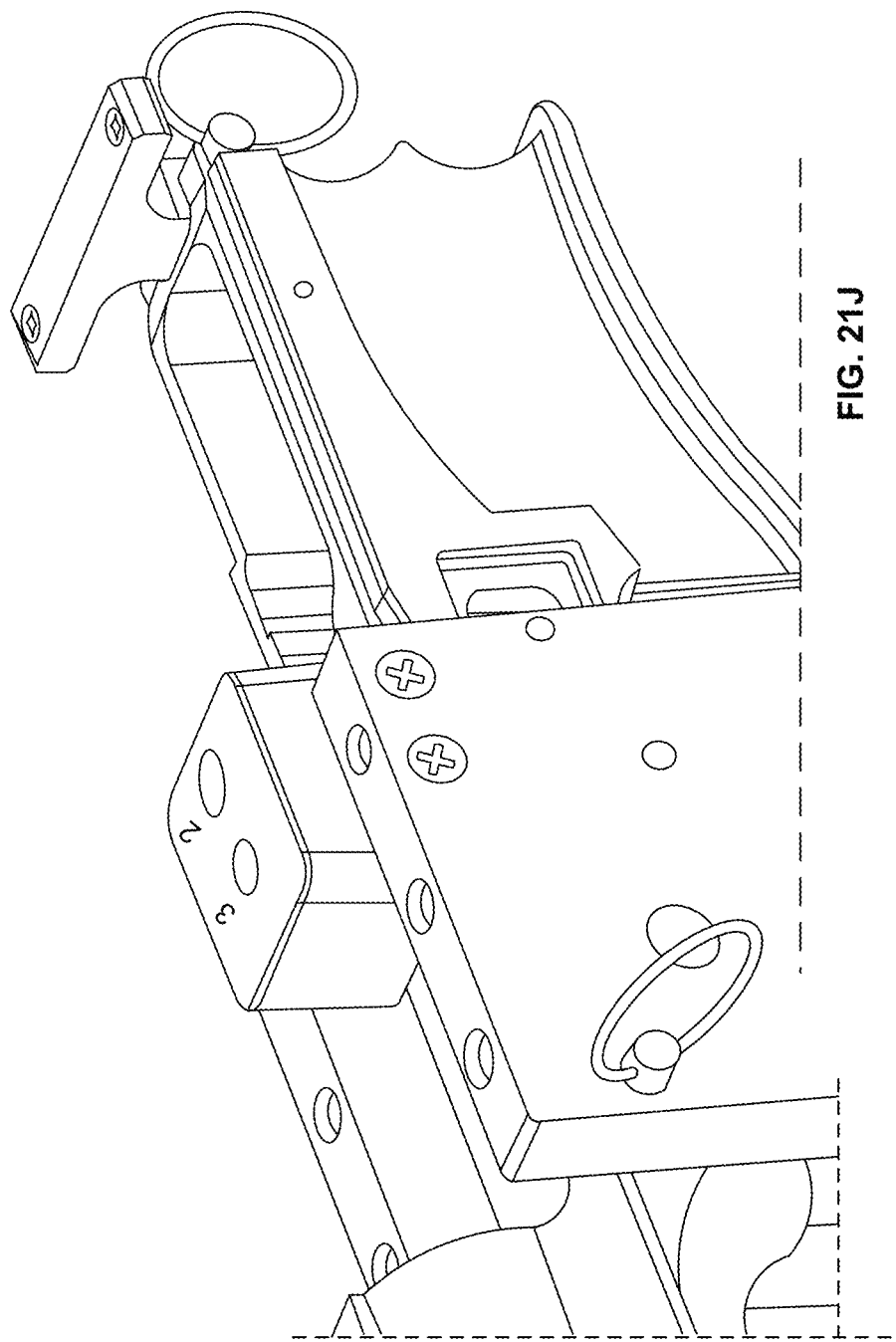

At block 1310, and with reference to FIGS. 21I-J, align the front takedown adapter 8 between front takedown holes. Push the short quick release pin 11 through receiver and adapter as shown.

Figure 21K:
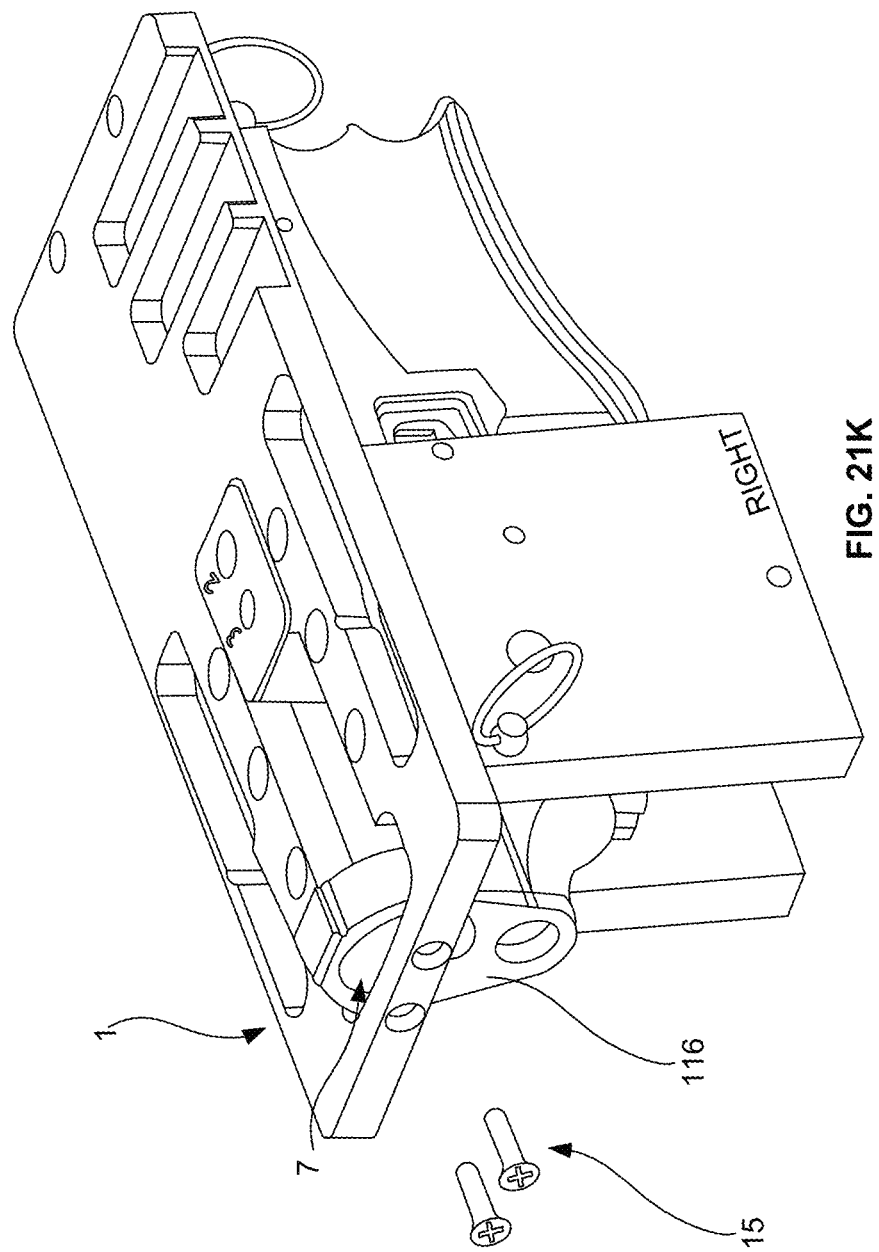
Figure 21L:
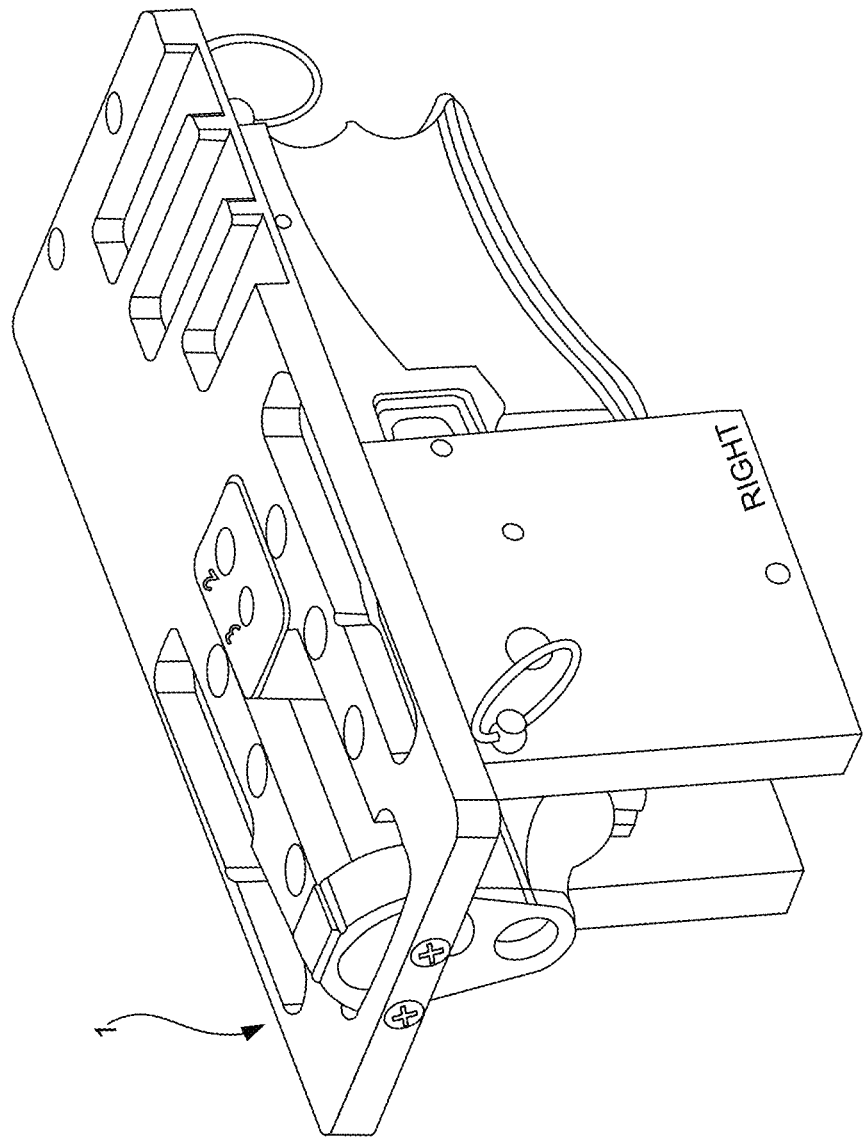

At block 1312, and with reference to FIGS. 21K-L, place the guide plate 1 atop side plates 3, 4 as shown. Align screw holes on guide plate 1 with buffer adapter 7 screw holes. Thread two #8-32 screws 15 and leave loose.

Figure 21M:
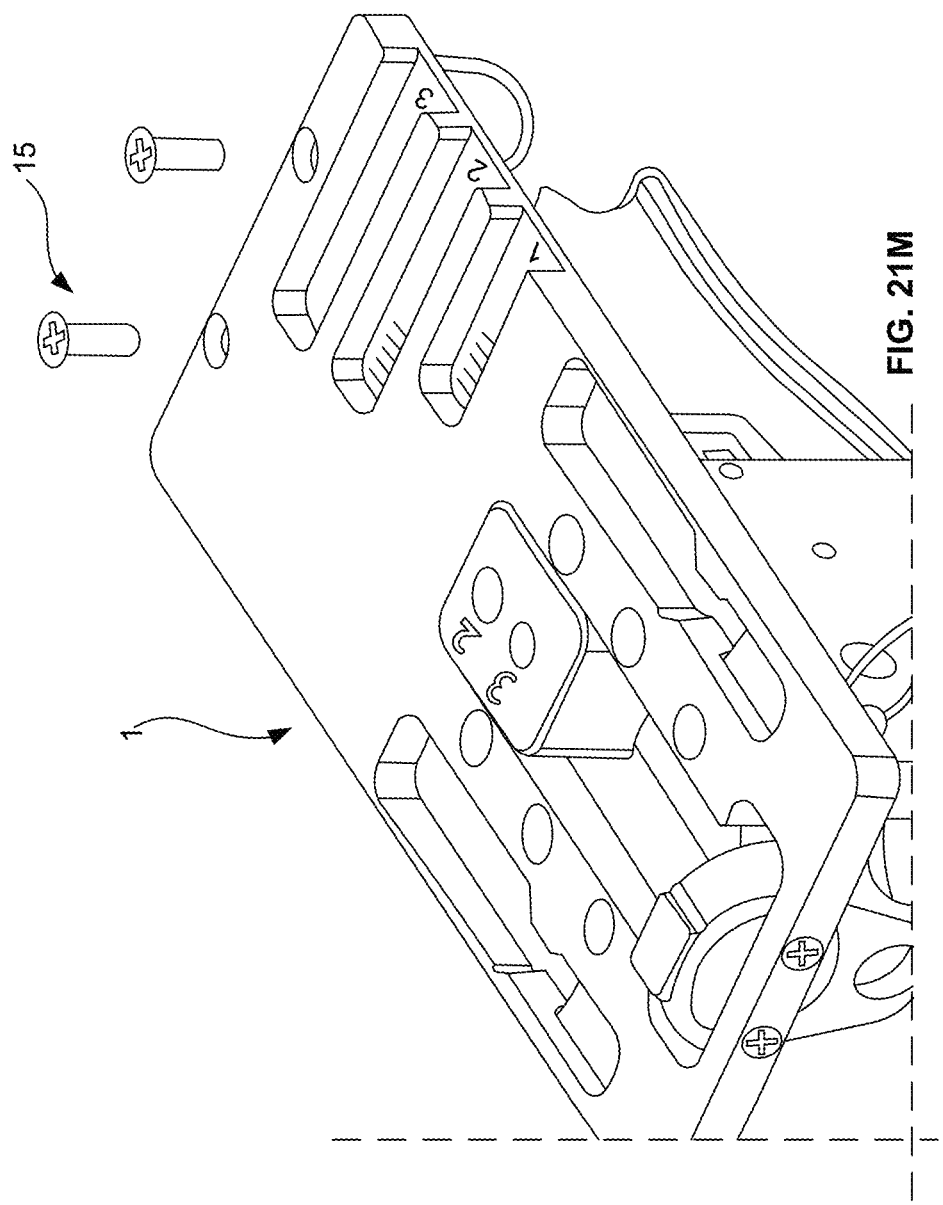
Figure 21N:
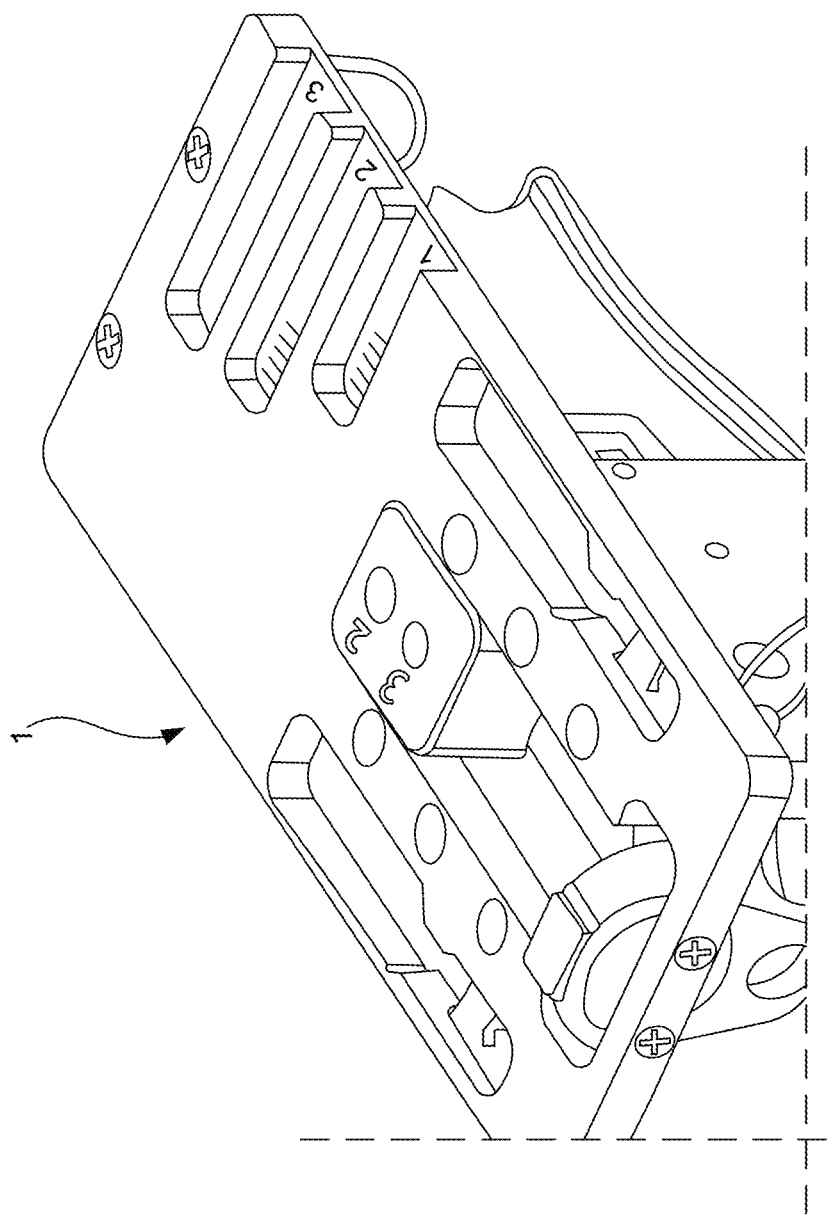

At block 1314, and with reference to FIGS. 21M-N, align front takedown adapter 8 (not shown) with holes in guide plate 1. Insert and tighten two #8-32 screws 15, tightening each screw a little at time. Now, tighten two #8-32 screws 15 from blocks 1302-1312. The buffer adapter 7 will self-center in buffer mount. Guide plate 1 may move as these are tightened. Allow guide plate to move freely during tightening.

Figure 21P:
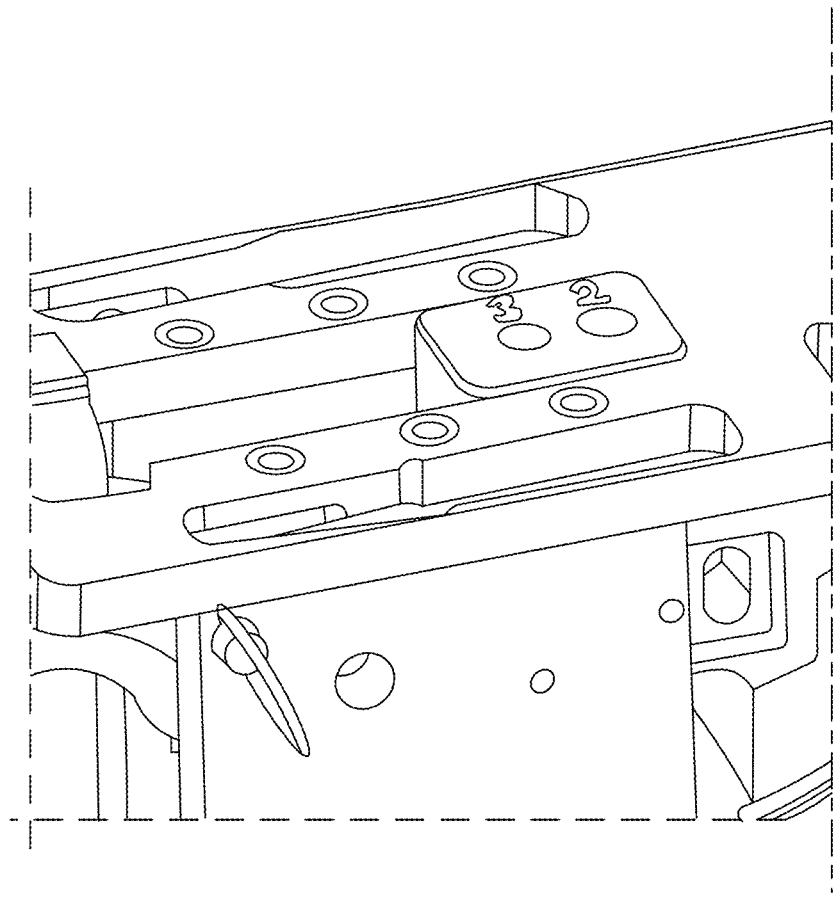

At block 1316, and with reference to FIGS. 21O-P, loosely thread six ¼-20×½" screws 14 through guide plate 1 and into side plates 3, 4. Tighten screws using ³⁄₁₆" Allen wrench. The jig assembly is now complete.

Figure 14:
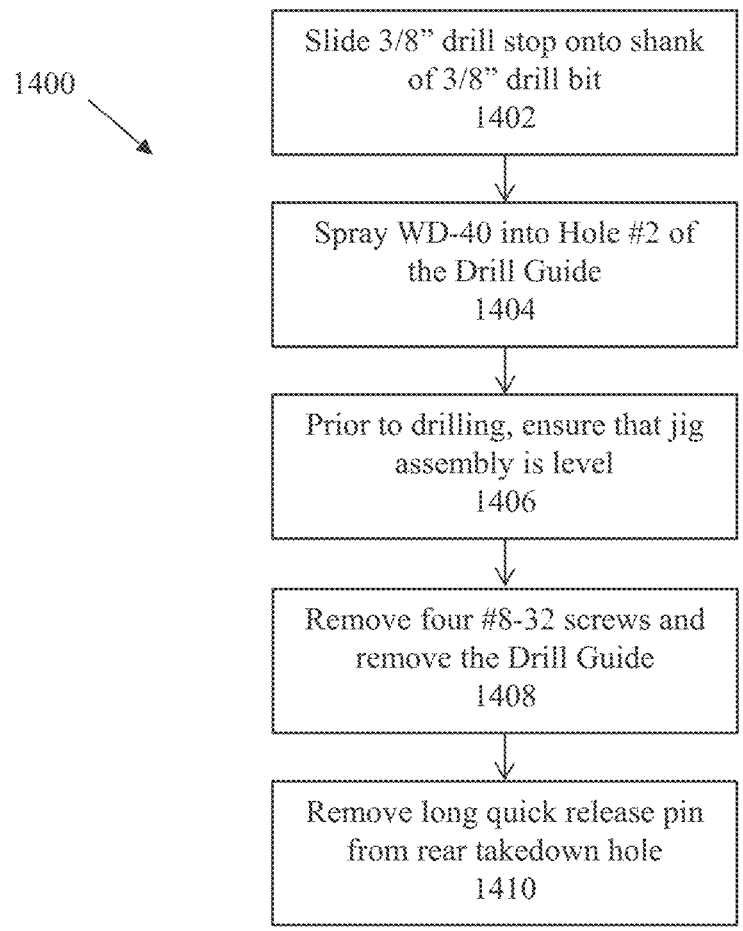
FIG. 14 depicts a method of drilling with a jig assembly according to one or more aspects of the disclosure.

FIG. 14 depicts a method 1400 of drilling with a jig assembly according to one or more aspects of the disclosure.

Figure 22A:
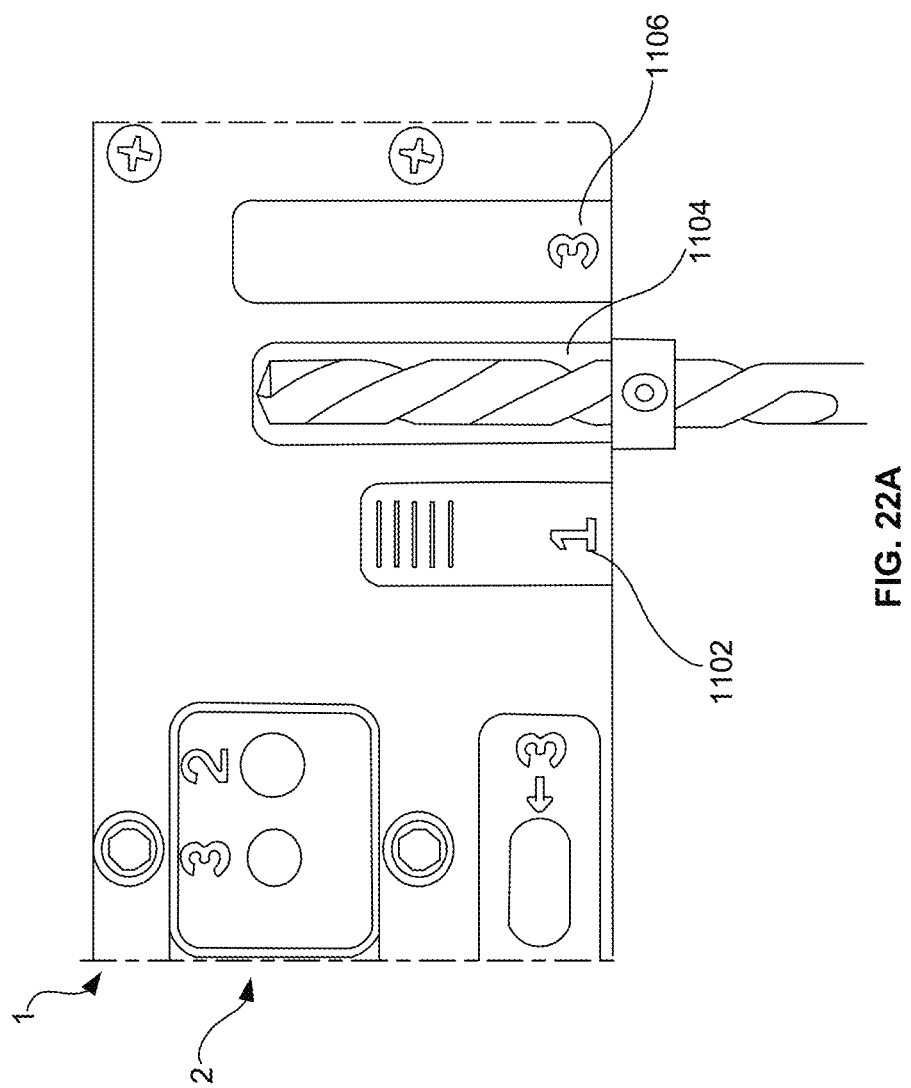

At block 1402, and with reference to FIG. 22A, slide ⅜" drill stop onto shank of ⅜" drill bit. Insert drill bit to full depth of depth gauge #2 1104. Place the drill stop against the edge of the guide plate 1. Secure drill stop onto drill bit.

At block 1404, and with reference to FIGS. 22B-C, spray WD-40 into hole #2 of the drill guide 2. Insert ⅜" drill bit into hole. Do not start drill until bit is fully inserted. Start drill and apply firm pressure. Periodically, lift drill to assist in chip removal. Reapply WD-40 as necessary. Stop drilling just before the drill stop touches the drill guide 2.

Figure 22E:
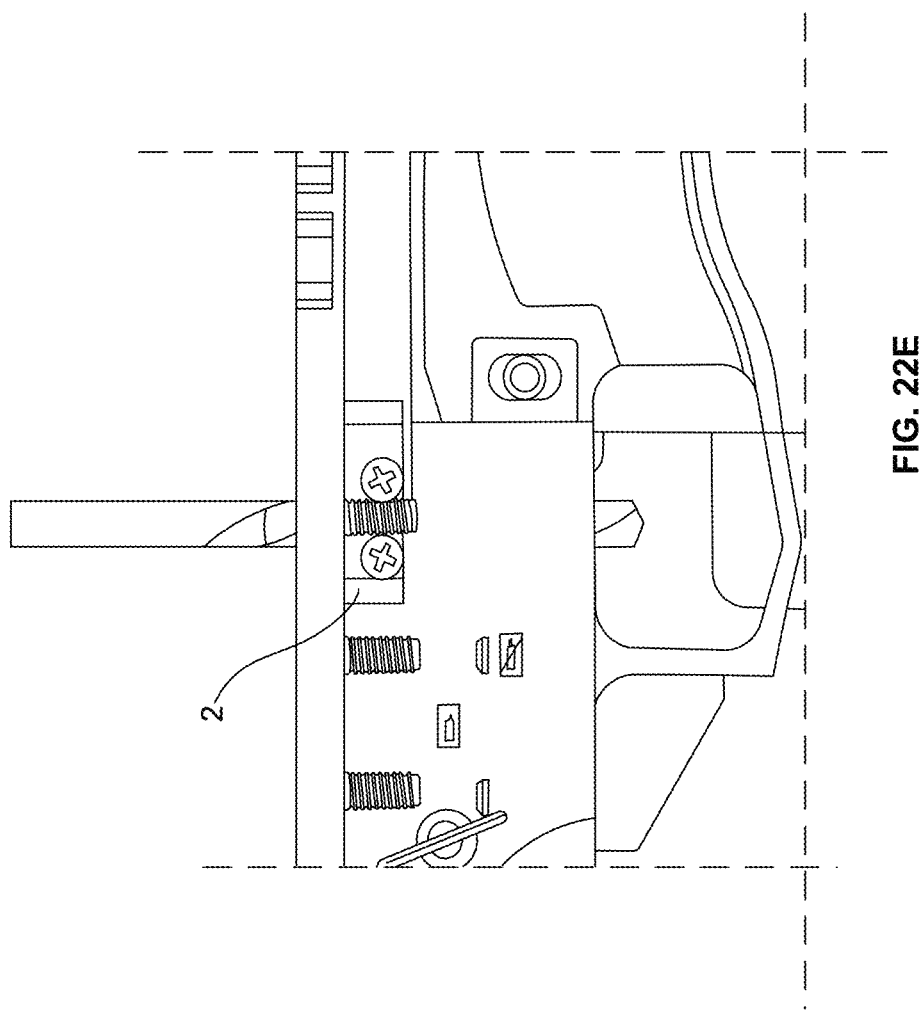

At block 1406, and with reference to FIGS. 22D-E, prior to drilling, ensure that jig assembly is level. Spray WD-40 into hole #3 of drill guide 2. Insert ⁵⁄₁₆" drill bit into hole. Do not start drill until bit is fully inserted. Start drill and apply firm pressure. Periodically, lift drill to assist in chip removal. Reapply WD-40 as necessary. Stop drilling when the drill bit exits the bottom of the fire control pocket. Take care not to drill into the trigger guard. In this example, keep the drill bit perpendicular to the lower receiver. Drilling at a large angle can result in an oblong trigger slot.

Figure 22F:
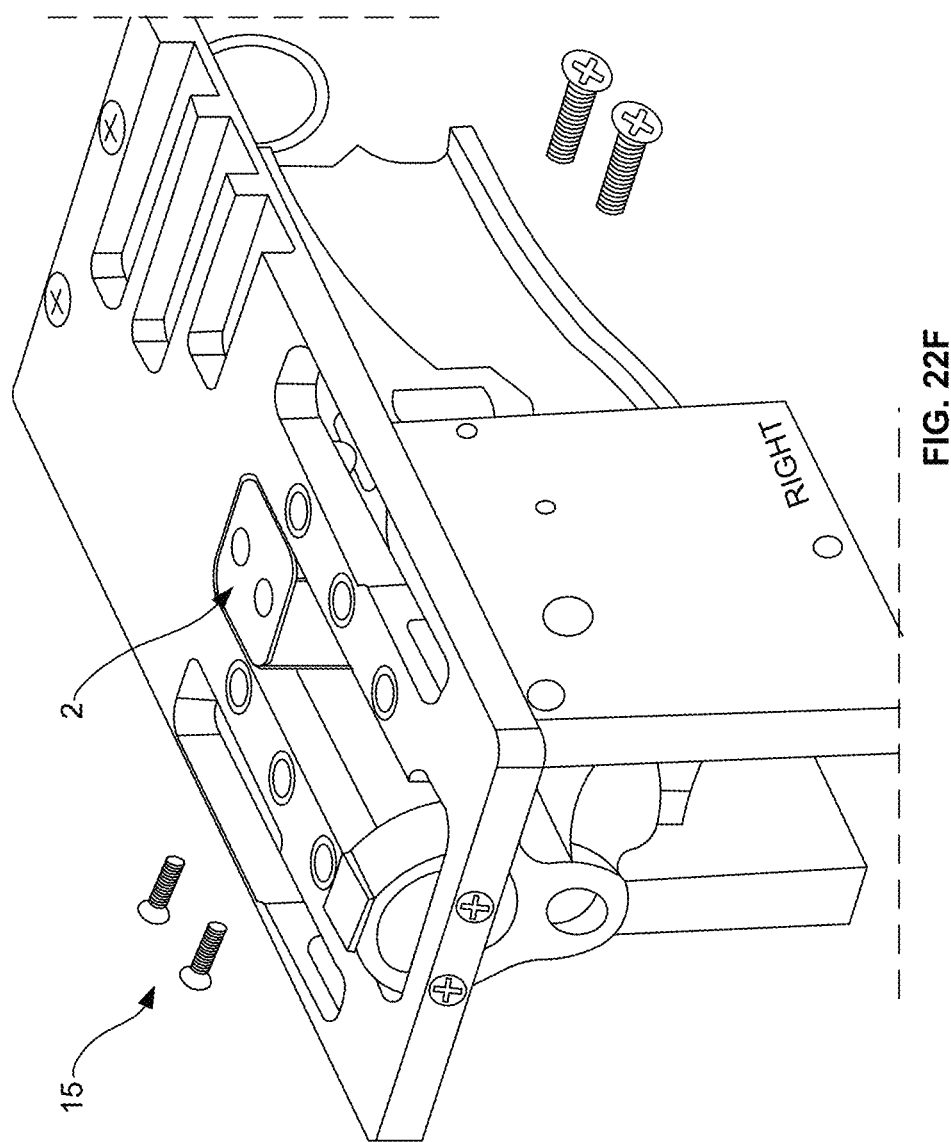
Figure 22G:
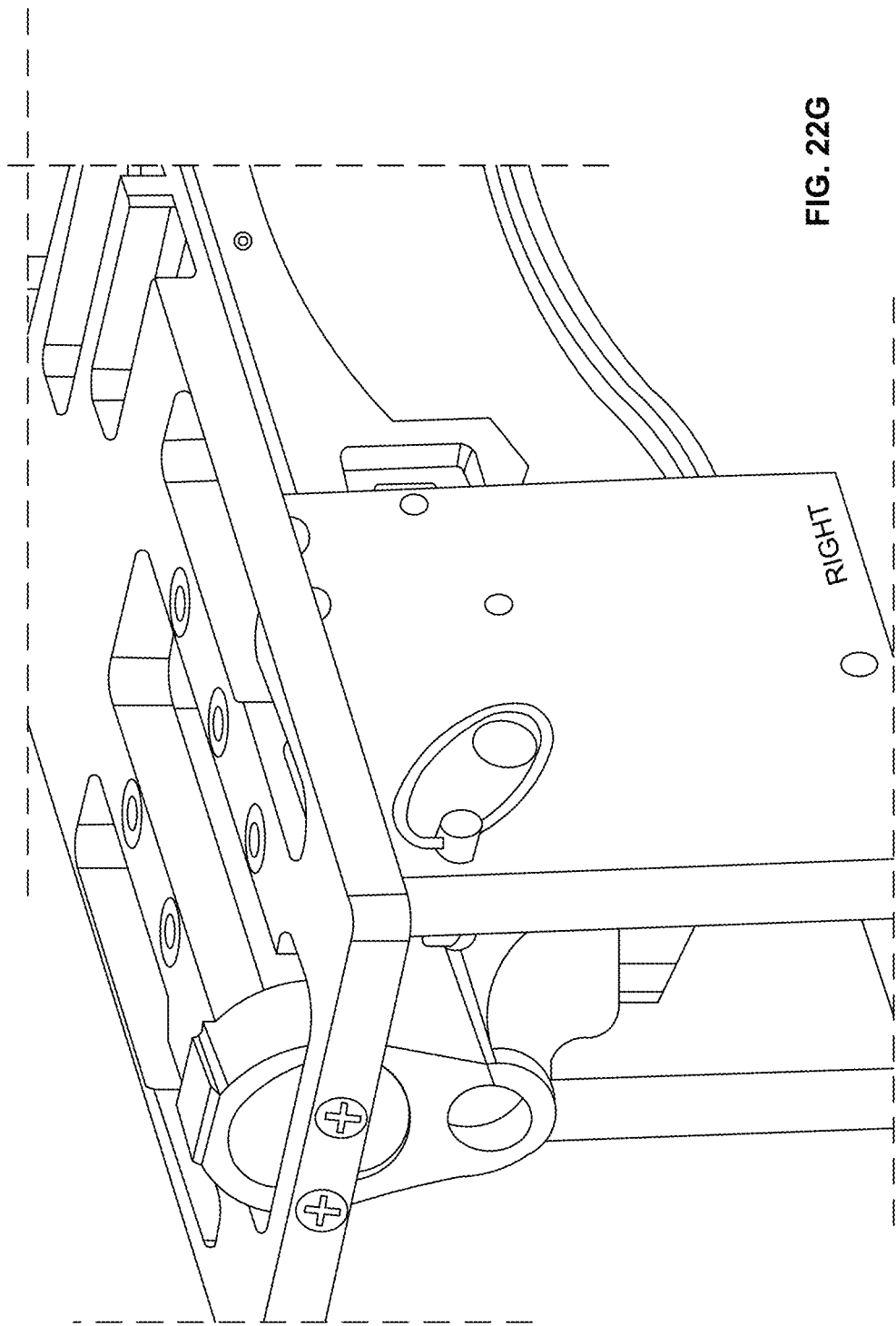

At block 1408, and with reference to FIGS. 22F-G, remove four #8-32 screws 15 and remove the drill guide 2. It may be necessary to loosen the vise and/or use a screwdriver to gently pry the drill guide from between the side plates. Insert the screw driver shank into hole #2 and gently pry upward.

Figure 22H:
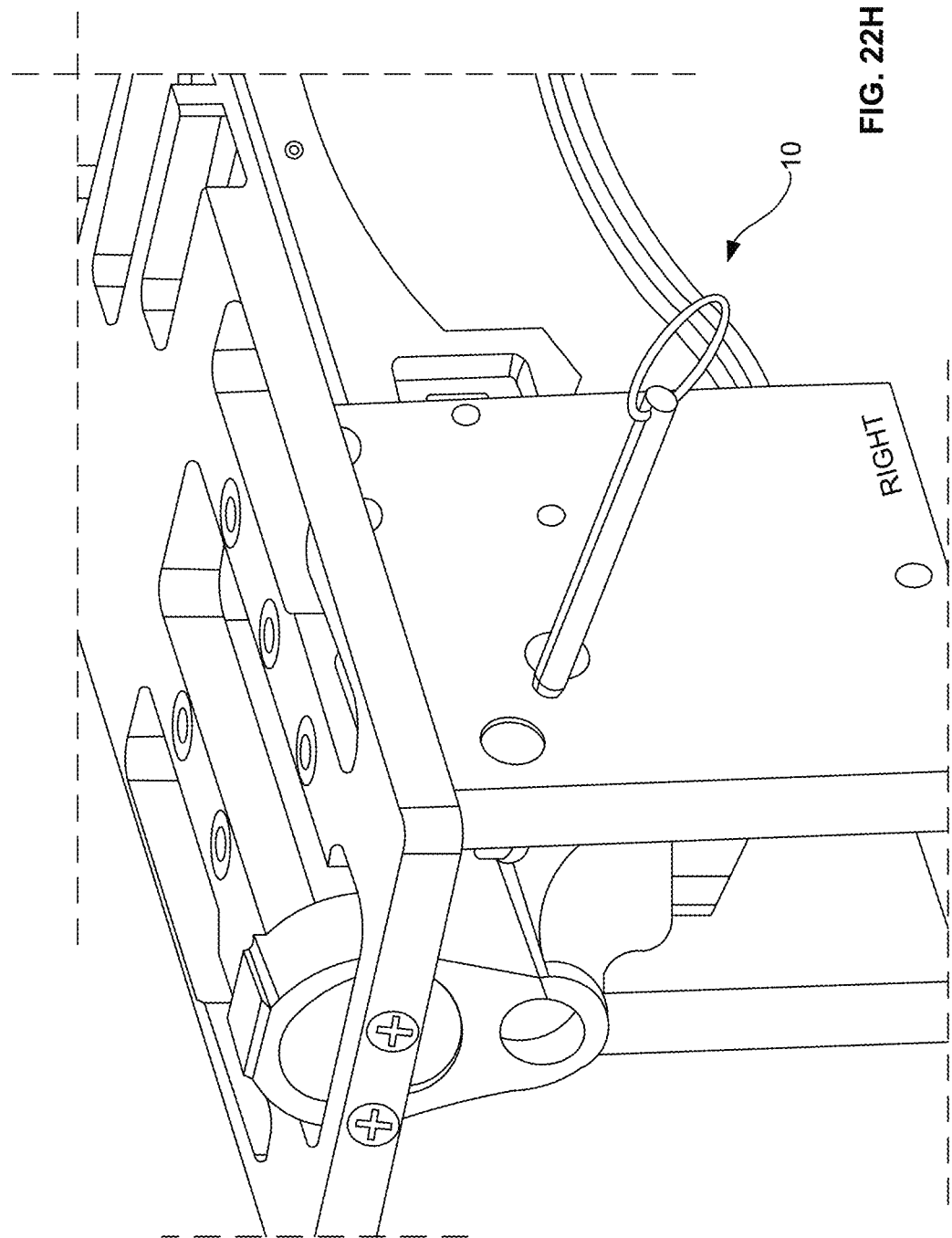

At block 1410, and with reference to FIGS. 22H-I, remove long quick release pin 10 from rear takedown hole.

Figure 15:
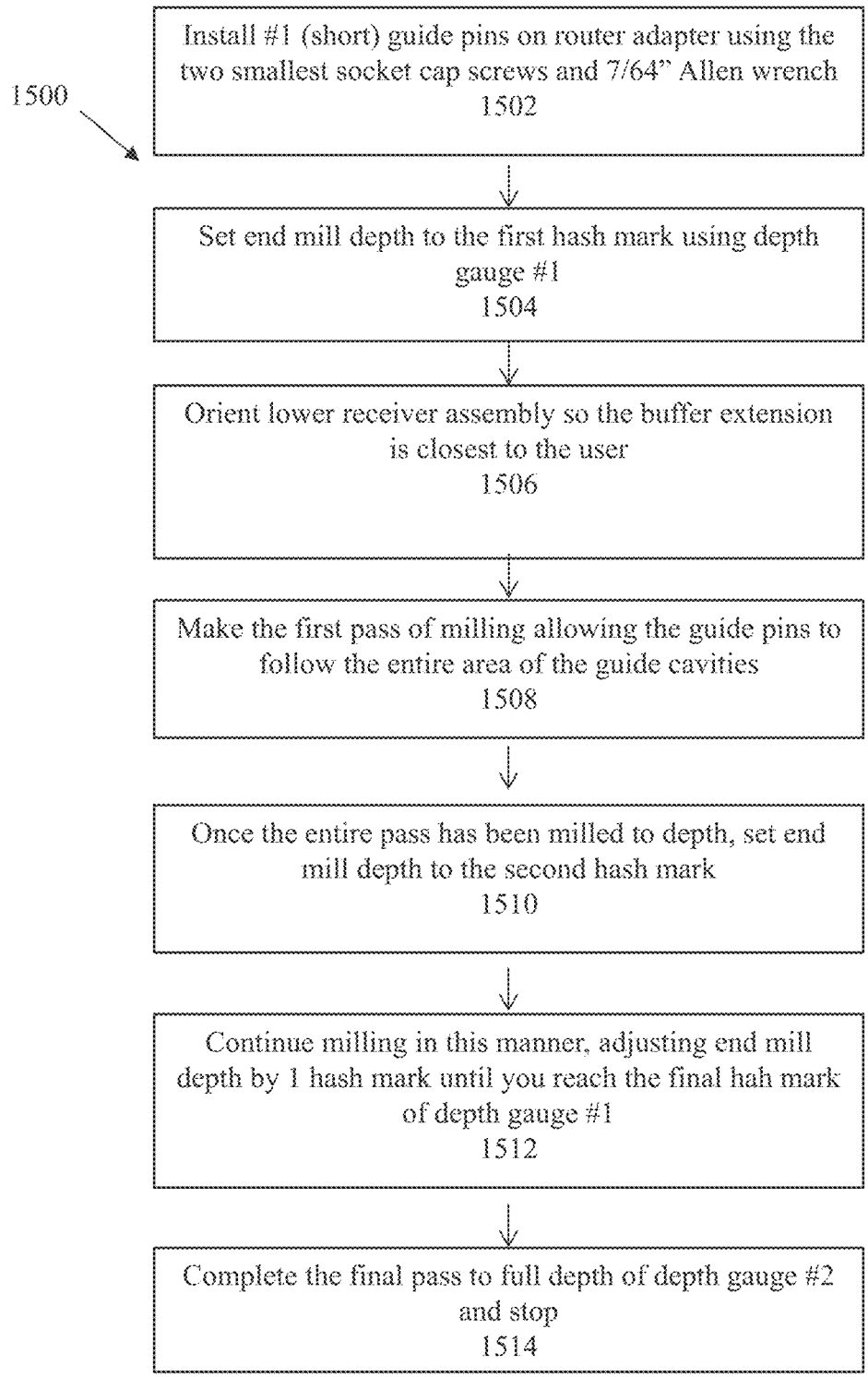
FIG. 15 depicts a method of milling with a jig assembly according to one or more aspects of the disclosure.

FIG. 15 depicts a method 1500 of milling with a jig assembly according to one or more aspects of the disclosure.

Initially, prepare your router for milling by installing the universal router adapter 5. If using a variable speed router, start router on slowest speed and gradually increase speed until optimal milling results are achieved. Generally speaking, this will equate to speed "2" to speed "4" on most variable models with "1" to "10" speed adjustments. Do not insert or remove router while it is spinning. Move router smoothly in a clockwise manner, do not mill in straight lines for extended periods. Avoid abruptly pulling the end mill or exerting excessive force to move the end mill. Apply WD-40 liberally while milling to reduce excess heat. Remove chips whenever necessary.

Figure 23A:
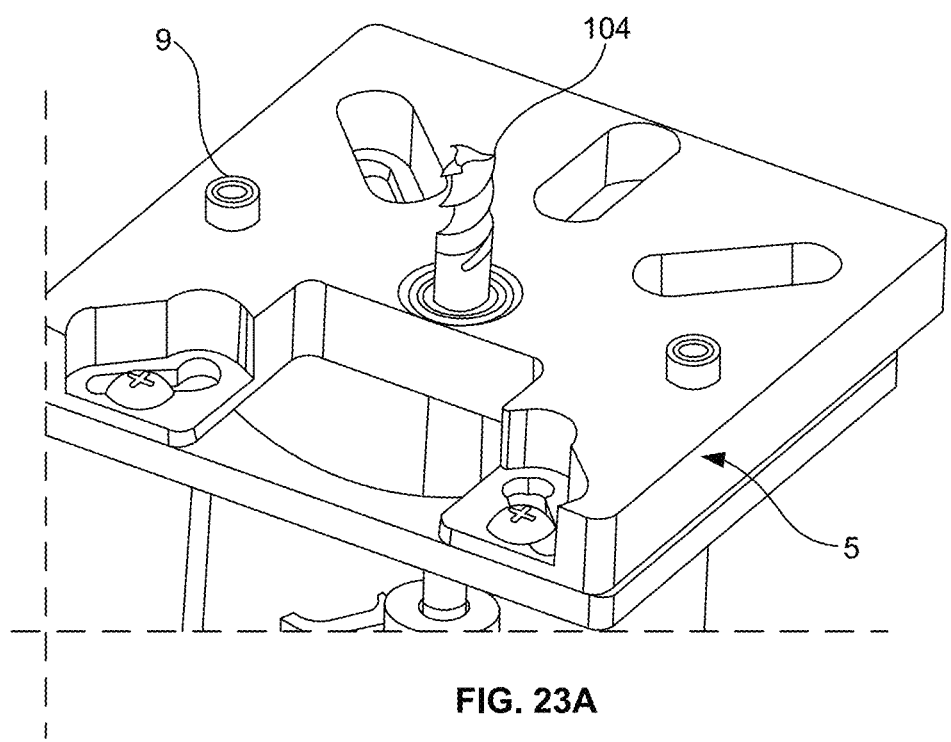
Figure 23B:
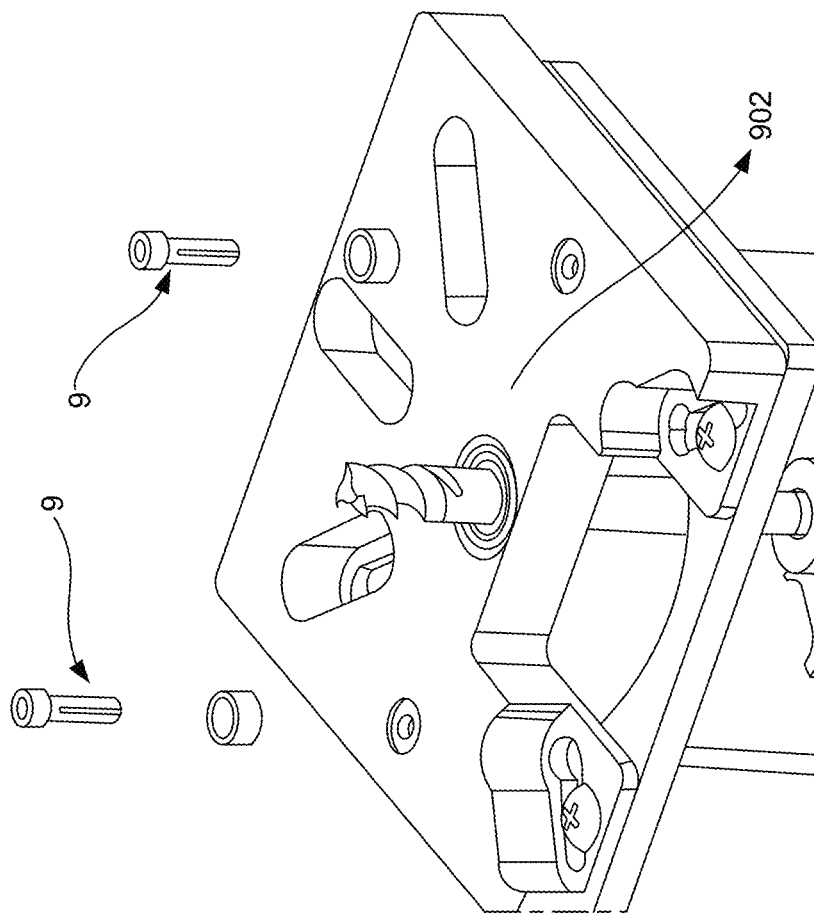

At block 1502, and with reference to FIGS. 23A-B, install #1 (short) guide pins 9 on router adapter 5 using the two smallest socket cap screws and ⁷⁄₆₄" Allen wrench. Open end of pins should be facing up. Make sure pin seats are clear of debris prior to installing. Check that guide pins are properly seated.

Figure 23C:
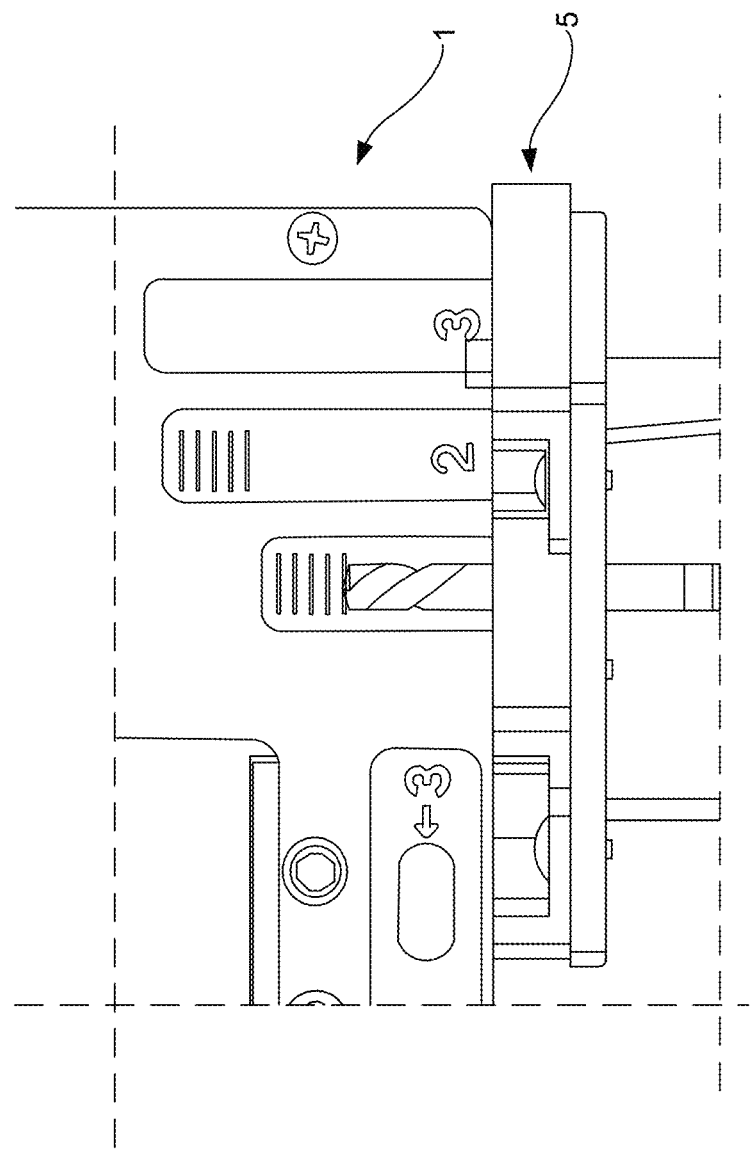

At block 1504, and with reference to FIG. 23C, set end mill depth to the first hash mark using depth gauge #1 1102. Set depth by holding base of router adapter 5 against the edge of the guide plate 1. Be sure guide pins 9 are not between adapter and guide plate. Make sure router depth adjustment is locked when complete.

At block 1506, and with reference to FIG. 23D, orient lower receiver assembly so the buffer extension is closest to the user. Place router assembly atop guide plate 1, with end mill entering the earlier drilled ⅜" hole. The notched side of the router adapter should be facing the buffer extension as shown. The guide pins should be positioned inside the guide cavities on both sides. Turn router on slowest speed and increase to operating speed once ready to mill. Mill using consistent pressure and speed, moving in a clockwise manner.

Figure 23E:
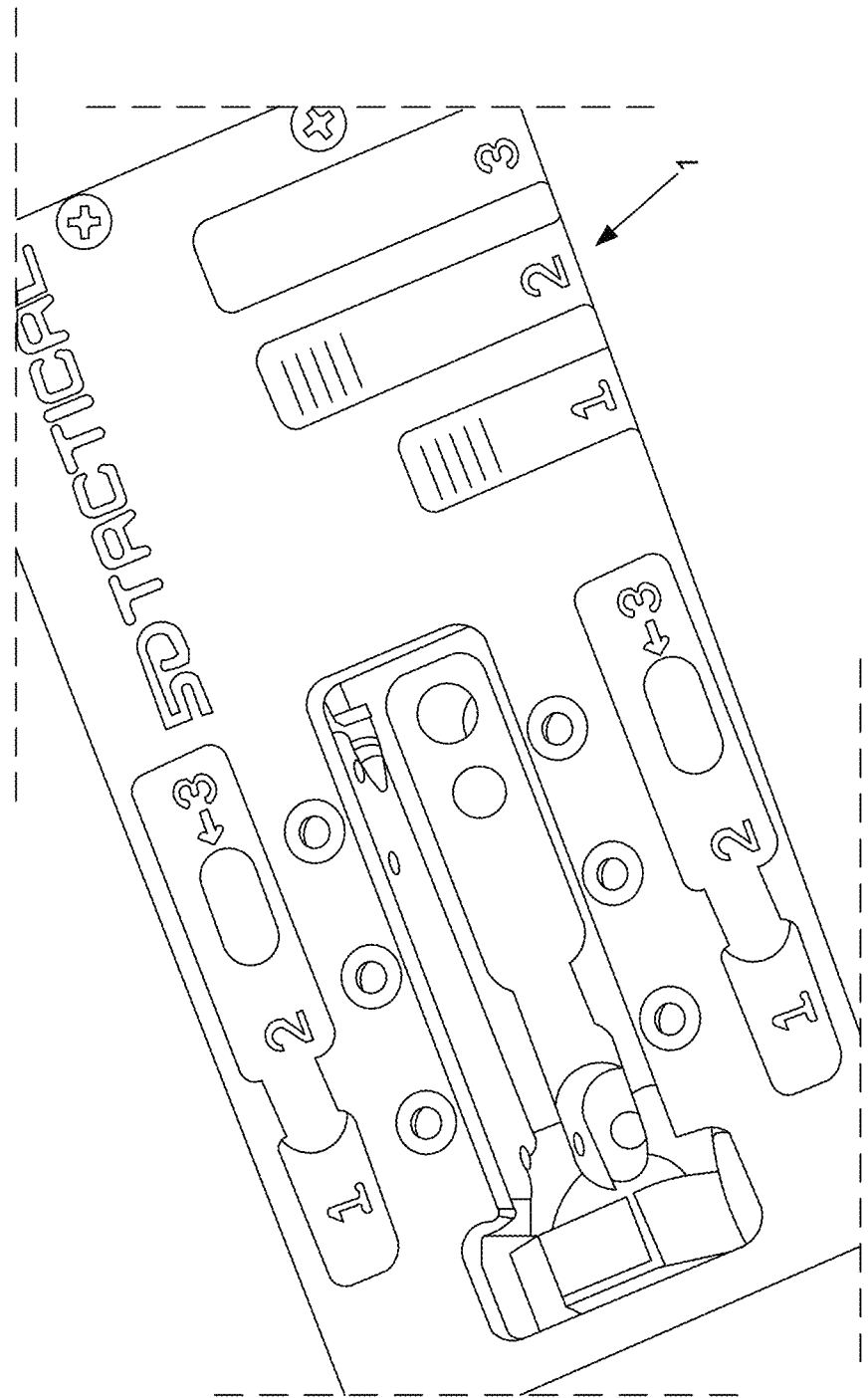

At block 1508, and with reference to FIG. 23E, make the first pass of milling allowing the guide pins to follow the entire area of the guide cavities. When milling corners, gently twist the router side to side to assist to complete the entire corner radius.

Figure 23F:
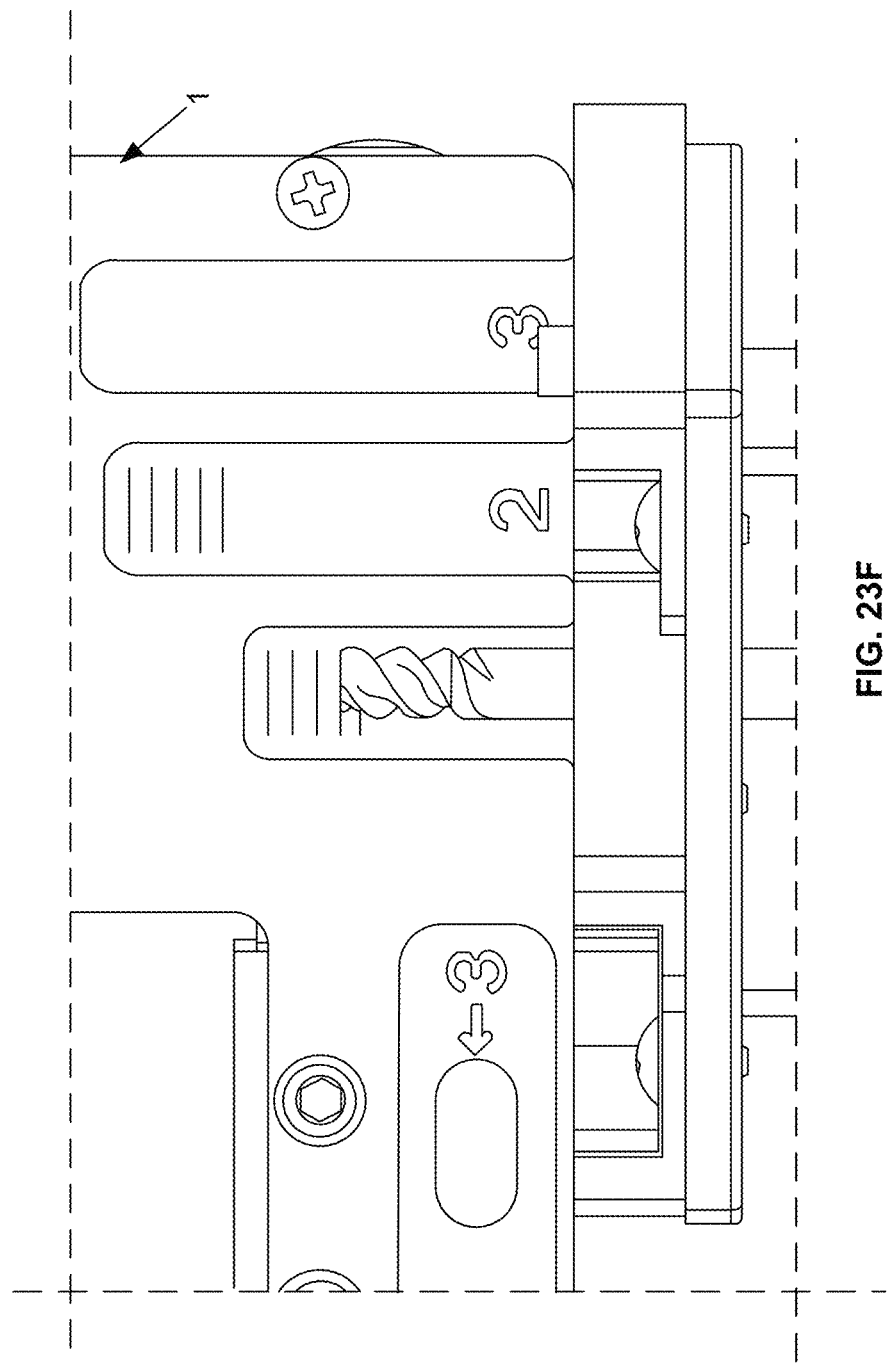

At block 1510, and with reference to FIG. 23F, once the entire pass has been milled to depth, set end mill depth to the second hash mark. Mill second pass following the same method and process as shown in blocks 1506-1508.

Figure 23G:
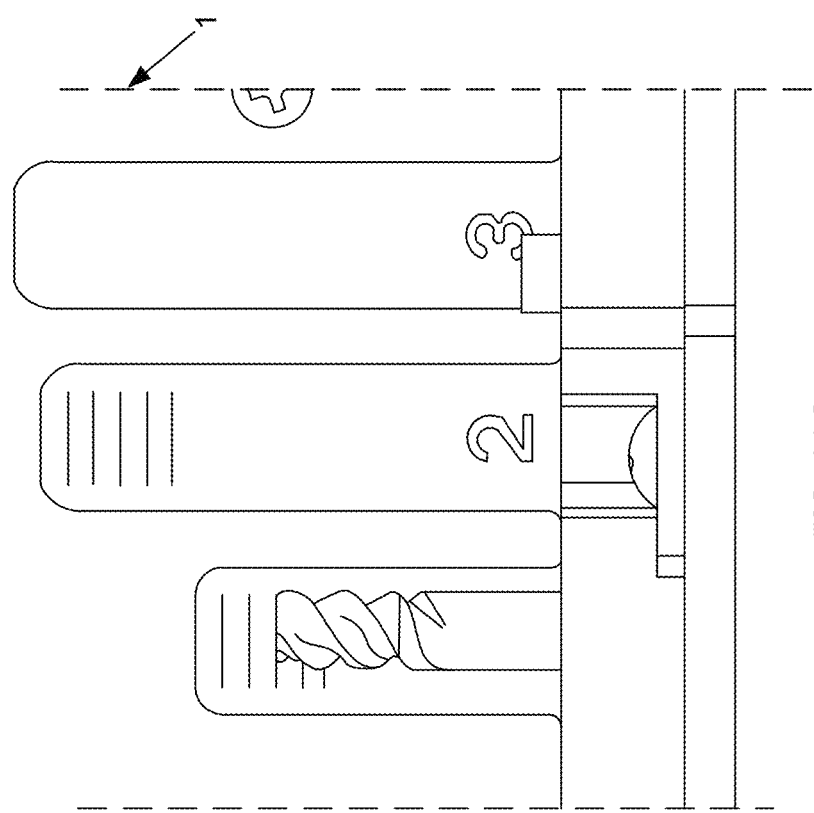
Figure 23H:
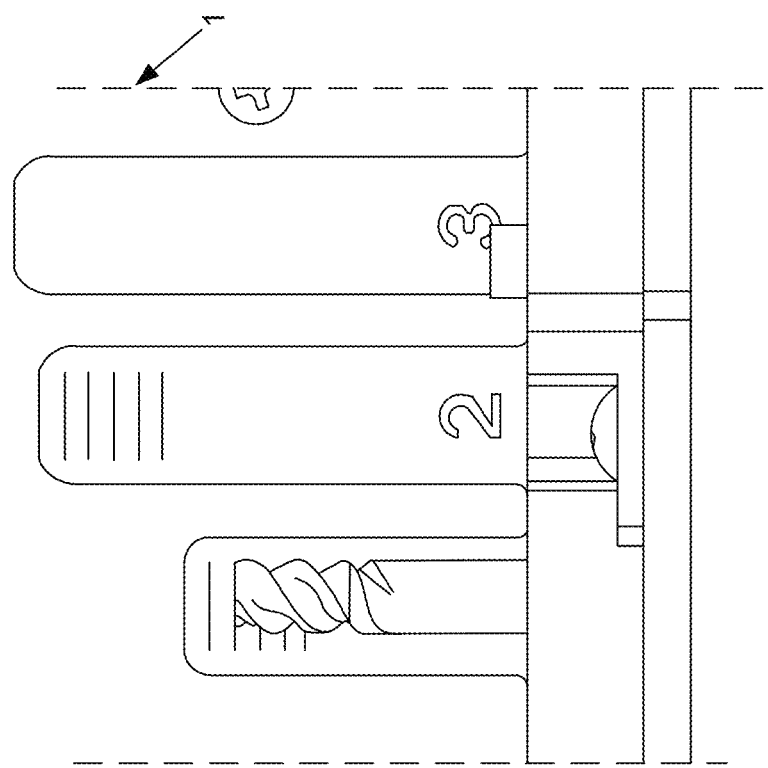
Figure 23I:
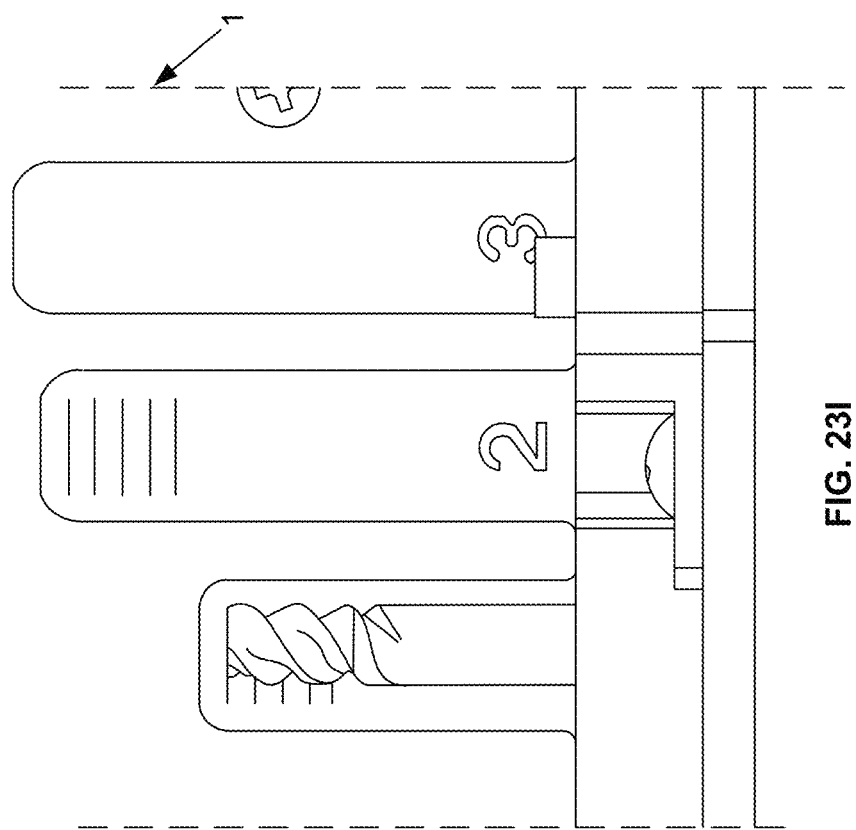

At block 1512, and with reference to FIGS. 23G-I, continue milling in this manner, adjusting end mill depth by 1 hash mark until you reach the final hash mark of depth gauge #1. Do not attempt to mill more than 1 hash mark, as it may result in poor quality, longer time and broken end mills.

Figure 23J:
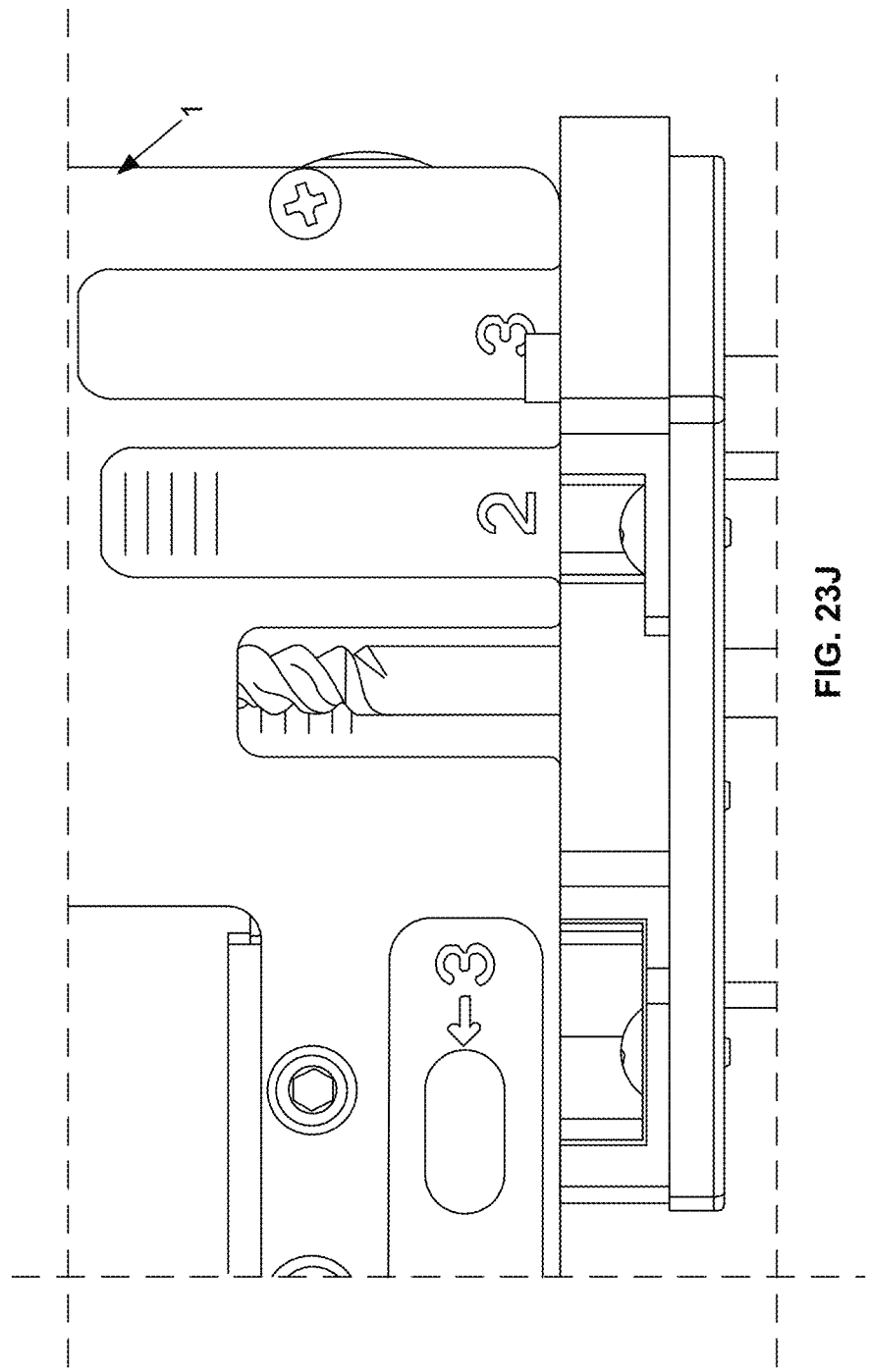
Figure 23K:
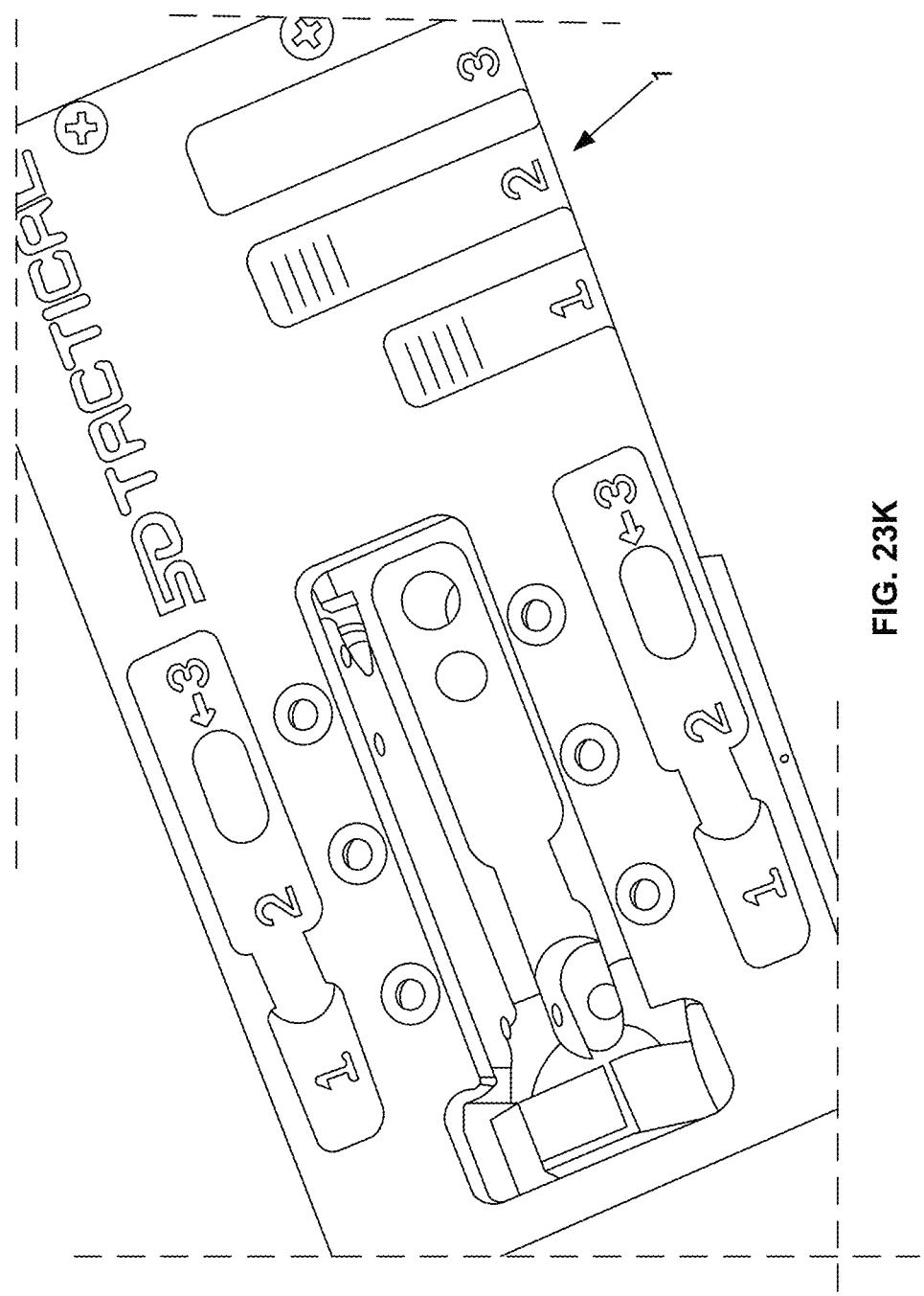

At block 1514, and with reference to FIGS. 23J-K, complete the final pass to full depth of depth gauge #1 and stop. Before continuing to depth gauge #2, the #2 (medium) guide pins 9 should be installed.

Figure 16:
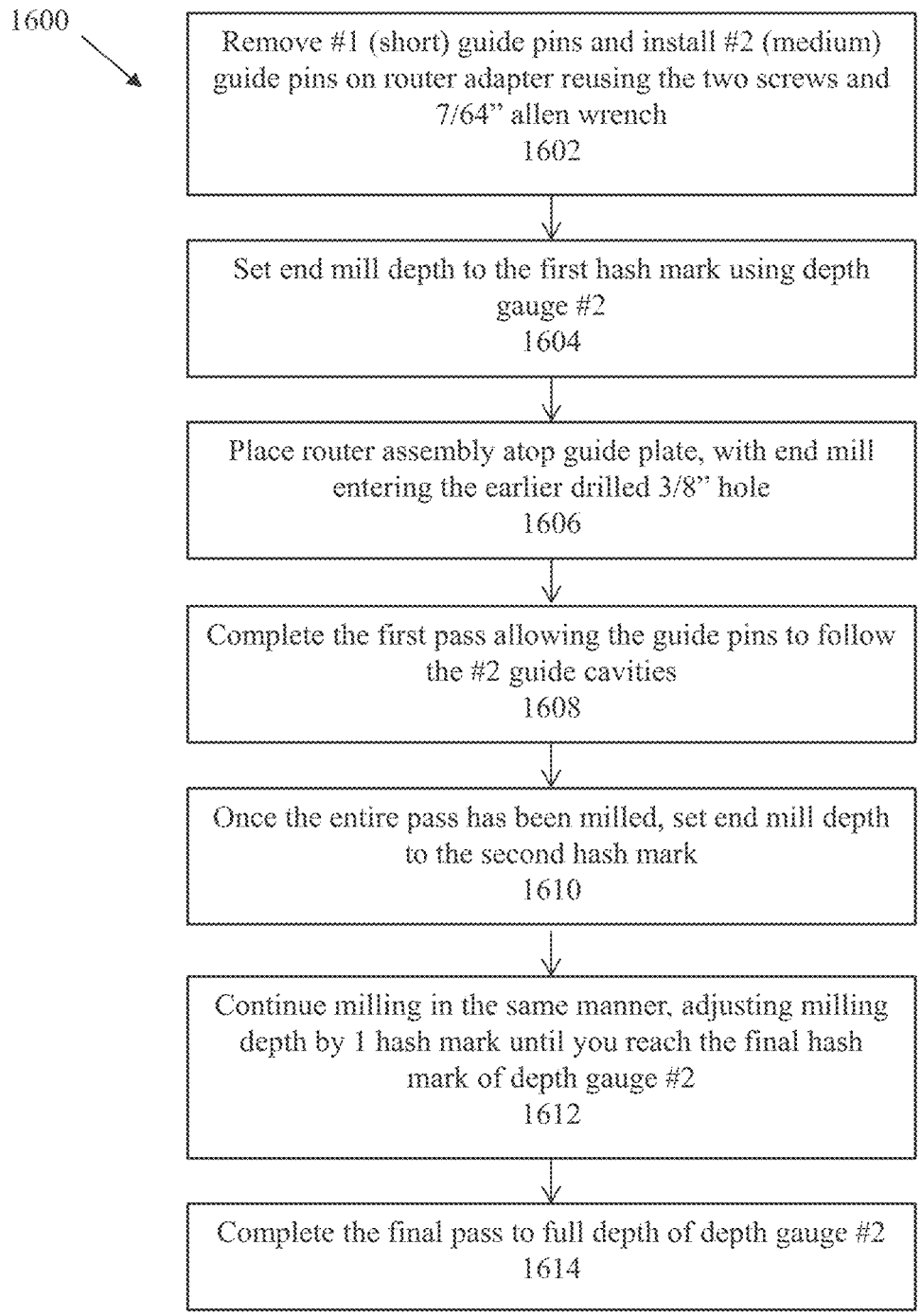
FIG. 16 depicts a method of milling with a jig assembly according to one or more aspects of the disclosure.

FIG. 16 depicts a method 1600 of milling with a jig assembly according to one or more aspects of the disclosure.

Figure 24A:
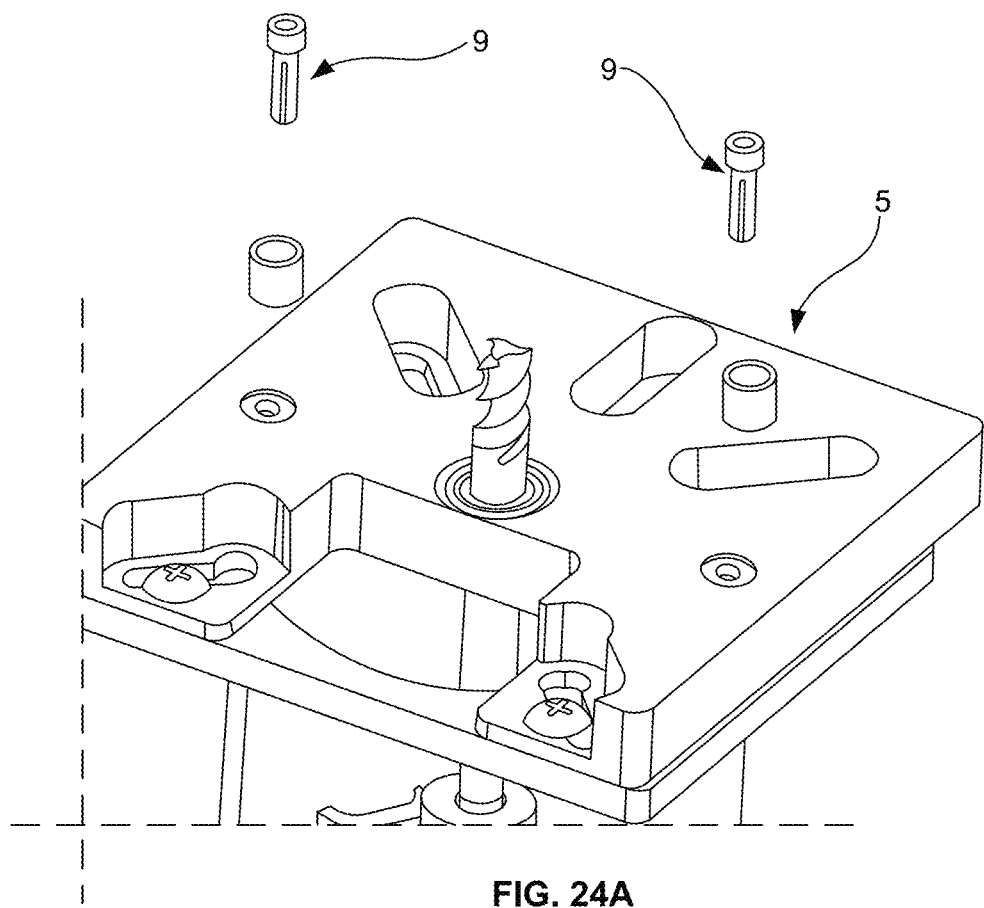
Figure 24B:
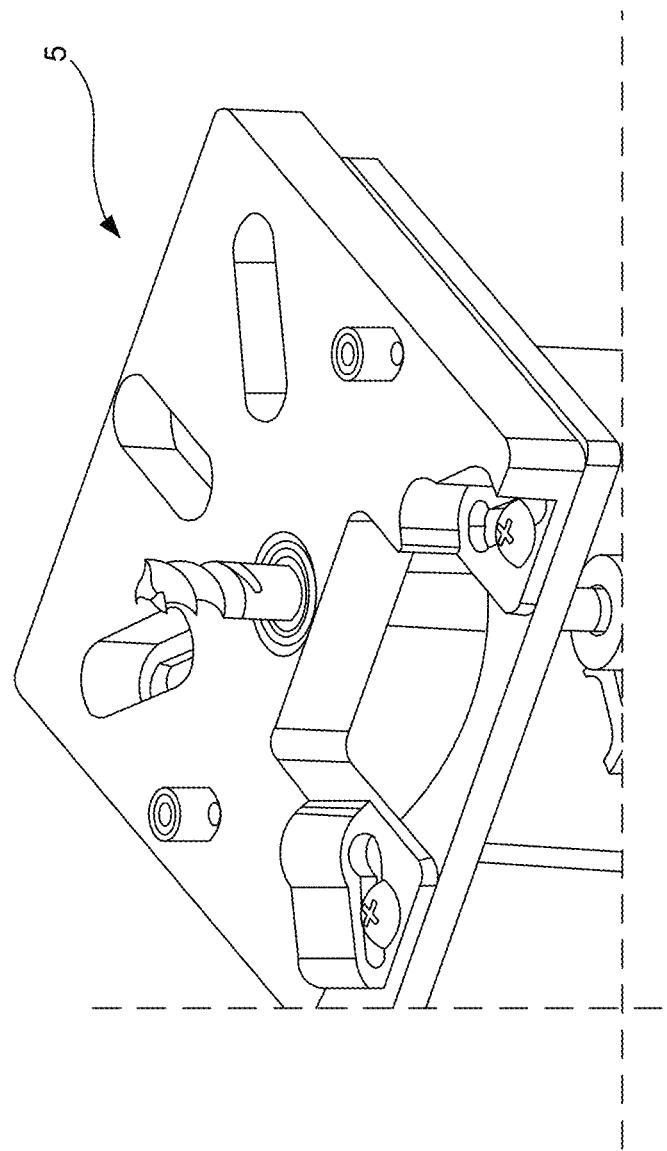

At block 1602, and with reference to FIGS. 24A-B, remove #1 (short) guide pins 9 and install #2 (medium) guide pins 9 on router adapter 5 reusing the (2) screws and 7/64" allen wrench. Make sure pin seats are clear of debris prior to installing. Check that guide pins are properly seated.

Figure 24C:
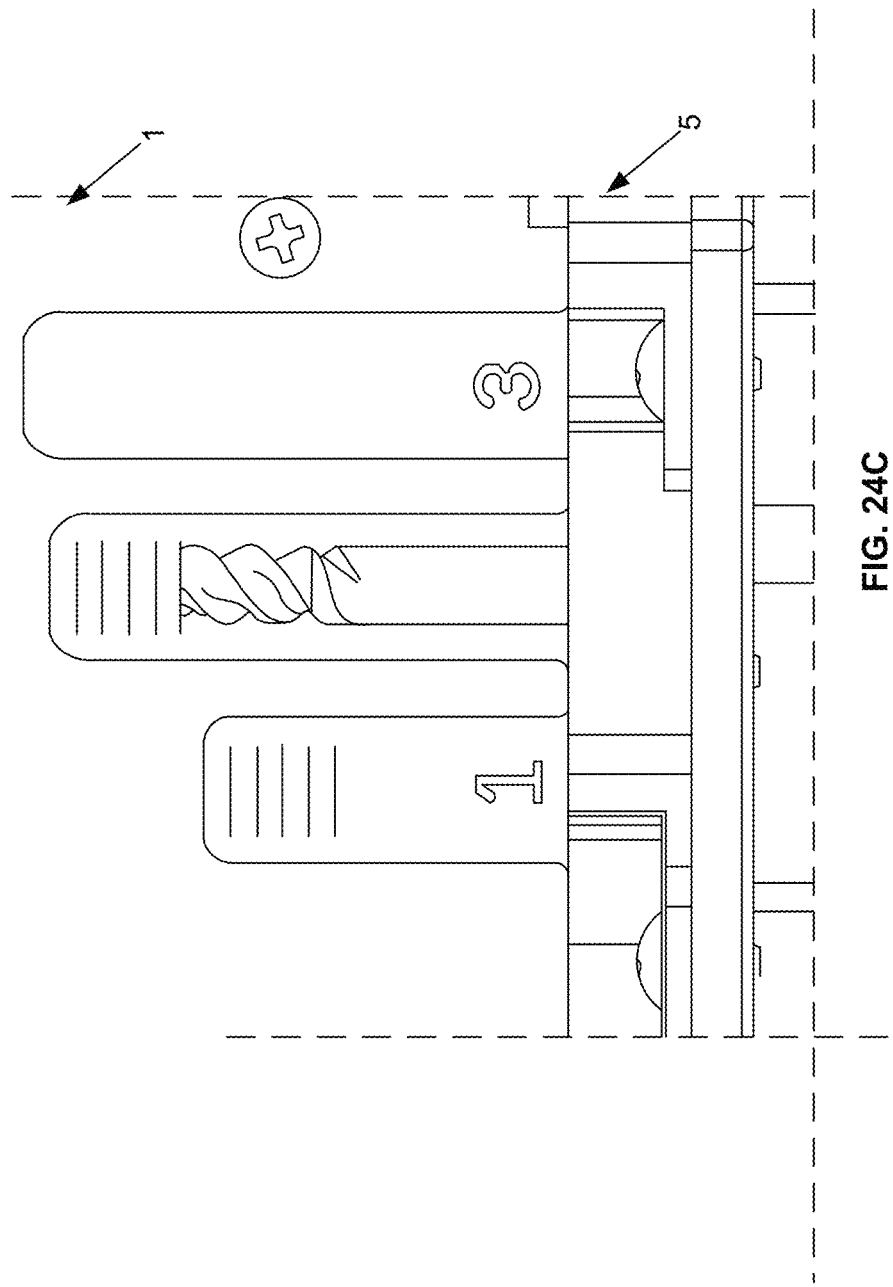

At block 1604, and with reference to FIG. 24C, set end mill depth to the first hash mark using depth gauge #2. Set depth by holding base of router adapter 5 against the edge of the guide plate 1. Be sure guide pins are not between adapter and guide plate. Make sure router depth adjustment is locked when complete.

Figure 24D:
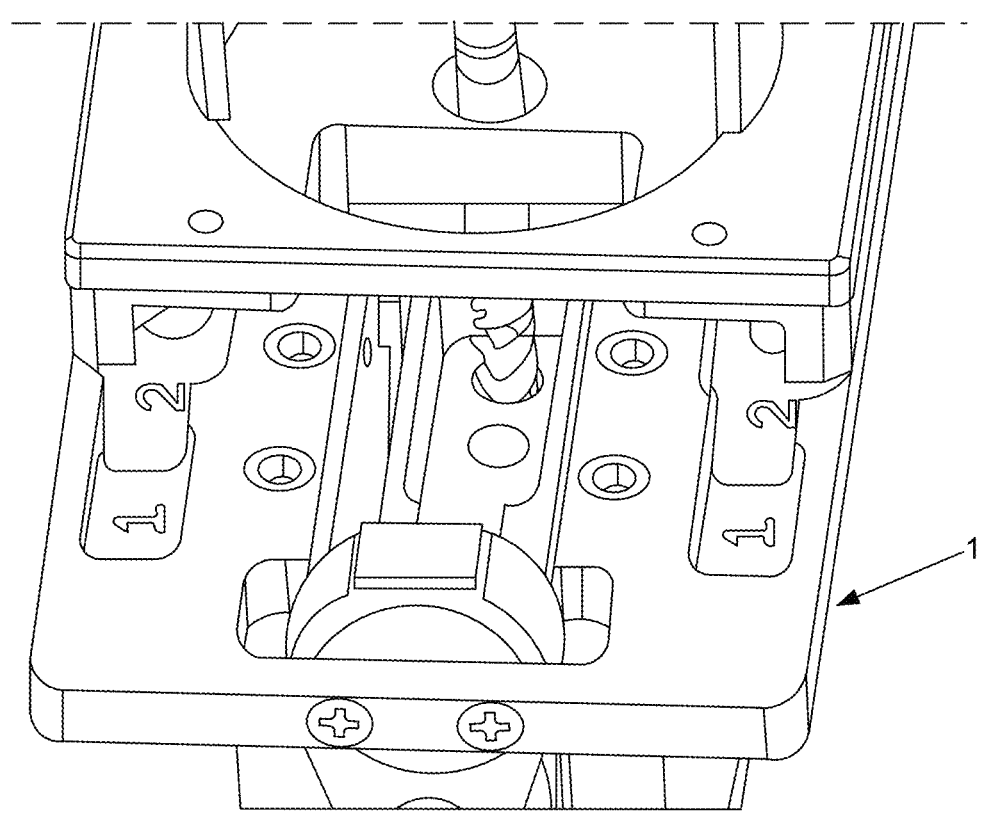

At block 1606, and with reference to FIG. 24D, place router assembly atop guide plate 1, with end mill entering the earlier drilled ⅜" hole. The guide pins 9 should be positioned inside the #2 guide cavities on both sides. Turn router on slowest speed and increase to operating speed once ready to mill. Mill using consistent pressure and speed, moving in a clockwise manner.

Figure 24E:
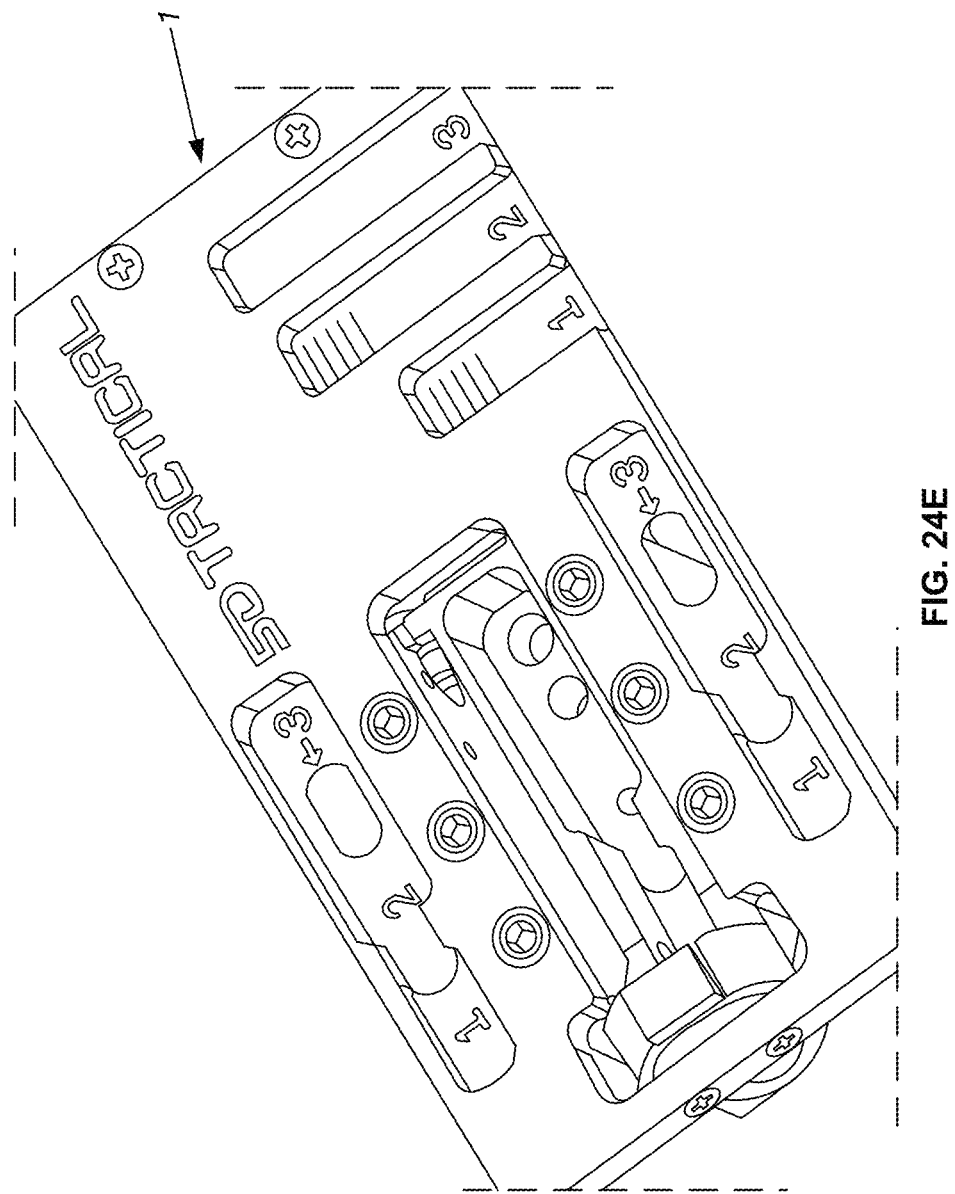

At block 1608, and with reference to FIG. 24E, complete the first pass allowing the guide pins 9 to follow the #2 guide cavities. When milling corners, gently twist the router side to side to assist to complete the entire corner radius.

At block 1610, and with reference to FIG. 24F, once the entire pass has been milled, set end mill depth to the second hash mark. Mill second pass following the same method and process as outlined in blocks 1606 and 1608.

Figure 24G:
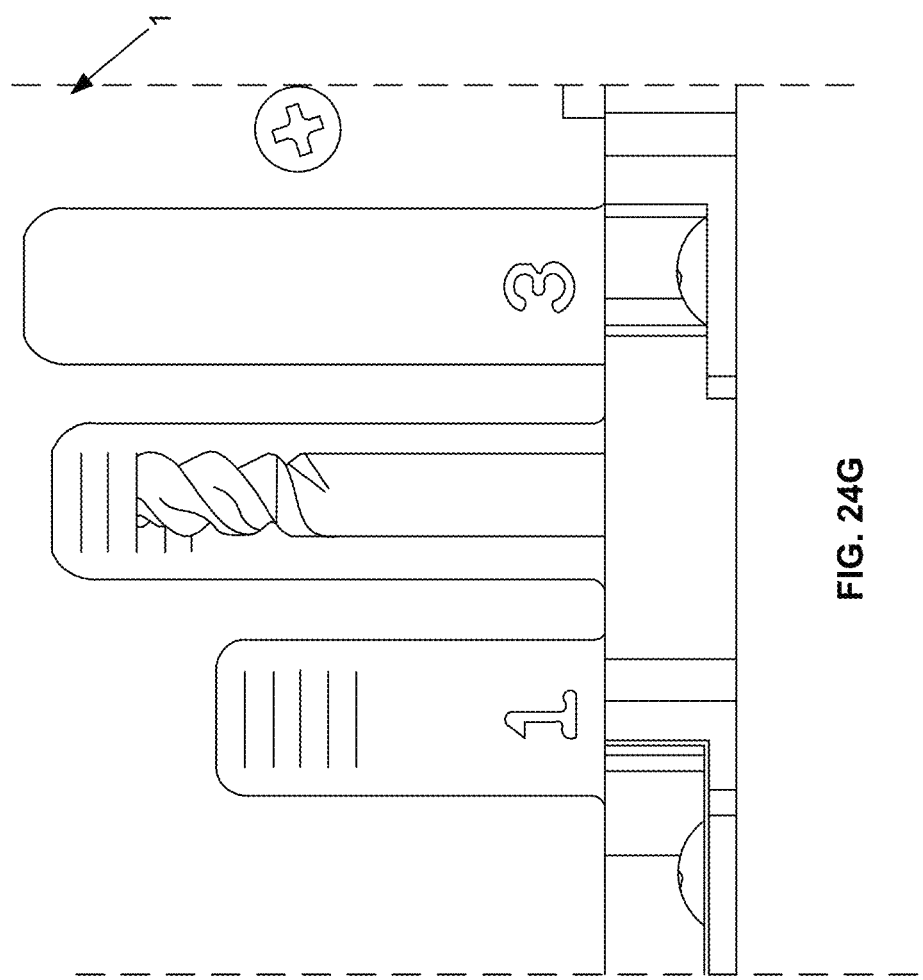
Figure 24I:
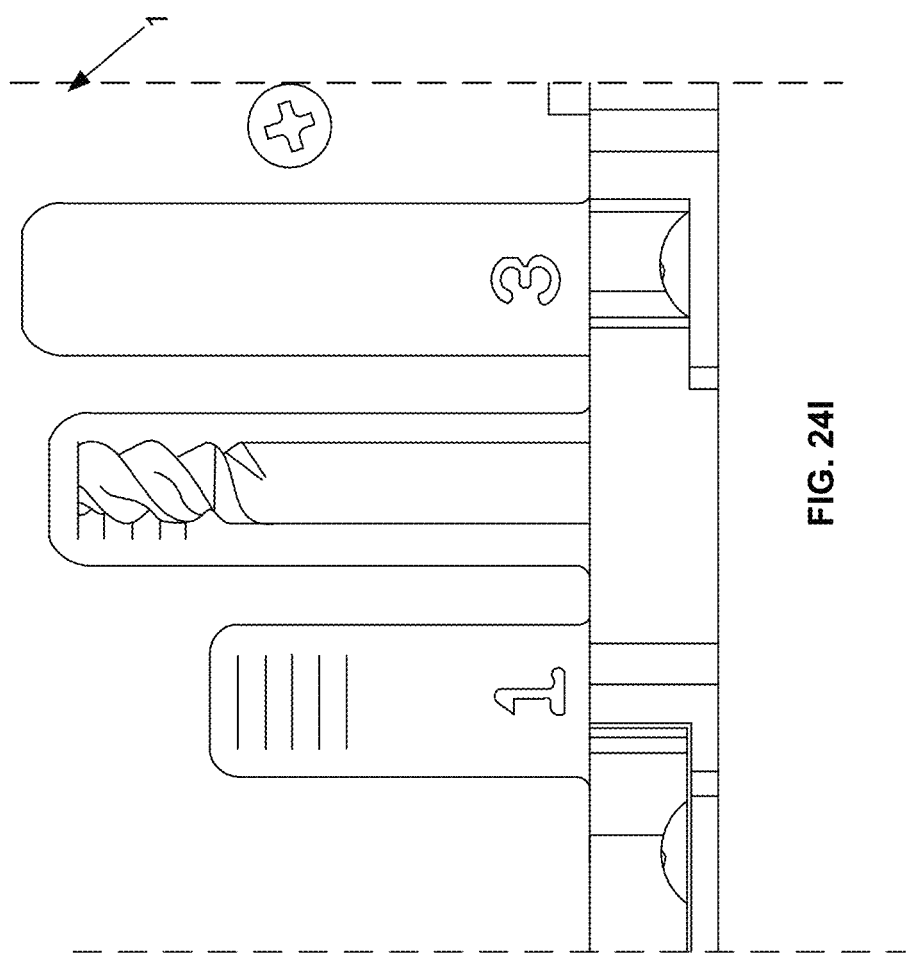

At block 1612, and with reference to FIGS. 24G-I, continue milling in the same manner, adjusting milling depth by 1 hash mark until you reach the final hash mark of depth gauge #2. Do not attempt to mill more than 1 hash mark, as it may result in poor quality, longer time and broken end mills.

Figure 24J:
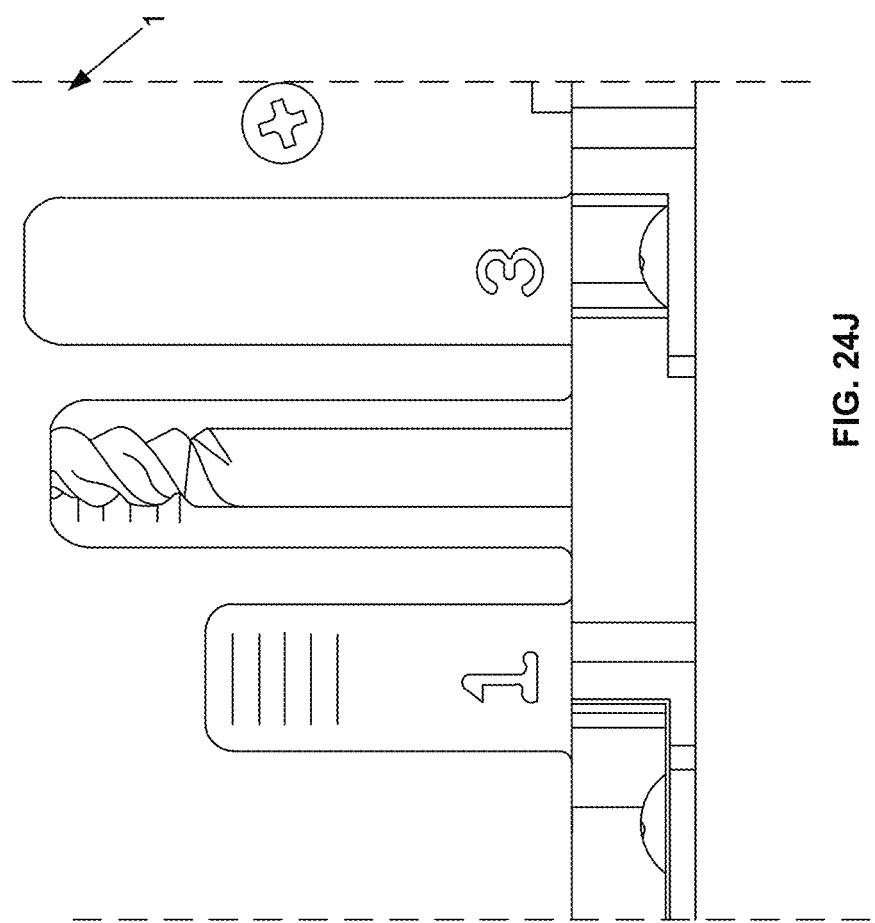
Figure 24K:
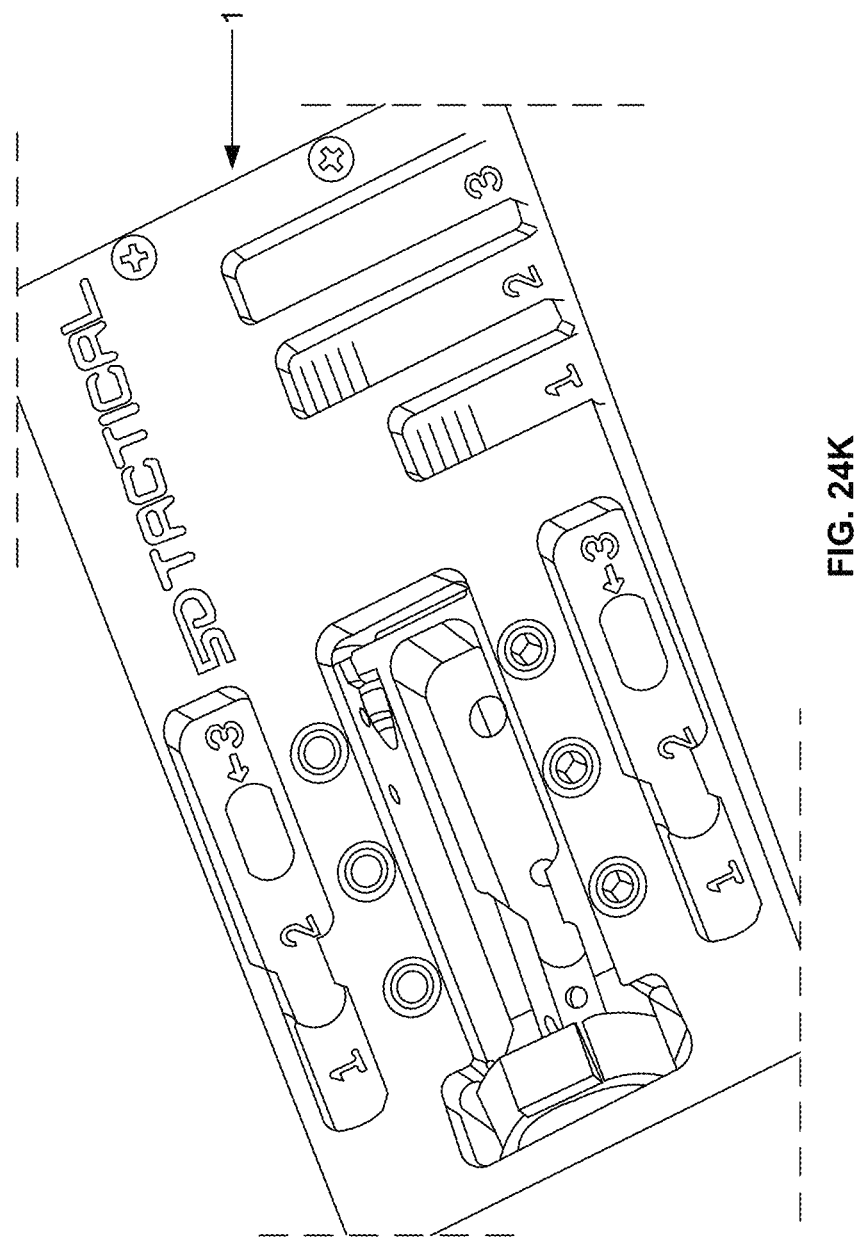

At block 1614, and with reference to FIGS. 24J-K, complete the final pass to full depth of depth gauge #2. Start the end mill in the 5/16" pilot hole. Start the router at slowest speed setting and mill the hole larger before increasing the router speed. Once complete, stop. Before continuing to depth gauge #3 1106, the #3 (long) guide pins 9 should be installed on the router adapter.

Figure 17:
FIG. 17 depicts a method of milling with a jig assembly according to one or more aspects of the disclosure.
Figure 17:

FIG. 17 depicts a method 1700 of milling with a jig assembly according to one or more aspects of the disclosure.

Figure 25A:
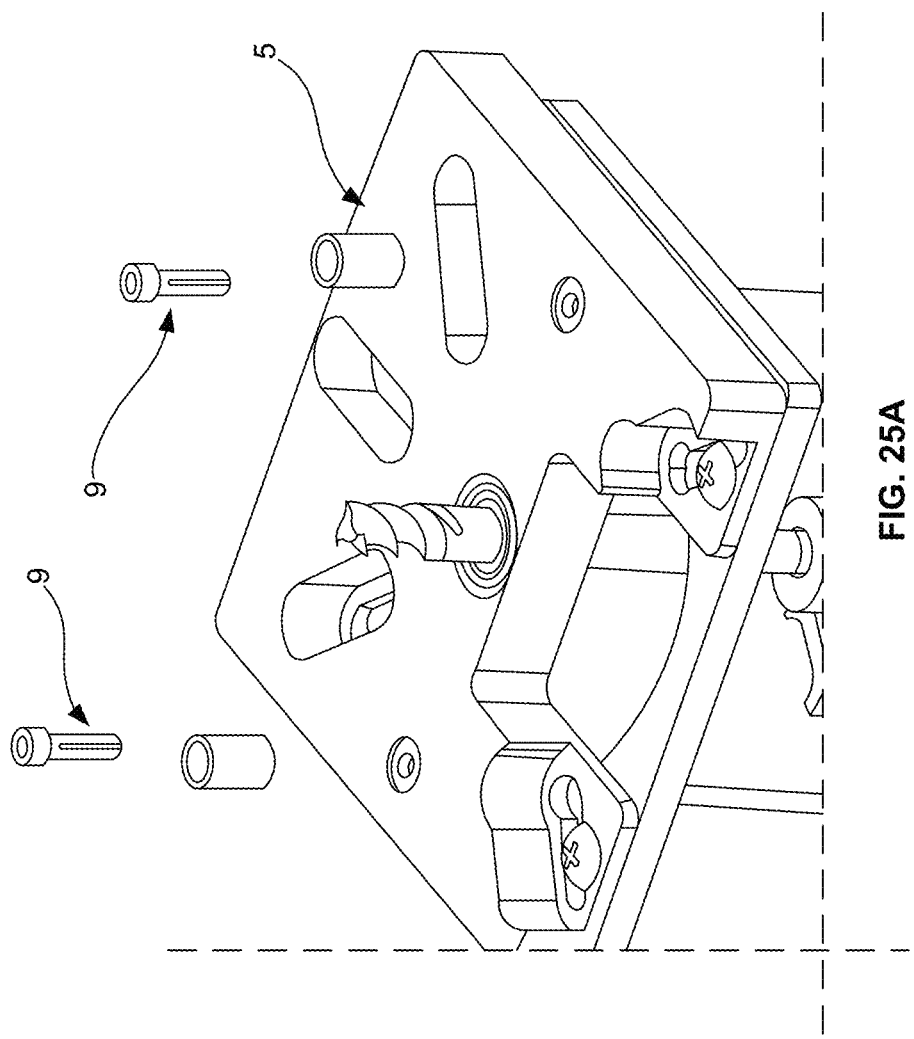

At block 1702, and with reference to FIGS. 25A-B, remove #2 (medium) guide pins 9 and install #3 (long) guide pins 9 on router adapter 5 reusing the (2) screws and 7/64" Allen wrench. Open end of pins should be facing up. Make sure pin seats are clear of debris prior to installing. Check that guide pins are properly seated.

Figure 25C:
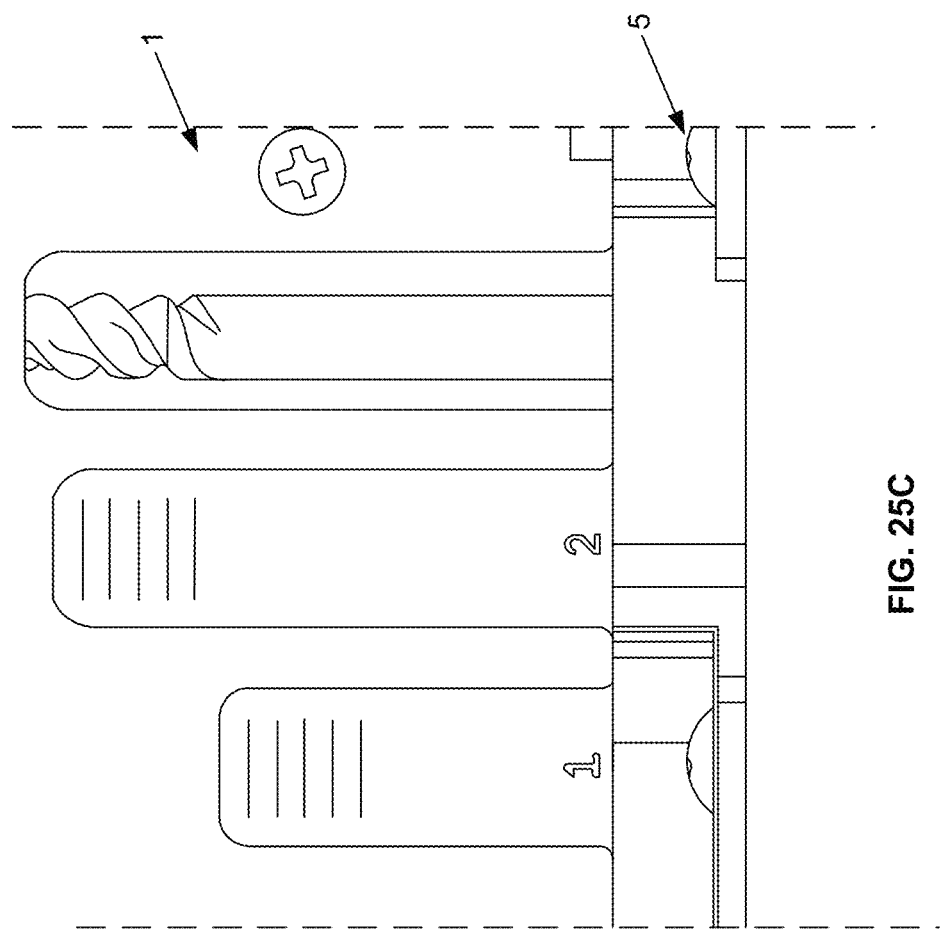

At block 1704, and with reference to FIG. 25C, set end mill depth using depth gauge #3. Set depth by holding base of router adapter 5 against the edge of the guide plate 1. Be sure guide pins are not between adapter and guide plate. Make sure router depth adjustment is locked before when complete.

Figure 25D:
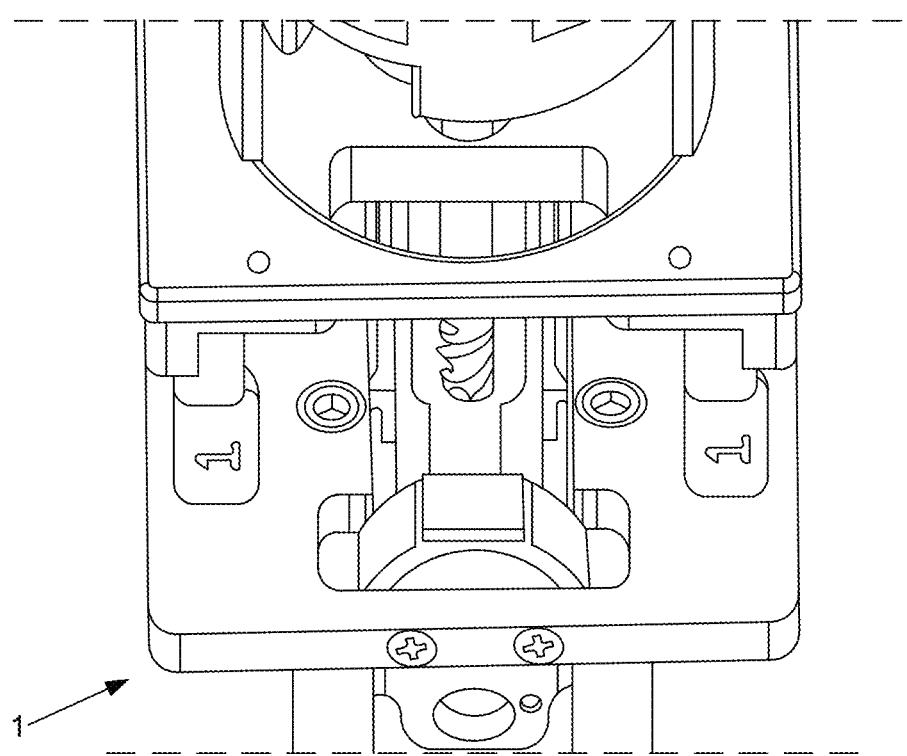
Figure 25E:
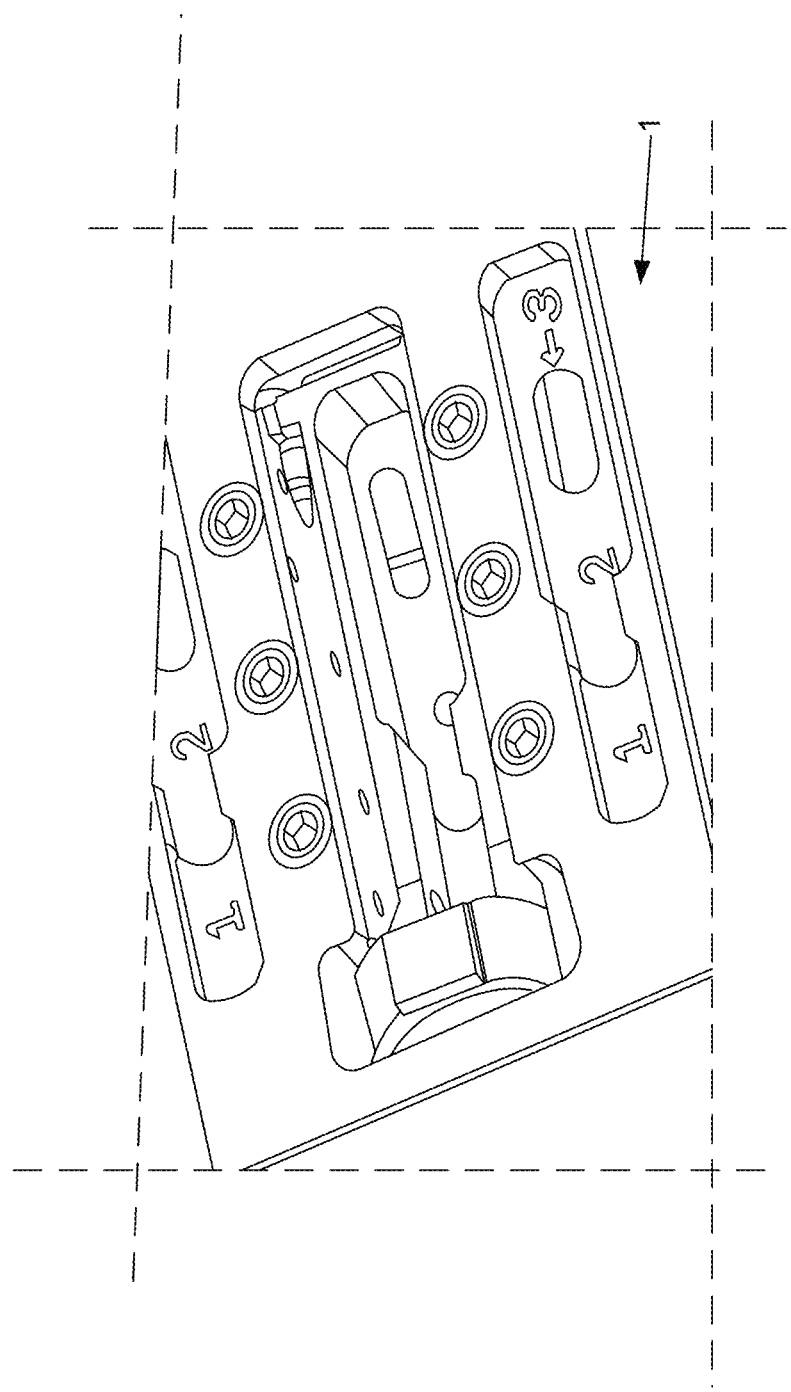

At block 1706, and with reference to FIGS. 25D-E, place router on guide plate 1, with end mill entering the earlier drilled 5/16" hole. The guide pins 9 should be positioned inside the #3 guide cavities on both sides. Start the router at slowest speed setting and mill the hole larger before increasing the router speed. Gently mill in a clockwise manner until the trigger slot is formed.

Figure 18:
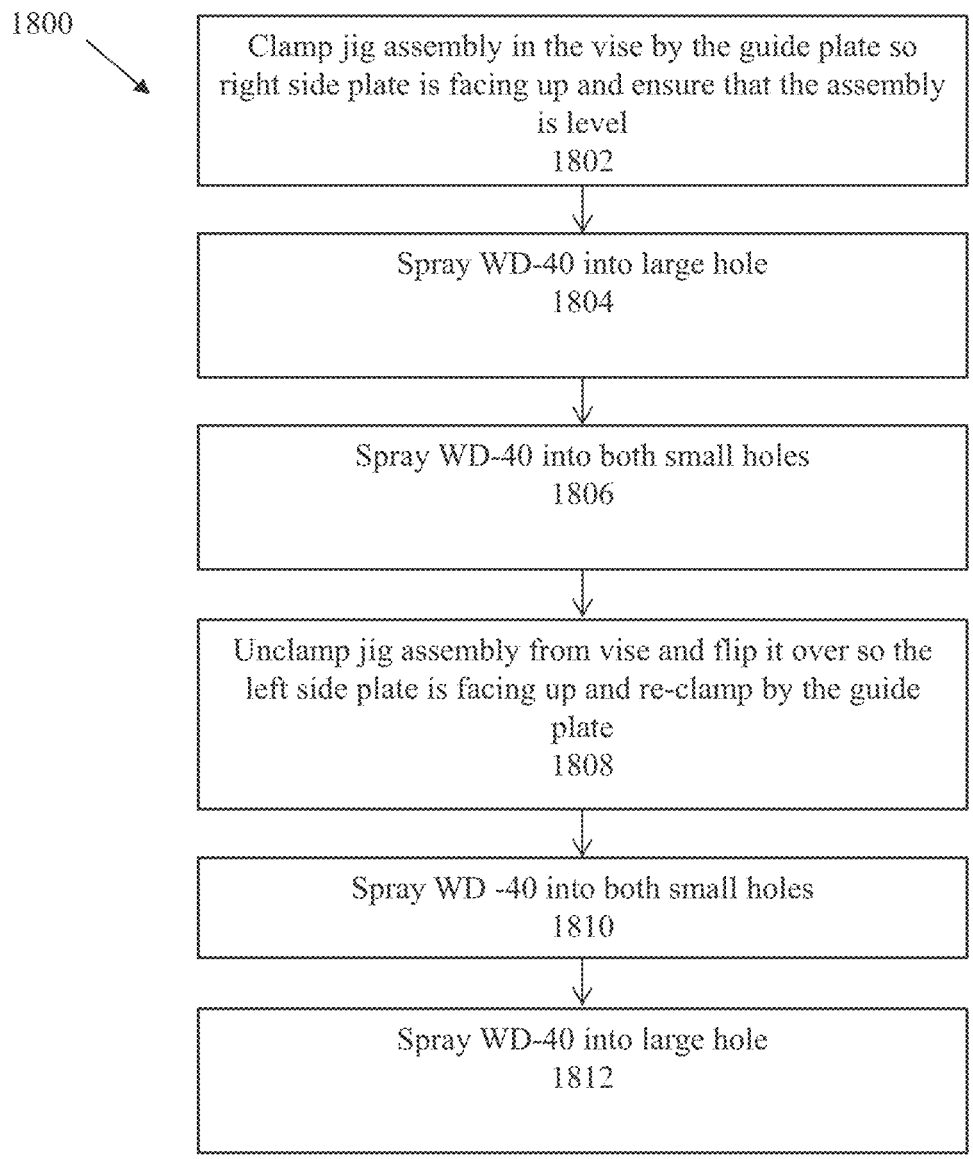
FIG. 18 depicts a method of drilling with a jig assembly according to one or more aspects of the disclosure.

FIG. 18 depicts a method 1800 of drilling with a jig assembly according to one or more aspects of the disclosure.

At block 1802, clamp jig assembly in the vise by the guide plate 1 so right side plate is facing up and ensure that the assembly is level. Use a rag or cardboard between the vise and guide plate to prevent damage to the top surface of the guide plate.

Figure 26A:
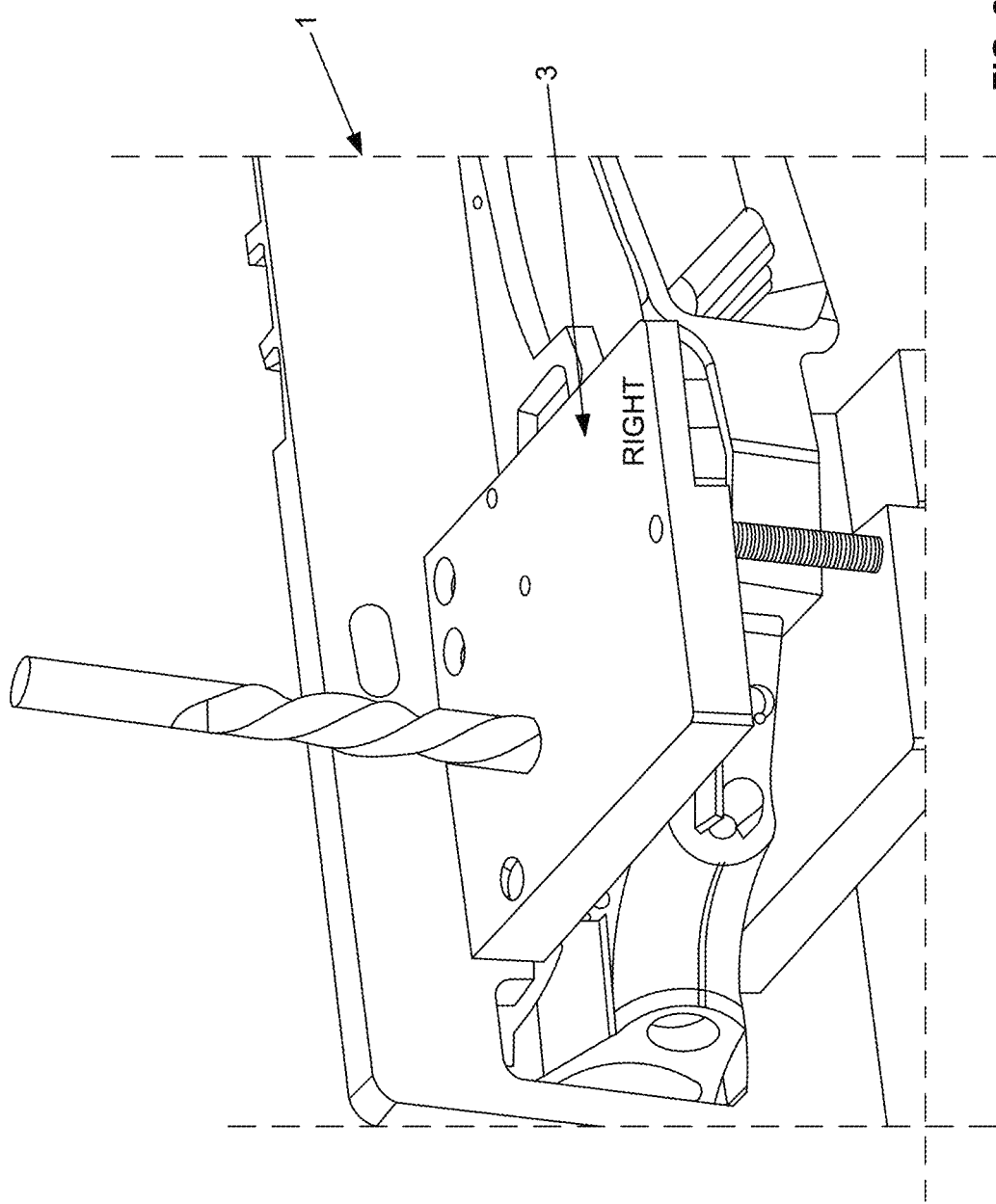
FIGS. 26A-G depict various stages of the method of FIG. 18.

At block 1804, and with reference to FIG. 26A, spray WD-40 into large hole. Insert ⅜" drill bit into large guide hole (large left hole as shown). Do not start drill until bit is fully inserted in the guide hole. Apply moderate pressure and drill until the bit penetrates the right side wall. Do not drill through both sides.

Figure 26B:
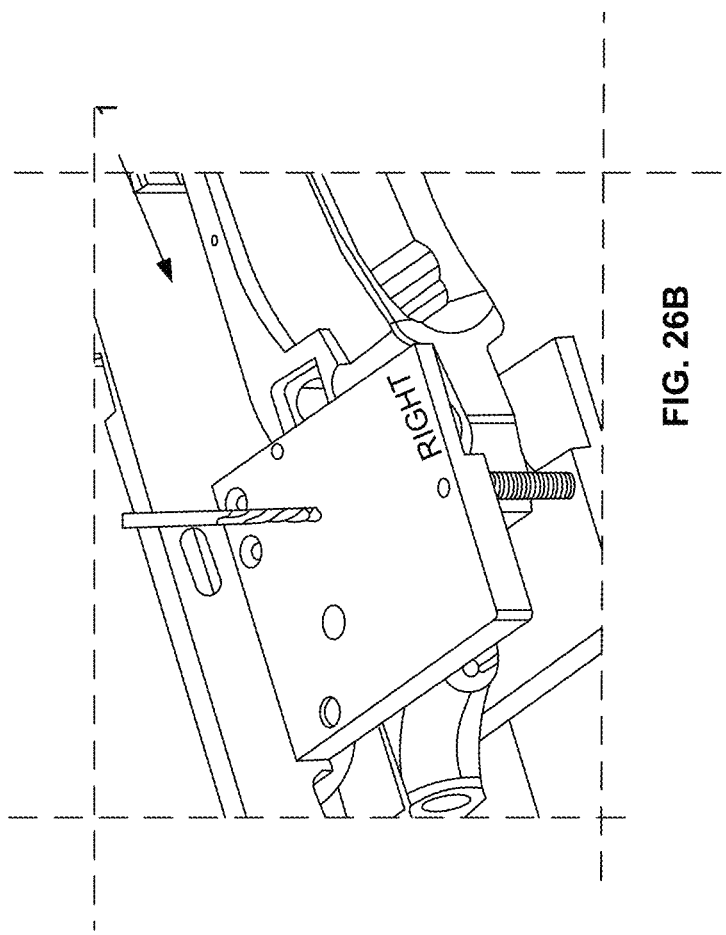
Figure 26C:
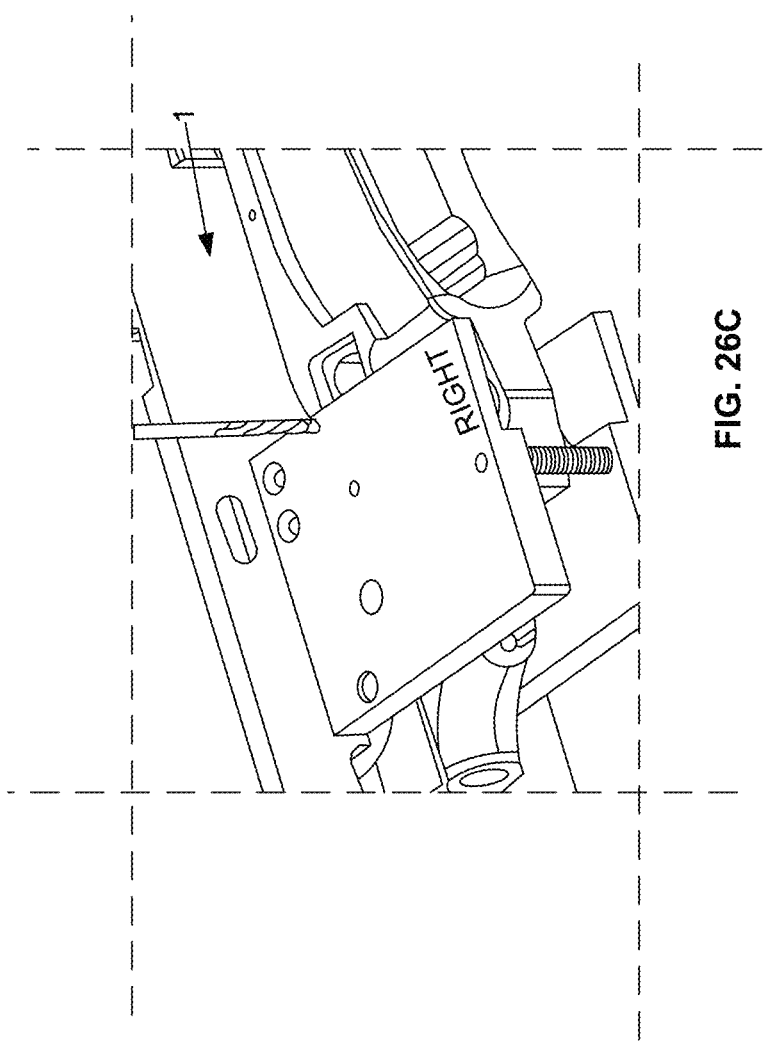

At block 1806, and with reference to FIGS. 26B-C, spray WD-40 into both small holes. Insert 19/64" drill bit into either remaining guide holes. Do not start drill until bit is fully inserted in the guide hole. Apply moderate pressure and drill until the bit penetrates the right side wall. Do not drill through both sides. Repeat in last remaining hole.

At block 1808, unclamp jig assembly from vise and flip it over so the left side plate is facing up and re-clamp by the guide plate 1. Ensure that assembly is level. Use a rag or cardboard between the vise and guide plate to prevent damage to the top surface of the guide plate.

Figure 26D:
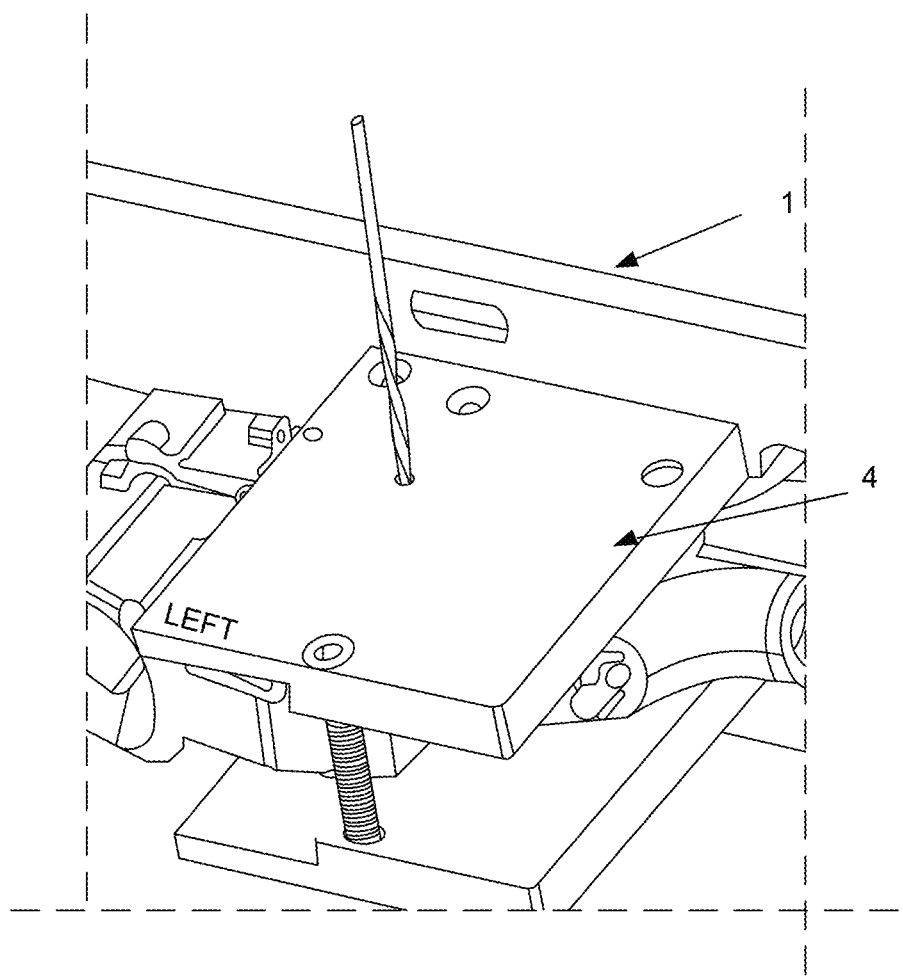
Figure 26E:
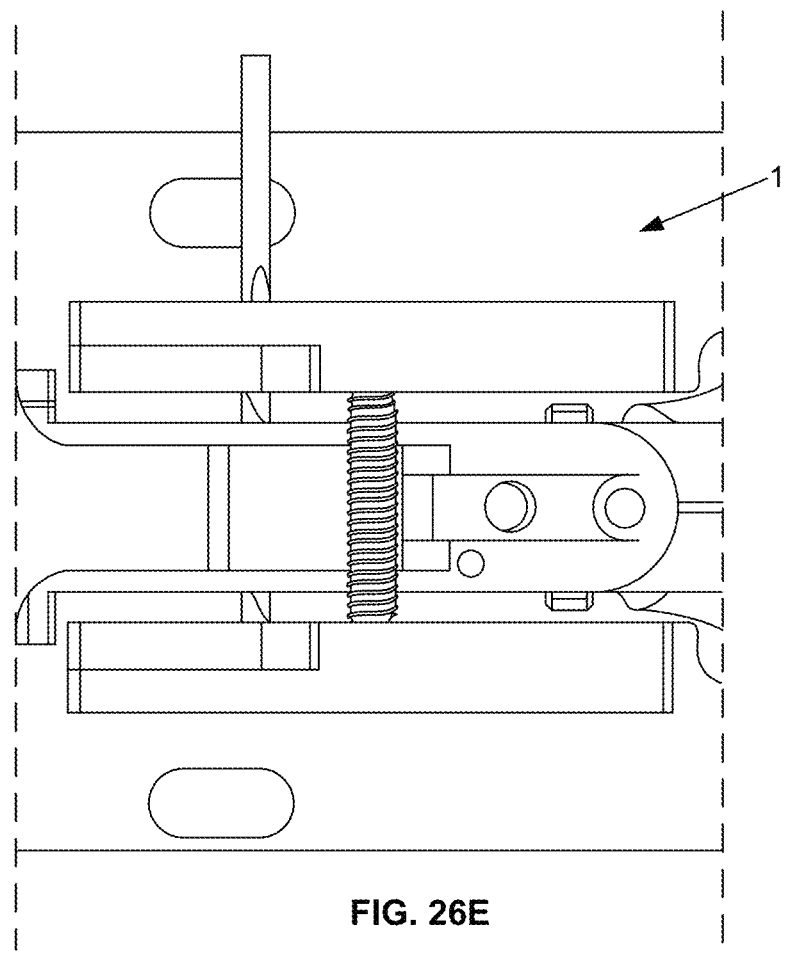

At block 1810, and with reference to FIGS. 26D-E, spray WD-40 into both small holes. Insert 19/64" drill bit into either small guide hole. Do not start drill until bit is fully inserted in the guide hole. Apply moderate pressure and drill until the bit penetrates the left side wall. Continue drilling so the bit passes through the opposite side wall connecting the holes from either side. Repeat on remaining small hole.

Figure 26F:
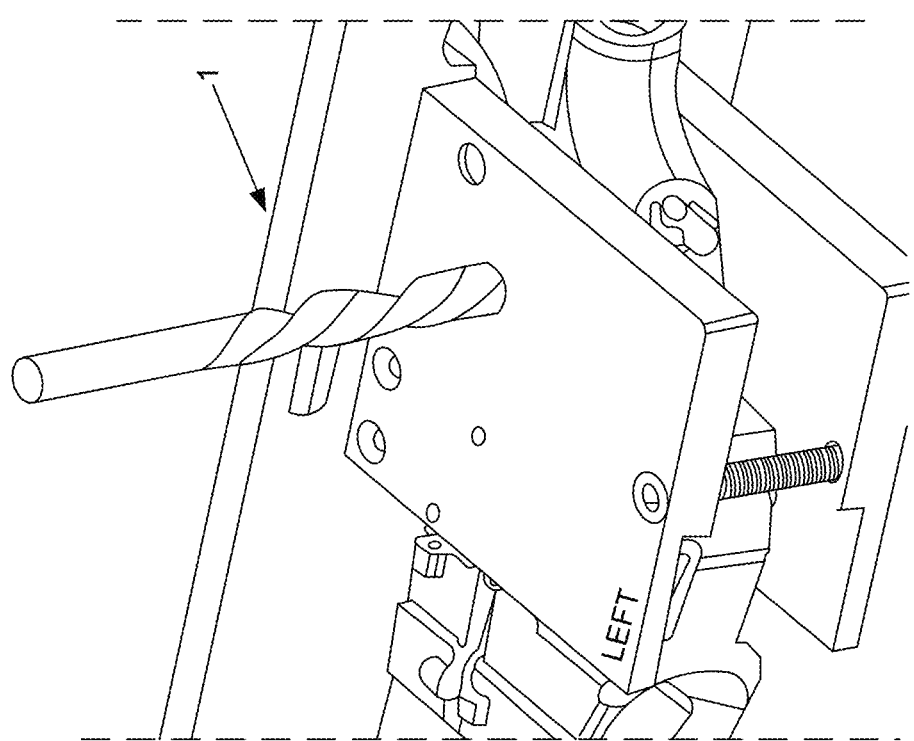
Figure 26G:
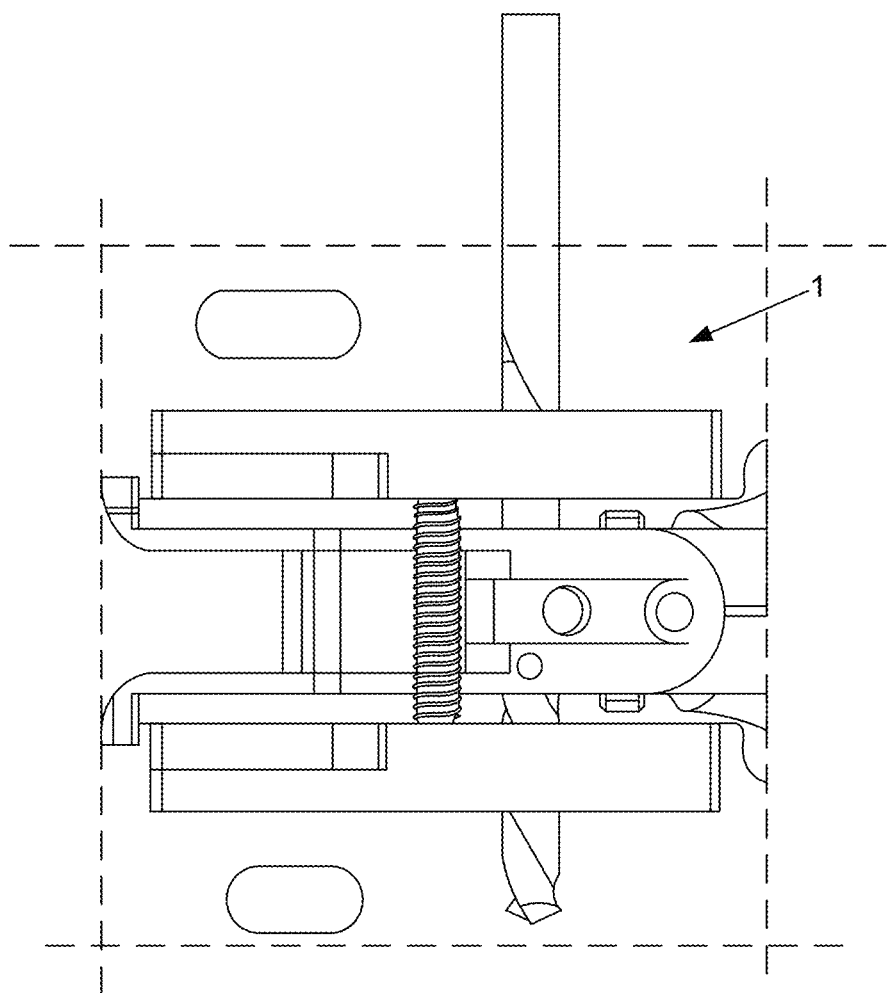

At block 1812, and with reference to FIGS. 26F-G, spray WD-40 into large hole. Insert ⅜" drill bit into large guide hole. Do not start drill until bit is fully inserted in the guide hole. Apply moderate pressure and drill until the bit penetrates the right side wall. Continue drilling so the bit passes through the opposite side wall connecting the holes from either side.

Figure 19:
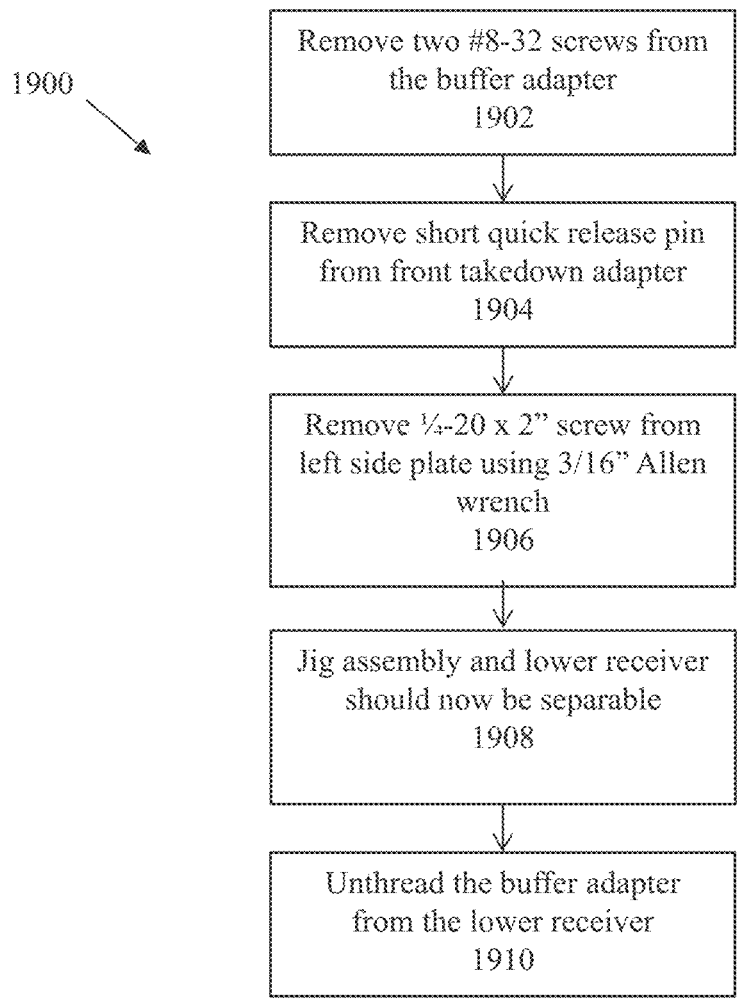
FIG. 19 depicts a method of lower receiver removal using a jig assembly according to one or more aspects of the disclosure.

FIG. 19 depicts a method 1900 of lower receiver removal using a jig assembly according to one or more aspects of the disclosure.

One advantage of the presently described jig assembly or assemblies is they do not require the user to completely disassemble the jig assembly to remove or mount an 80% lower receiver.

Figure 27A:
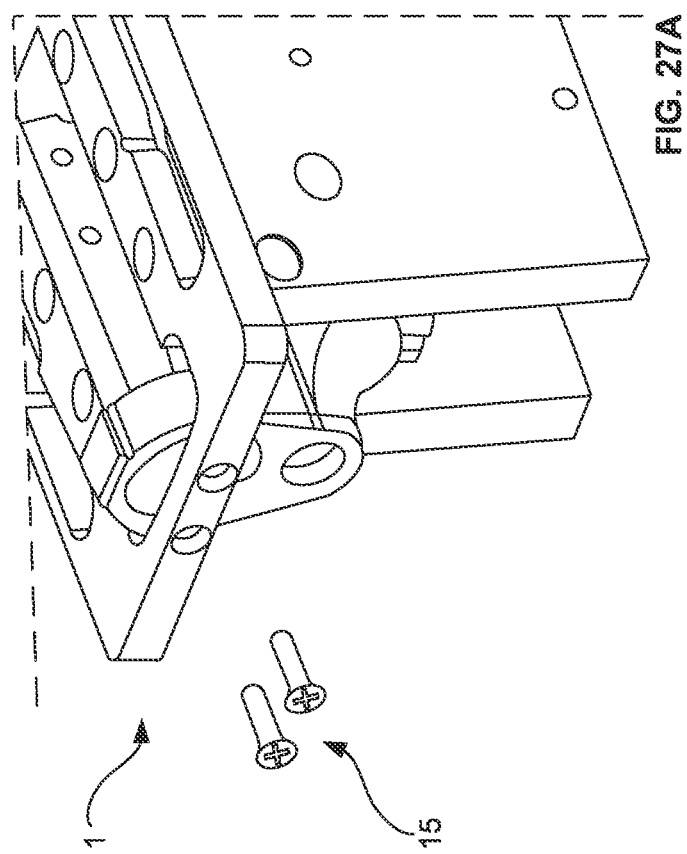
FIGS. 27A-E depict various stages of the method of FIG. 19.

At block 1902, and with reference to FIG. 27A, remove two #8-32 screws 15 from the buffer adapter 7.

Figure 27B:
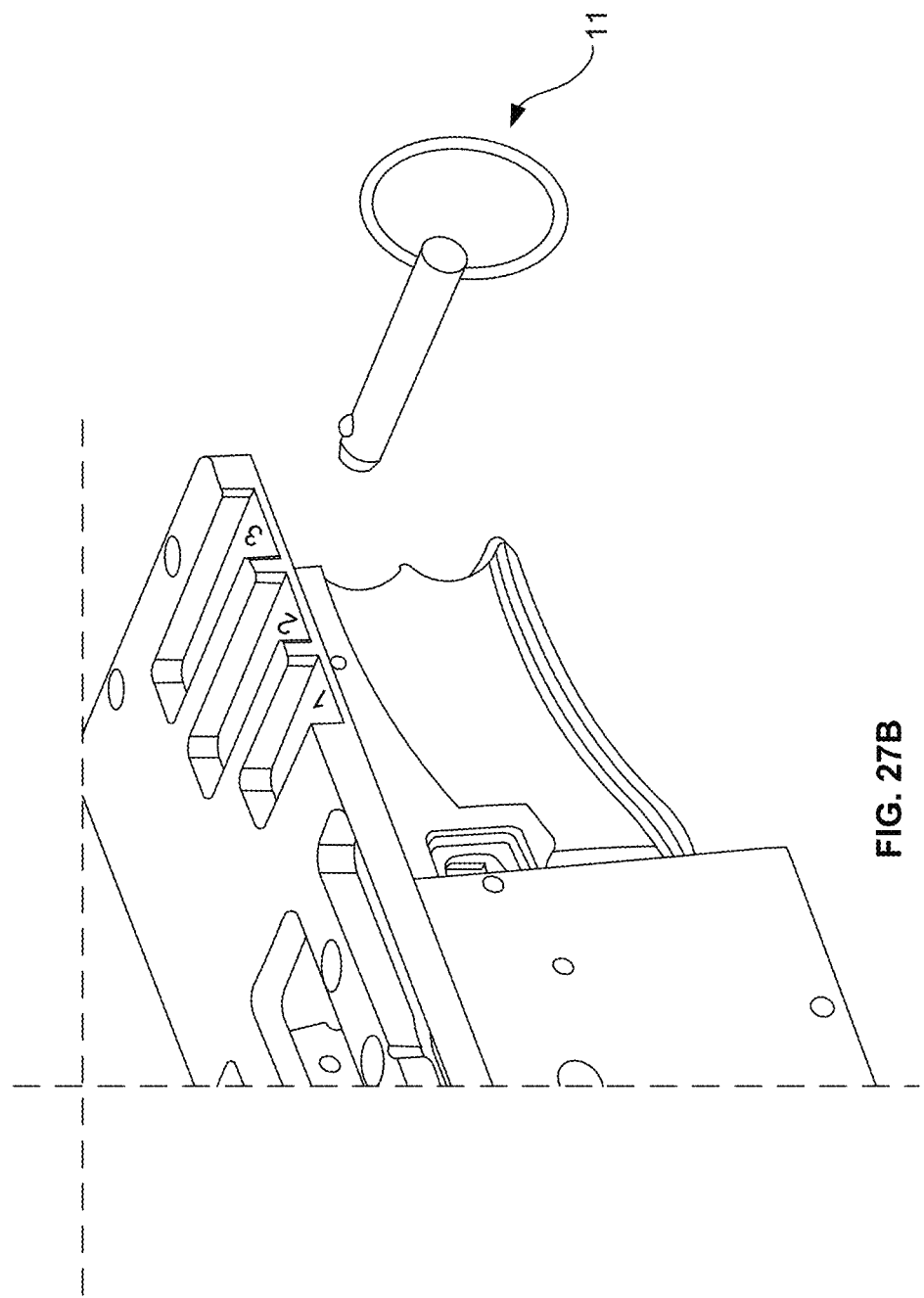

At block 1904, and with reference to FIG. 27B, remove short quick release pin 11 from front takedown adapter.

Figure 27C:
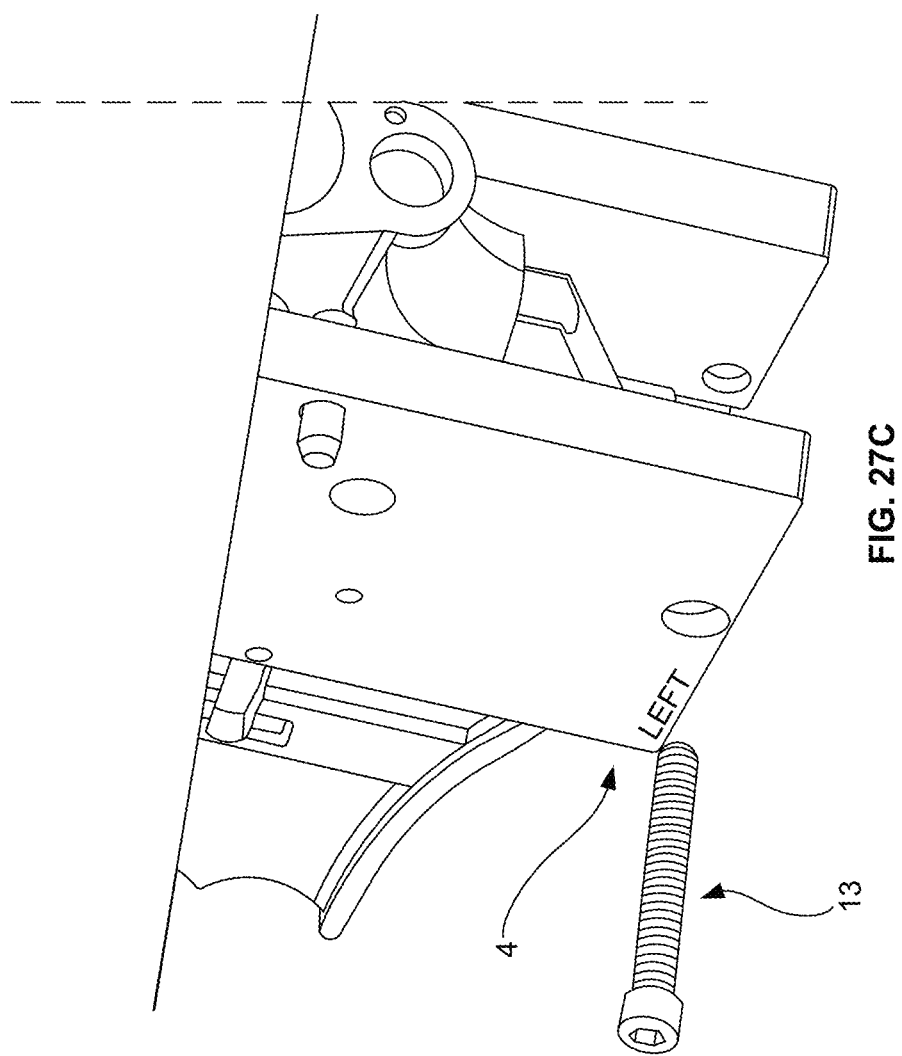

At block 1906, and with reference to FIG. 27C, remove ¼-20×2" screw from left side plate 4 using 3/16" Allen wrench.

Figure 27D:
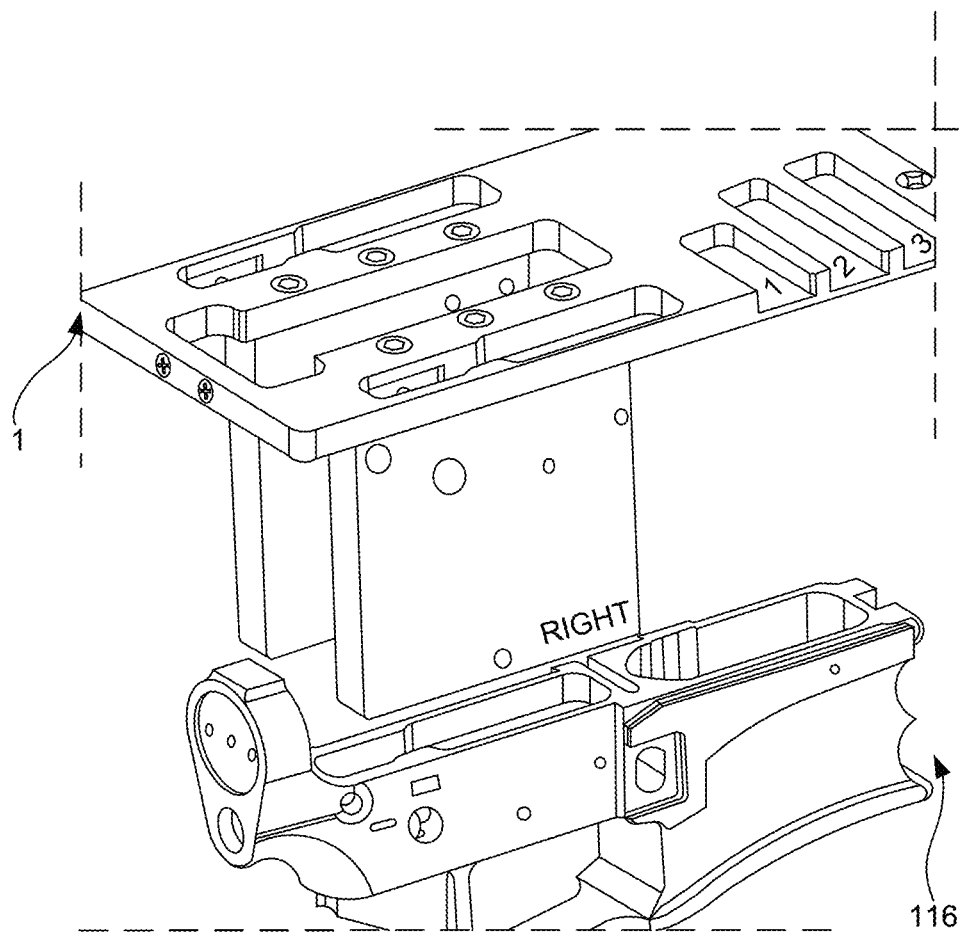

At block 1908, and with reference to FIG. 27D, the jig assembly and lower receiver should now be separable. For the AR-308 router jig, loosening or removing one of the side plates 3, 4 may be employed to extract the lower receiver.

Figure 27E:
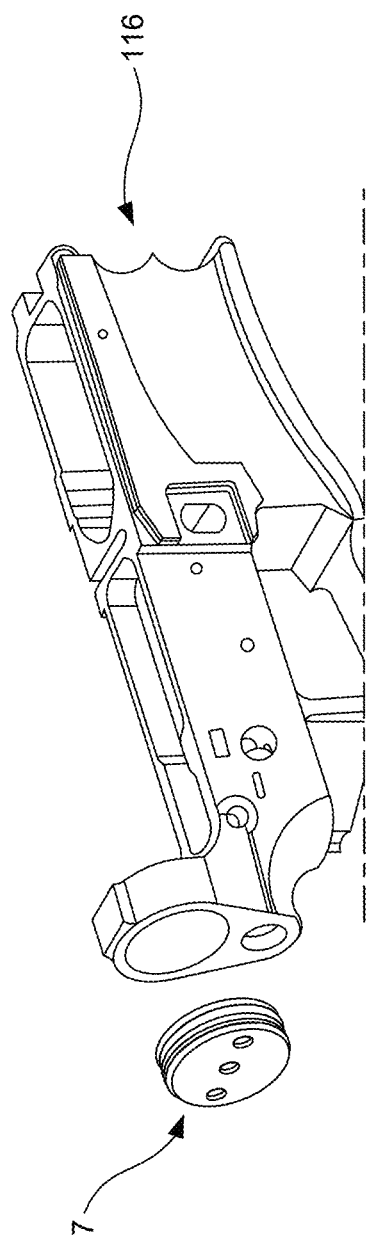

At block 1910, and with reference to FIG. 27E, unthread the buffer adapter 7 from the lower receiver.

Figure 20:
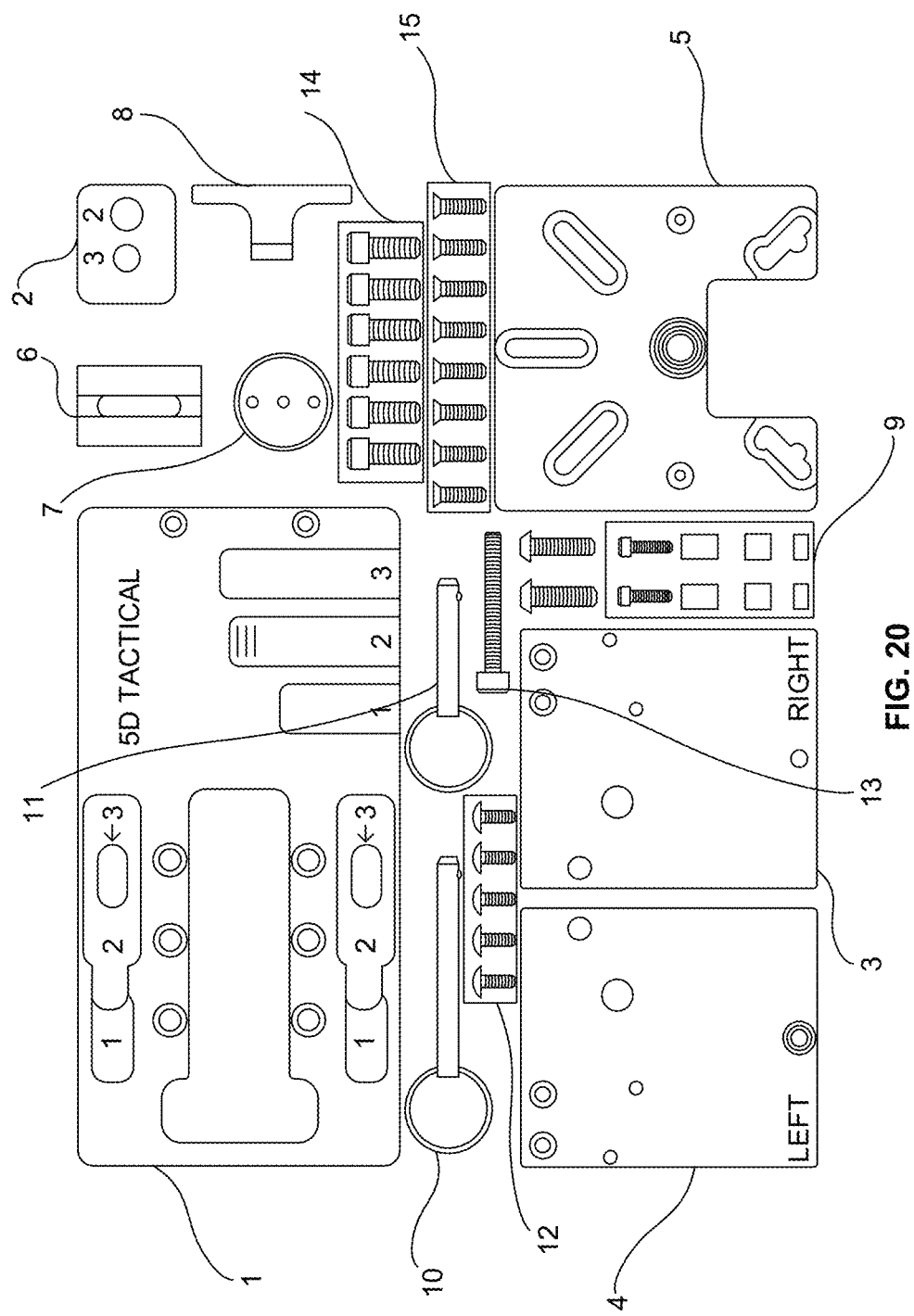
FIG. 20 depicts various components of a jig assembly with reference to FIGS. 13-19 and 21-27.

FIG. 20 depicts various components of a jig assembly with reference to FIGS. 13-19 and 21-27, as described below:

1. Guide Plate (e.g. guide plate 108 described above); 2. Drill Guide; 3. Right Side Plate (e.g., carriage 114 as described above); 4. Left Side Plate (e.g., carriage 302 as described above); 5. Router Adapter (e.g., power tool adapter 122); 6. Router Adapter Side Block; 7. Buffer Adapter (e.g., rear support 110 as described above); 8. Front Takedown Adapter (e.g., front support 118); 9. Guide Pin Set (e.g., 908 as described above); 10. Long Quick Release Pin (e.g., corresponding to locating pin 306); 11. Short Quick Release Pin (e.g., corresponding to pin 704); 12. (5) M4×10 Phillips Truss Screw (e.g., adapter screw 906 as described above); 13. (1) ¼"-20×2" Socket Screw (e.g., carriage screw 304 as described above); 14. (6) ¼"-20×⅝" Socket Screws (e.g., plate screws 106 as described above); 15. (8) #8-32× ⅝" Phillips Screws (e.g., plate screws 120 as described above).

It should be clear that the above-described jig for manufacturing a firearm lower receiver is a universal fitment and facilitates in the guidance of the rotary tool without placing the rotary tool in direct contact with any of a plurality of guidance features for firearm lower receiver manufacturing. It is straightforward to use, resists wear and produces accurate and repeatable results in the hands of both skilled and unskilled users.

The foregoing has been a detailed description of illustrative embodiments of the invention. Various modifications and additions can be made without departing from the spirit and scope if this invention. Each of the various embodiments described above may be combined with other described embodiments in order to provide multiple features. As used herein the directional terms, such as, but not limited to, "up" and "down", "upward" and "downward", "rear", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity. Furthermore, while the foregoing describes a number of separate embodiments of the apparatus and method of the present invention, what has been described herein is merely illustrative of the application of the principles of the present invention. For example, the foregoing jig can be adapted to machining and finishing other parts for a firearm, such as portions of an upper receiver that is being repaired, modified or fabricated. Moreover, the jig can be sold as part of a kit with additional right and left carriages and guide pins that are adapted for machining other firearms (for example, polishing the internal surfaces or repairing a restored firearm). This jig can be adapted for firearms of various sizes and shapes by interchanging the carriages, thereby providing a jig that can be useful to a person finishing a firearm, and repairing and/or restoring a firearm. Also, it is expressly contemplated that the size and shape of the plates of the jig can vary. In general, they are sized in an embodiment proportionally to the depiction herein relative to the size of the lower receiver. Accordingly, this description is meant to be taken only by way of example, and not to otherwise limit the scope of this invention.

The invention claimed is:

1. A jig for machining an unfinished lower receiver comprising:
   a guide plate including:
      an upper support surface configured to support a rotary power tool having a rotary tool; and
      a machining aperture configured for receiving the rotary tool therethrough to machine the unfinished lower receiver;
   a front support configured to couple the guide plate with a front takedown hole of the unfinished lower receiver;
   a rear support including a buffer adapter configured to be threadingly engaged within a buffer mount of the unfinished lower receiver and attached with the guide plate; and
   at least one carriage support configured to couple with the guide plate;
   wherein in an assembled configuration, the buffer adapter and the buffer mount of the unfinished lower receiver protrude above the upper support surface.

2. The jig of claim 1, further comprising:
   an adapter configured to couple with the rotary power tool and engage with the upper support surface of the guide plate, the adapter including a window configured to receive the buffer adapter and the buffer mount during machining.

3. The jig of claim 2, further comprising:
   a power tool mount configured to engage with the adapter and configured to receive the rotary power tool.

4. The jig of claim 2, further comprising:
   a bearing coupled with the adapter to support a rotatable shaft of the rotary tool for use in firearm lower receiver manufacturing.

5. The jig of claim 2, wherein the adapter defines a through-hole for a rotary tool to pass therethrough.

6. The jig of claim 2, wherein the adapter defines a plurality of wells at an undersurface thereof, the wells being configured to align the adapter with respect to the rotary power tool.

7. The jig of claim 2, wherein the adapter is configured to receive a guide pin, the guide pin being configured to engage with the adapter and align the adapter with respect to the guide plate.

8. The jig of claim 7, wherein the guide plate includes a guide cavity configured to receive the guide pin, inner wall of the guide cavity configured to contact the guide pin and prevent milling of the unfinished lower receiver in incorrect locations.

9. The jig of claim 8, wherein the guide cavity includes a plurality of different depths.

10. The jig of claim 9, wherein the guide pin is extendable to engage within the plurality of different depths.

11. The jig of claim 9, wherein the guide pin is one of a set of guide pins configured to engaged within the plurality of different depths.

12. The jig of claim 1, wherein the at least one carriage comprises a left carriage and a right carriage.

13. The jig of claim 1, wherein the front support includes at least one locating pin.

14. The jig of claim 1, wherein the jig is constructed and rearranged to be a universal fitment onto the rotary tool for use in firearm lower receiver manufacturing.

15. The jig of claim 1, wherein the jig is constructed and arranged to provide for use of at least one guiding feature to facilitate in the guidance of the rotary tool without placing the rotary tool in direct contact with any of a plurality of guidance features for firearm lower receiver manufacturing.

16. The jig of claim 1, wherein the at least one carriage includes guide holes that receive a drill bit to form holes in a side of a lower receiver.

17. The jig of claim 1, wherein the buffer adapter defines a plurality of rear support threaded holes that align with a plurality of guide plate threaded holes, the plurality of rear support threaded holes arranged within a circumference of the buffer mount of the lower receiver.

18. The jig of claim 1, wherein the guide plate has a thickness between ⅛ inch and ½ inch.

19. The jig of claim 1, wherein the guide plate engages with the adapter.

20. The jig of claim 1, wherein the guide plate includes a plurality of guide cavities configured to receive guide pins coupled with the rotary power tool, inner walls of the guide cavities configured to contact the corresponding guide pins and prevent milling of the unfinished lower receiver in incorrect locations.

* * * * *